United States Patent
Ikefuji et al.

(10) Patent No.: US 10,923,962 B2
(45) Date of Patent: Feb. 16, 2021

(54) POWER TRANSMISSION DEVICE NON-CONTACT POWER FEEDING SYSTEM WITH DETECTION CIRCUIT TO DETECT CURRENT AMPLITUDE IN TRANSMISSION-SIDE COIL

(71) Applicant: Rohm Co., Ltd., Kyoto (JP)

(72) Inventors: Yoshihiro Ikefuji, Kyoto (JP); Akihiro Okui, Kyoto (JP); Kimitake Utsunomiya, Tokyo (JP)

(73) Assignee: ROHM CO., LTD., Kyoto (JP)

( * ) Notice: Subject to any disclaimer, the term of this patent is extended or adjusted under 35 U.S.C. 154(b) by 114 days.

(21) Appl. No.: 15/742,791

(22) PCT Filed: Jul. 5, 2016

(86) PCT No.: PCT/JP2016/069947
§ 371 (c)(1),
(2) Date: Jan. 8, 2018

(87) PCT Pub. No.: WO2017/006946
PCT Pub. Date: Jan. 12, 2017

(65) Prior Publication Data
US 2018/0205255 A1 Jul. 19, 2018

(30) Foreign Application Priority Data
Jul. 27, 2015 (JP) .............................. JP2015-147793

(51) Int. Cl.
*H02J 50/60* (2016.01)
*H02J 50/12* (2016.01)
(Continued)

(52) U.S. Cl.
CPC .............. *H02J 50/60* (2016.02); *H01F 27/40* (2013.01); *H01F 38/14* (2013.01); *H02J 7/025* (2013.01);
(Continued)

(58) Field of Classification Search
CPC . H02J 7/025; H02J 50/12; H02J 50/60; H01F 27/40; H01F 38/14; H04B 5/0081; H04B 5/0037; H04M 1/04
(Continued)

(56) References Cited

U.S. PATENT DOCUMENTS 9,819,213 B2 * 11/2017 Ikefuji ................ H02J 7/00034
10,530,187 B2 * 1/2020 Ikefuji ...................... H02J 7/04
(Continued)

FOREIGN PATENT DOCUMENTS

EP 3316450 A1 5/2018
JP 2014-033504 2/2014
(Continued)

OTHER PUBLICATIONS

Extended European Search Report corresponding to Application No. 16821415.3/1202/3322068 PCT/JP2016069947; dated Oct. 16, 2018.
(Continued)

*Primary Examiner* — Richard Isla
*Assistant Examiner* — Manuel Hernandez
(74) *Attorney, Agent, or Firm* — Cantor Colburn LLP

(57) ABSTRACT

In a non-contact power feeding system which is formed with a power transmission device having a power transmission-side resonant circuit including a power transmission-side coil and a power reception device having a power reception-side resonant circuit including a power reception-side coil and which can transmit and receive power by a magnetic field resonance method, when the power is transmitted, the power transmission device monitors the amplitude of a current flowing through the power transmission-side coil. Then, when a current amplitude detection value ($V_{mFOD}$)
(Continued)

falls outside a predetermined normal range, it is determined that a foreign object is present, and thus the power transmission is stopped.

10 Claims, 28 Drawing Sheets

(51) Int. Cl.
    *H04M 1/04*     (2006.01)
    *H01F 38/14*     (2006.01)
    *H04B 5/00*     (2006.01)
    *H01F 27/40*     (2006.01)
    *H02J 7/02*     (2016.01)

(52) U.S. Cl.
    CPC ............ *H02J 50/12* (2016.02); *H04B 5/0037* (2013.01); *H04B 5/0081* (2013.01); *H04M 1/04* (2013.01)

(58) Field of Classification Search
    USPC .......................................... 320/108; 307/104
    See application file for complete search history.

(56) References Cited

U.S. PATENT DOCUMENTS

| | | | | |
|---|---|---|---|---|
| 10,601,258 | B2* | 3/2020 | Ikefuji | ................ H02J 7/00034 |
| 10,700,554 | B2* | 6/2020 | Ikefuji | .................... H02J 50/80 |
| 10,756,559 | B2* | 8/2020 | Ikefuji | .................... H02J 7/025 |
| 2009/0174263 | A1* | 7/2009 | Baarman | ................ H02J 50/12 307/104 |
| 2014/0035521 | A1 | 2/2014 | Endo | |
| 2014/0266036 | A1* | 9/2014 | Jung | .................. G01R 29/0814 320/108 |
| 2014/0300202 | A1* | 10/2014 | Shimokawa | ............ H02J 50/12 307/104 |
| 2015/0198640 | A1* | 7/2015 | Lee | ......................... H02J 7/025 320/108 |
| 2015/0280453 | A1* | 10/2015 | Ikefuji | .................... H02J 50/90 320/108 |
| 2016/0013683 | A1 | 1/2016 | Endo | |
| 2016/0322868 | A1* | 11/2016 | Akuzawa | ................ H02J 17/00 |
| 2017/0085136 | A1* | 3/2017 | Pfeiffer | ................. H02J 7/0042 |
| 2018/0019618 | A1* | 1/2018 | Ikefuji | ..................... H02J 7/00 |
| 2018/0138757 | A1* | 5/2018 | Ikefuji | .................... H02J 50/12 |
| 2018/0183277 | A1 | 6/2018 | Ikefuji et al. | |
| 2018/0254654 | A1* | 9/2018 | Ikefuji | .................... H02J 50/12 |
| 2018/0331575 | A1* | 11/2018 | Ikefuji | .................... H02J 50/80 |

FOREIGN PATENT DOCUMENTS

| | | |
|---|---|---|
| JP | 2014-183731 | 9/2014 |
| WO | 2015/097807 | 7/2015 |

OTHER PUBLICATIONS

Japan Patent Office, International Search Report for PCT/JP2016/069947, dated Sep. 27, 2016 (with English translation).

* cited by examiner

FIG.9
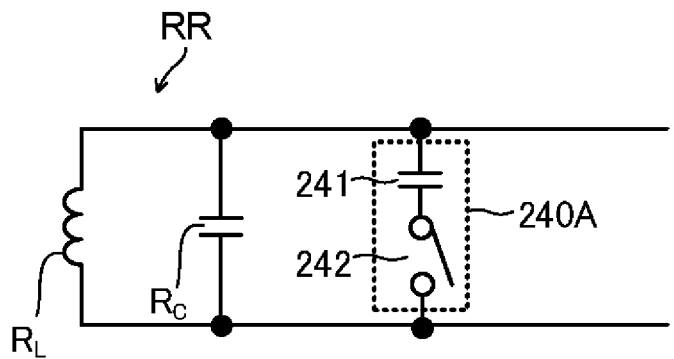
FIG.10
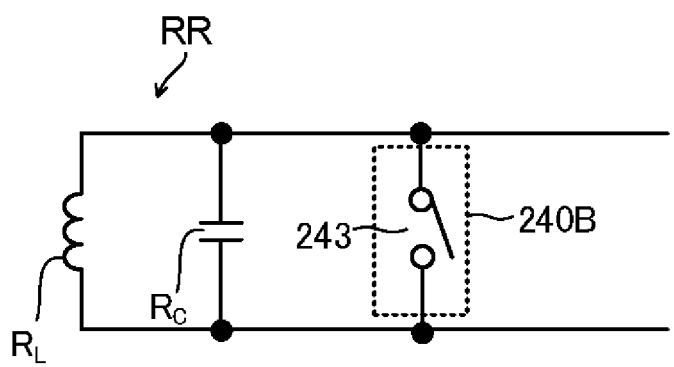
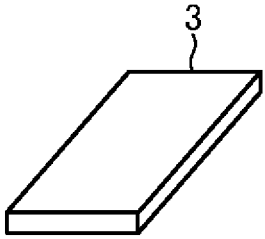
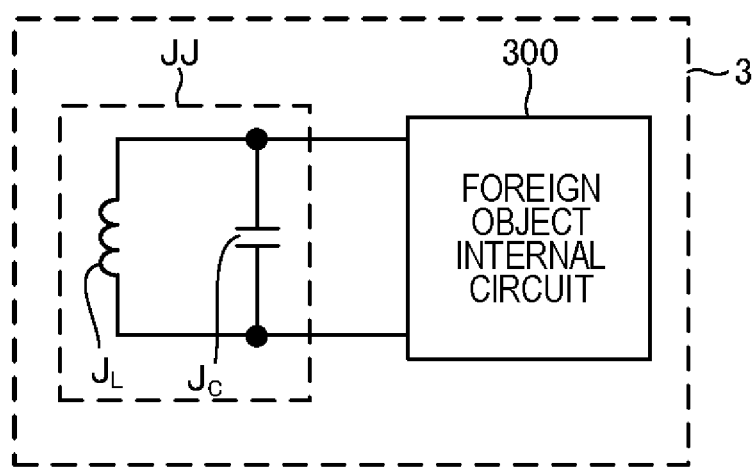
FIG.11A                    FIG.11B FIRST CASE 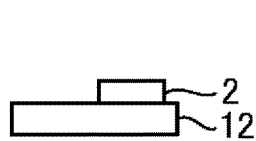
SECOND CASE 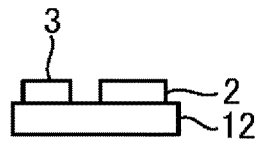
THIRD CASE 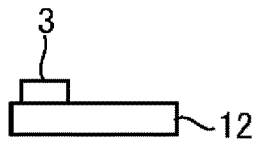
FOURTH CASE 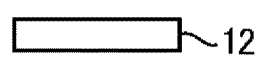
FIG.14A  FIG.14B  FIG.14C  FIG.14D
FIG.15
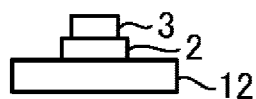

FIG.28A
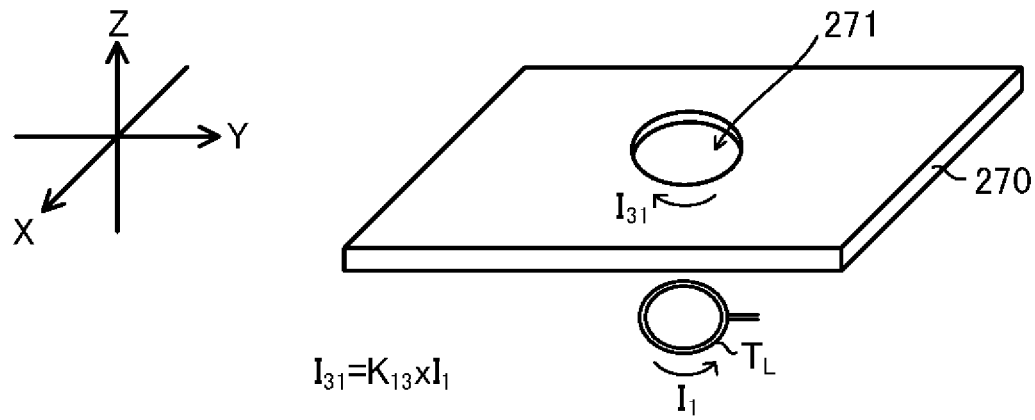
FIG.28B
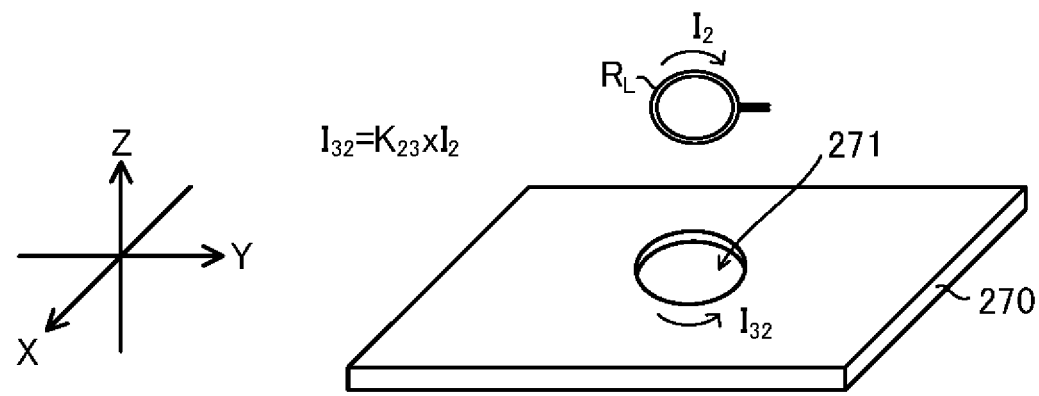
FIG.28C

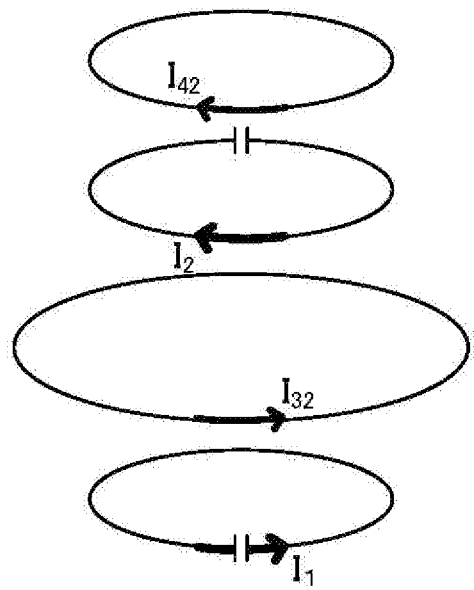
FIG.32A                FIG.32B
FIG.33
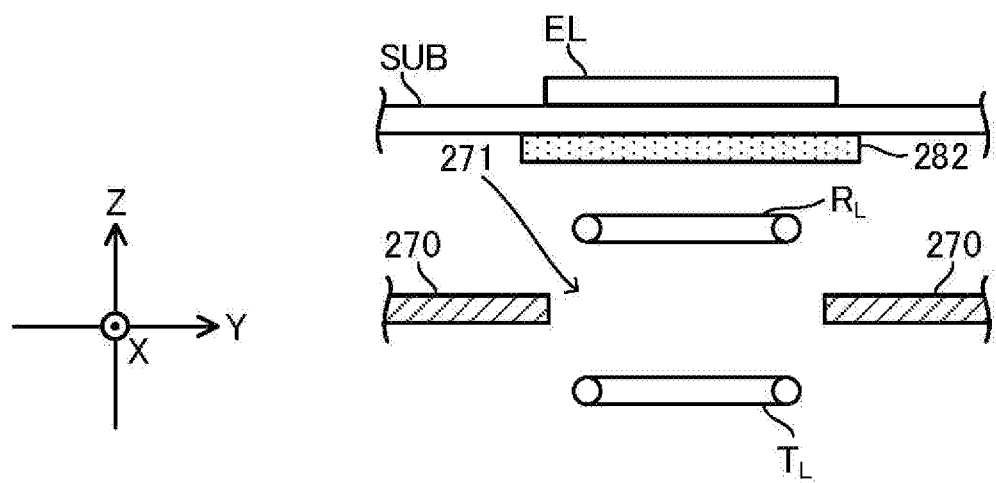

POWER TRANSMISSION DEVICE NON-CONTACT POWER FEEDING SYSTEM WITH DETECTION CIRCUIT TO DETECT CURRENT AMPLITUDE IN TRANSMISSION-SIDE COIL

TECHNICAL FIELD

The present invention relates to a power transmission device, a power reception device and a non-contact power feeding system.

BACKGROUND ART

As one type of proximity wireless communication, there is wireless communication which is performed by NFC (Near field communication) that uses 13.56 MHz as a carrier frequency. On the other hand, a technology is also proposed which utilizes a coil used for NFC communication so as to perform non-contact power feeding by a magnetic field resonance method.

In the non-contact power feeding utilizing the magnetic field resonance, a power transmission-side resonant circuit including a power transmission-side coil is arranged in a power feeding device, a power reception-side resonant circuit including a power reception-side coil is arranged in an electronic device serving as a power reception device and the resonant frequencies of the resonant circuits are set to a common reference frequency. An alternating current is then passed through the power transmission-side coil, and thus an alternating magnetic field at the reference frequency is generated in the power transmission-side coil. Then, the alternating magnetic field is transmitted to the power reception-side resonant circuit which resonates at the reference frequency, and thus an alternating current flows through the power reception-side coil. In other words, power is transmitted from the power transmission-side resonant circuit including the power transmission-side coil to the power reception-side resonant circuit including the power reception-side coil.

RELATED ART DOCUMENT

Patent Document

Patent document 1: Japanese Patent Application Publication No. 2014-33504

DISCLOSURE OF THE INVENTION

Problems to be Solved by the Invention

Although only an electronic device corresponding to a power feeding device is normally arranged on a power feeding table (a power feeding mat or a power feeding cradle) in the power feeding device such that desired power feeding (power transmission) is performed, a foreign object which does not correspond to the power feeding device may be erroneously arranged on the power feeding table. The foreign object here is, for example, an object (such as a card) which includes a wireless IC tag having an antenna coil of 13.56 MHz that does not respond to NFC communication. For example, the foreign object is also an electronic device in which an NFC communication function itself is included but in which the function is disabled. For example, a smart phone in which the NFC communication function is included but in which the function is turned off by a software setting can be the foreign object. A smart phone in which the NFC communication function is enabled but in which a power reception function is not included is also classified as the foreign object.

If such a foreign object is placed on a power feeding table when a power transmission operation is performed, the foreign object may be destroyed by a strong magnetic field generated in a power transmission-side coil. For example, the strong magnetic field at the time of the power transmission operation may increase the terminal voltage of a coil in the foreign object on the power feeding table to 100 to 200V, and as long as a foreign object which can withstand such a high voltage is not formed, the foreign object is destroyed. An iron plate or the like can be the foreign object. Depending on a carrier frequency in power feeding, the foreign object such as the iron plate may generate heat by a magnetic field generated in the power transmission-side coil, and when the generated heat is problematic, it is also necessary to cope with such a problem.

On the other hand, in an electronic device serving as a power reception device, in terms of a structural strength, a texture improvement or the like, a metal plate formed of aluminum may be provided. In order for the transmission and reception of power utilizing magnetic field resonance to be realized, an opening portion is provided in the metal plate in a position opposite the arrangement position of a power reception-side coil, and at the time of the transmission and reception of power, a power transmission-side coil is opposite the power reception-side coil through the opening portion.

However, the metal plate having the opening portion acts so as to produce a change in the resonant frequency of each resonant circuit through magnetic coupling to the coil. The change is not desirable for a system which performs the transmission and reception of power at the reference frequency.

An object of the present invention is to provide a power transmission device and a non-contact power feeding system which contribute to the prevention of destruction of a foreign object or the like. Another object of the present invention is to provide a power reception device and a non-contact power feeding system which contribute to the realization of satisfactory power reception or satisfactory transmission and reception of power.

Means for Solving the Problem

A first power transmission device according to the present invention which can transmit power to a power reception device serving as a first power reception device by a magnetic field resonance method includes: a power transmission-side resonant circuit which includes a power transmission-side coil that transmits the power; a power transmission circuit which can supply an alternating current voltage to the power transmission-side resonant circuit; a detection circuit which detects the amplitude of a current flowing through the power transmission-side coil; and a control circuit which performs power transmission control on the power by controlling the power transmission circuit, where when the power is transmitted, the control circuit controls, based on the amplitude detection value of the detection circuit, whether or not the continuation of the power transmission is allowed.

Specifically, for example, preferably, in the first power transmission device, when the power is transmitted, the control circuit monitors whether or not the amplitude detection value of the detection circuit falls outside a predetermined range so as to control whether or not the continuation of the power transmission is allowed.

More specifically, for example, preferably, in the first power transmission device, while the power is transmitted, when the control circuit detects that the amplitude detection value of the detection circuit falls outside the predetermined range, the control circuit stops the power transmission.

For example, preferably, in the first power transmission device, when the power is transmitted, the control circuit determines whether or not the amplitude detection value of the detection circuit falls outside the predetermined range so as to determine whether or not a foreign object is present which is different from the power reception device and which can generate a current based on a magnetic field generated in the power transmission-side coil, and when the control circuit determines that the foreign object is present, the control circuit stops the power transmission.

Here, for example, preferably, in the first power transmission device, when the power is transmitted, the control circuit determines whether or not the amplitude detection value of the detection circuit exceeds an upper limit value of the predetermined range so as to determine whether or not as the foreign object, a foreign object including a coil is present.

For example, preferably, in the relationship with the first power transmission device, the power reception device includes: a power reception-side resonant circuit which includes a power reception-side coil that receives the power; and a change/short circuit which changes the resonant frequency of the power reception-side resonant circuit from a resonant frequency when the power is received or short-circuits the power reception-side coil before the reception of the power, the control circuit includes: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion which determines, based on the amplitude detection value of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil and the detection circuit detects, through processing which amplifies a signal indicating the amplitude of the current flowing through the power transmission-side coil, the amplitude, and an amplification factor in the amplification when the power transmission magnetic field is generated in the power transmission-side coil is smaller than an amplification factor in the amplification when the test magnetic field is generated in the power transmission-side coil.

A first non-contact power feeding system according to the present invention includes: a power transmission device having a power transmission-side resonant circuit including a power transmission-side coil that transmits power; and a power reception device having a power reception-side resonant circuit including a power reception-side coil that receives the power and which can transmit and receive the power by a magnetic field resonance method, where the power transmission device includes: a power transmission circuit which can supply an alternating current voltage to the power transmission-side resonant circuit; a detection circuit which detects the amplitude of a current flowing through the power transmission-side coil; and a control circuit which performs power transmission control on the power by controlling the power transmission circuit, and when the power is transmitted, the control circuit controls, based on the amplitude detection value of the detection circuit, whether or not the continuation of the power transmission is allowed.

Specifically, for example, preferably, in the first non-contact power feeding system, when the power is transmitted, the control circuit monitors whether or not the amplitude detection value of the detection circuit falls outside a predetermined range so as to control whether or not the continuation of the power transmission is allowed.

More specifically, for example, preferably, in the first non-contact power feeding system, while the power is transmitted, when the control circuit detects that the amplitude detection value of the detection circuit falls outside the predetermined range, the control circuit stops the power transmission.

For example, preferably, in the first non-contact power feeding system, when the power is transmitted, the control circuit determines whether or not the amplitude detection value of the detection circuit falls outside the predetermined range so as to determine whether or not a foreign object is present which is different from the power reception device and which can generate a current based on a magnetic field generated in the power transmission-side coil, and when the control circuit determines that the foreign object is present, the control circuit stops the power transmission.

Here, for example, preferably, in the first non-contact power feeding system, when the power is transmitted, the control circuit determines whether or not the amplitude detection value of the detection circuit exceeds an upper limit value of the predetermined range so as to determine whether or not as the foreign object, a foreign object including a coil is present.

For example, preferably, in the first non-contact power feeding system, the power reception device includes a change/short circuit which changes the resonant frequency of the power reception-side resonant circuit from a resonant frequency when the power is received or short-circuits the power reception-side coil before the reception of the power, the control circuit includes: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion which determines, based on the amplitude detection value of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil and the detection circuit detects, through processing which amplifies a signal indicating the amplitude of the current flowing through the power transmission-side coil, the amplitude, and an amplification factor in the amplification when the power transmission magnetic field is generated in the power transmission-side coil is smaller than an amplification factor in the amplification when the test magnetic field is generated in the power transmission-side coil.

A second power reception device according to the present invention which can receive, from a power transmission device having a power transmission-side resonant circuit including a power transmission-side coil that transmits power, the power by a magnetic field resonance method includes: a power reception-side resonant circuit that includes a power reception-side coil that receives the power; and a metal portion that includes a metal plate in which an opening portion is provided in a position opposite the arrangement position of the power reception-side coil, where when the power transmission device and the power reception device are in a predetermined positional relationship for performing the transmission and reception of the power, the opening portion is located between the power transmission-side coil and the power reception-side coil, and a magnetic member portion is provided in such a position as to affect at least one of a resonant frequency of the power reception-side resonant circuit and a resonant frequency of the power transmission-side resonant circuit.

Specifically, for example, preferably, in the second power reception device, the magnetic member portion includes a magnetic member within the opening portion which is arranged in the opening portion.

More specifically, for example, preferably, in the second power reception device, the magnetic member within the opening portion cancels a change in the resonant frequency of the power reception-side resonant circuit caused by the metal plate and cancels a change in the resonant frequency of the power transmission-side resonant circuit caused by the metal plate in the predetermined positional relationship.

For example, preferably, in the second power reception device, in the predetermined positional relationship, a distance between the power reception-side coil and the magnetic member within the opening portion is equal to a distance between the power transmission-side coil and the magnetic member within the opening portion.

For example, preferably, in the second power reception device, the opening portion is sealed by the magnetic member within the opening portion.

For example, preferably, in the second power reception device, the magnetic member within the opening portion is a magnetic member plate which is fitted into the opening portion, and one surface of the magnetic member plate and one surface of the metal plate are located on a same plane, and the other surface of the magnetic member plate and the other surface of the metal plate are located on a same plane parallel to the plane.

For example, preferably, in the second power reception device, the power reception-side coil is arranged between the magnetic member portion and the metal plate, the transmission and reception of the power are performed in a state where the resonant frequencies of the power transmission-side resonant circuit and the power reception-side resonant circuit are set to a predetermined reference frequency, the magnetic member portion cancels a change in the resonant frequency of the power reception-side resonant circuit from the reference frequency caused by the metal plate and in the predetermined positional relationship, the resonant frequency of the power transmission-side resonant circuit is changed to the reference frequency through a change in the resonant frequency of the power transmission-side resonant circuit which is affected by the metal plate.

Here, for example, preferably, in the second power reception device, an electronic circuit is provided which includes an integrated circuit on a side opposite to the magnetic member portion when seen from the power reception-side coil.

Furthermore, for example, preferably, in the second power reception device, the metal plate is arranged between the power reception-side coil and the magnetic member portion, the transmission and reception of the power are performed in a state where the resonant frequencies of the power transmission-side resonant circuit and the power reception-side resonant circuit are set to a predetermined reference frequency, the magnetic member portion cancels a change in the resonant frequency of the power transmission-side resonant circuit from the reference frequency caused by the metal plate in the predetermined positional relationship and the resonant frequency of the power reception-side resonant circuit is changed to the reference frequency through a change in the resonant frequency of the power reception-side resonant circuit which is affected by the metal plate.

Furthermore, for example, preferably, in the second power reception device, the magnetic member portion is arranged between the power reception-side coil and the metal plate, the transmission and reception of the power are performed in a state where the resonant frequencies of the power transmission-side resonant circuit and the power reception-side resonant circuit are set to a predetermined reference frequency, the magnetic member portion cancels a change in the resonant frequency of the power reception-side resonant circuit from the reference frequency caused by the metal plate and in the predetermined positional relationship, the resonant frequency of the power transmission-side resonant circuit is changed to the reference frequency through a change in the resonant frequency of the power transmission-side resonant circuit which is affected by the metal plate.

Specifically, for example, preferably, in the second power reception device, the magnetic member portion is formed of ferrite.

Specifically, for example, preferably, in the second power reception device, the metal plate is formed of aluminum or an aluminum alloy.

Specifically, for example, preferably, in the second power reception device, the enclosure of the power reception device is formed with the metal portion.

A second non-contact power feeding system according to the present invention includes: the power reception device serving as the second power reception device; and the power transmission device which has the power transmission-side resonant circuit including the power transmission-side coil that transmits the power, where the transmission and reception of the power can be performed by the magnetic field resonance method.

Specifically, for example, preferably, in the second non-contact power feeding, the power transmission device includes: a power transmission circuit which can supply an alternating current voltage to the power transmission-side resonant circuit; a detection circuit which detects an amplitude of a current flowing through the power transmission-side coil; and a control circuit which performs power transmission control on the power by controlling the power transmission circuit based on an amplitude detection value of the detection circuit.

For example, preferably, in the second non-contact power feeding system, the power reception device includes a change/short circuit which changes the resonant frequency of the power reception-side resonant circuit from a resonant frequency when the power is received or short-circuits the power reception-side coil before the reception of the power from the power transmission device, the control circuit includes: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion which determines, based on the amplitude detection value of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil and based on the magnetic field generated in the power transmission-side coil, currents in directions opposite to each other flow through the metal plate and the magnetic member portion.

A third power reception device according to the present invention which can receive, from a power transmission device having a power transmission-side resonant circuit including a power transmission-side coil that transmits power, the power by a magnetic field resonance method includes: a power reception-side resonant circuit which includes a power reception-side coil that receives the power; and a metal portion that includes a metal plate in which an opening portion is provided in a position opposite an arrangement position of the power reception-side coil, where when the power transmission device and the power reception device are in a predetermined positional relationship for performing the transmission and reception of the power, the opening portion is located between the power transmission-side coil and the power reception-side coil, and in the metal plate, a slit portion is formed from the opening portion toward an outer periphery of the metal plate.

Specifically, for example, preferably, in the third power reception device, the slit portion includes a cut slit which is extended from the opening portion to the outer periphery of the metal plate.

More specifically, for example, preferably, in the third power reception device, the metal portion includes, as the metal plate, a first metal plate in which a first opening portion is provided in the position opposite the arrangement position of the power reception-side coil and a second metal plate in which a second opening portion is provided in the position opposite the arrangement position of the power reception-side coil, the first metal plate and the second metal plate are coupled to each other through an insulating member, and in the predetermined positional relationship, the first opening portion and the second opening portion are located between the power transmission-side coil and the power reception-side coil, the slit portion includes, as the cut slit, a first cut slit which is extended from the first opening portion to an outer periphery of the first metal plate and a second cut slit which is extended from the second opening portion to an outer periphery of the second metal plate and within a plane parallel to the first metal plate and the second metal plate, the first cut slit and the second cut slit are formed in different positions.

For example, in the third power reception device, the slit portion can include a plurality of slits which are formed in different positions from the opening portion toward the outer periphery of the metal plate, and a metal of the metal plate can be left between each of the slits and the outer periphery of the metal plate.

Here, for example, preferably, in the third power reception device, the slits are formed radially from the opening portion toward the outer periphery of the metal plate.

For example, preferably, in the third power reception device, the transmission and reception of the power are performed in a state where resonant frequencies of the power transmission-side resonant circuit and the power reception-side resonant circuit are set to a predetermined reference frequency, and in the predetermined positional relationship, the resonant frequencies of the power transmission-side resonant circuit and the power reception-side resonant circuit are changed to the reference frequency through changes in the resonant frequencies of the power transmission-side resonant circuit and the power reception-side resonant circuit which are affected by the metal plate.

For example, in the third power reception device, the metal plate is formed of aluminum or an aluminum alloy.

For example, preferably, in the third power reception device, the enclosure of the power reception device is formed with the metal portion.

A third non-contact power feeding system according to the present invention includes: the power reception device serving as the third power reception device; and the power transmission device which has the power transmission-side resonant circuit including the power transmission-side coil that transmits the power, where the transmission and reception of the power can be performed by the magnetic field resonance method.

Specifically, for example, preferably, in the third non-contact power feeding system, the power transmission device includes: a power transmission circuit which can supply an alternating current voltage to the power transmission-side resonant circuit; a detection circuit which detects an amplitude of a current flowing through the power transmission-side coil; and a control circuit which performs power transmission control on the power by controlling the power transmission circuit based on an amplitude detection value of the detection circuit.

For example, preferably, in the third non-contact power feeding system, the power reception device includes a change/short circuit which changes the resonant frequency of the power reception-side resonant circuit from a resonant frequency when the power is received or short-circuits the power reception-side coil before the reception of the power from the power transmission device, and the control circuit includes: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion which determines, based on the amplitude detection value of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil.

Advantages of the Invention

According to the present invention, it is possible to provide a power transmission device and a non-contact power feeding system which contribute to the prevention of destruction of a foreign object or the like. It is also possible to provide a power reception device and a non-contact power feeding system which contribute to the realization of satisfactory power reception or satisfactory transmission and reception of power.

BRIEF DESCRIPTION OF DRAWINGS

FIG. 9 is a circuit diagram showing an example of a resonant state change circuit in the first embodiment of the present invention;

FIG. 10 is a circuit diagram showing another example of the resonant state change circuit in the first embodiment of the present invention;

FIGS. 11A and 11B are respectively a schematic outline view and a schematic internal configuration diagram of a foreign object in the first embodiment of the present invention;

FIGS. 14A to 14D are diagrams illustrating arrangement relationships of a power feeding table, the electronic device and the foreign object;

FIG. 15 is a diagram illustrating an arrangement relationship of the power feeding table, the electronic device and the foreign object;

FIGS. 28A to 28C are diagrams showing a relationship of currents flowing through the metal plate, the power transmission-side coil and the power reception-side coil in the second embodiment of the present invention;

FIGS. 32A and 32B are relationship diagrams of currents flowing through the power transmission-side coil, the power reception-side coil, the metal plate and the magnetic member plate in the example (EX3_2) of the third embodiment of the present invention;

FIG. 33 is a diagram for illustrating the arrangement positions of a substrate and an electronic circuit in an electronic device in the example (EX3_2) of the third embodiment of the present invention;

DESCRIPTION OF EMBODIMENTS

Figure 1A:
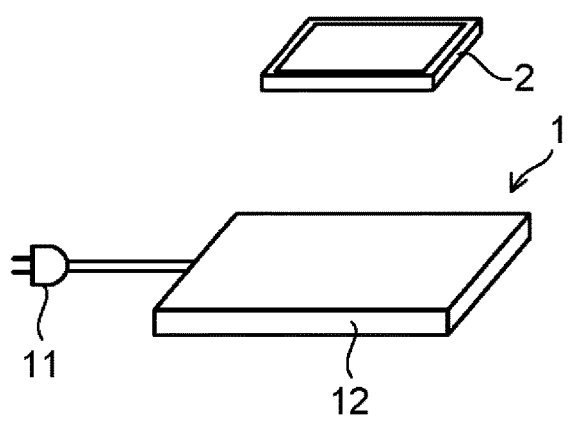
FIGS. 1A and 1B are respectively a schematic external view of a power feeding device and an electronic device in a separate state and a schematic external view of the power feeding device and the electronic device in a reference arrangement state in a first embodiment of the present invention.

Examples of the embodiment of the present invention will be specifically described below with reference to drawings. In the drawings referenced, the same portions are identified with the same symbols, and the repeated description of the same portions will be omitted in principle. In the present specification, for simplification of description, signs or symbols which refer to information, signals, physical amounts, state amounts, members and the like are provided, and thus the names of the information, the signals, the physical amounts, the state amounts, the members and the like corresponding to the signs or symbols may be omitted or described in short. In an arbitrary flowchart which will be described later, a plurality of types of processing in an arbitrary plurality of steps can be arbitrarily changed in the order in which they are performed or can be performed at the same time unless otherwise a contradiction arises in the details of the processing.

First Embodiment

Figure 1B:
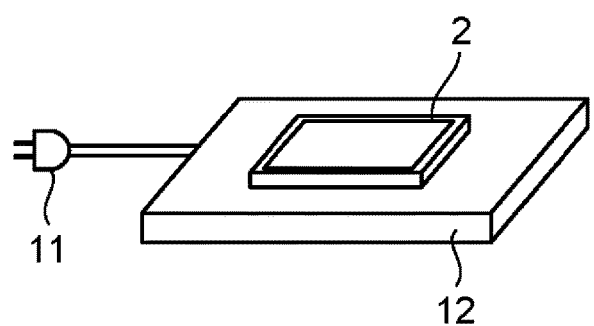

A first embodiment of the present invention will be described. FIGS. 1A and 1B are schematic external views of a power feeding device 1 and an electronic device 2 according to the first embodiment of the present invention. Specifically, FIG. 1A is an external view of the power feeding device 1 and the electronic device 2 when they are in a separate state, and FIG. 1B is an external view of the power feeding device 1 and the electronic device 2 when they are in a reference arrangement state. The significance of the separate state and the reference arrangement state will be described in detail later. The power feeding device 1 and the electronic device 2 form a non-contact power feeding system. The power feeding device 1 includes a power supply plug 11 that receives commercial alternating current power and a power feeding table 12 which is formed of a resin material.

Figure 2:
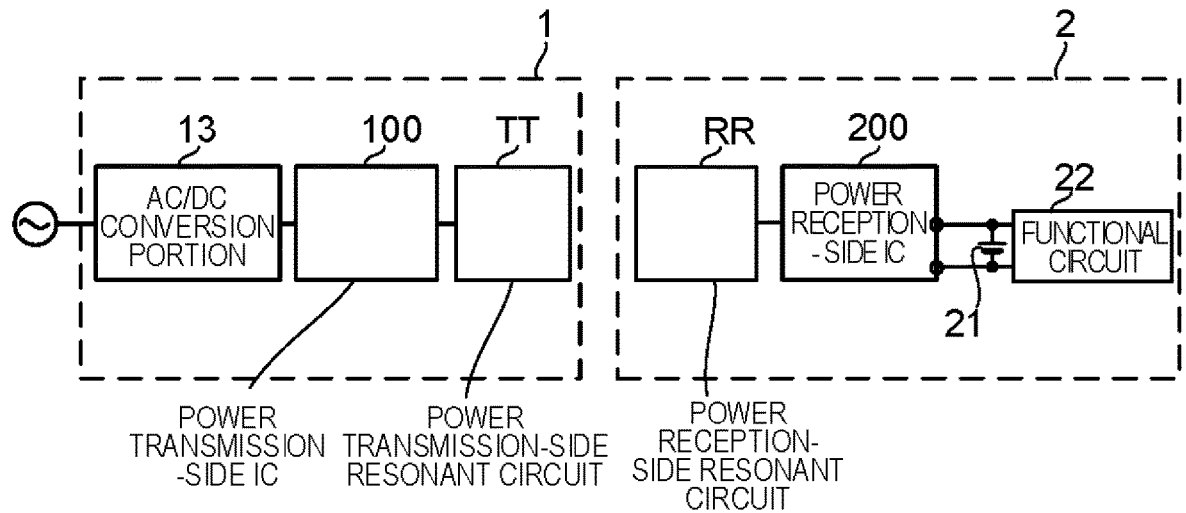
FIG. 2 is a schematic internal configuration diagram of the power feeding device and the electronic device in the first embodiment of the present invention.

FIG. 2 shows a schematic internal configuration diagram of the power feeding device 1 and the electronic device 2. The power feeding device 1 includes: an AC/DC conversion portion 13 which generates a direct current voltage having a predetermined voltage value from a commercial alternating current voltage input through the power supply plug 11 and which outputs the direct current voltage; a power transmission-side IC 100 (hereinafter also referred to as an IC 100) which is an integrated circuit that is driven by use of the output voltage of the AC/DC conversion portion 13; and a power transmission-side resonant circuit TT (hereinafter also referred to as a resonant circuit TT) which is connected to the IC 100. The AC/DC conversion portion 13, the power transmission-side IC 100 and the resonant circuit TT can be disposed in the power feeding table 12. A circuit other than IC 100 which is driven by use of the output voltage of the AC/DC conversion portion 13 can be provided in the power feeding device 1.

The electronic device 2 includes: a power reception-side IC 200 (hereinafter also referred to as an IC 200) which is an integrated circuit; a power reception-side resonant circuit RR (hereinafter also referred to as a resonant circuit RR) which is connected to the IC 200; a battery 21 which is a secondary battery; and a functional circuit 22 which is driven based on the output voltage of the battery 21. The IC 200 can supply charging power to the battery 21 though the details thereof will be described later. The IC 200 may be driven by the output voltage of the battery 21 or may be driven based on a voltage from a voltage source other than the battery 21. Alternatively, a direct current voltage which is obtained by rectifying a signal for NFC communication (which will be described in detail later) received from the power feeding device 1 may serve as a drive voltage for the IC 200. In this case, even when the battery 21 does not have the remaining capacity, the IC 200 can be driven.

The electronic device 2 may be an arbitrary electronic device, and is, for example, a mobile phone (including a mobile phone classified as a smart phone), a portable information terminal, a tablet-type personal computer, a digital camera, an MP3 player, a pedometer or a Bluetooth (registered trademark) headset. The functional circuit 22 realizes an arbitrary function which needs to be realized by the electronic device 2. Hence, for example, when the electronic device 2 is a smart phone, the functional circuit 22 includes a call processing portion for realizing a call with the device of a party on the other end, a communication processing portion for transmitting and receiving information to and from other devices through a network and the like. For example, when the electronic device 2 is a digital camera, the functional circuit 22 includes a drive circuit which drives an image sensing element, an image processing circuit which generates image data from the output signal of the image sensing element and the like. It may be considered that the functional circuit 22 is a circuit which is provided in a device outside the electronic device 2.

Figure 3:
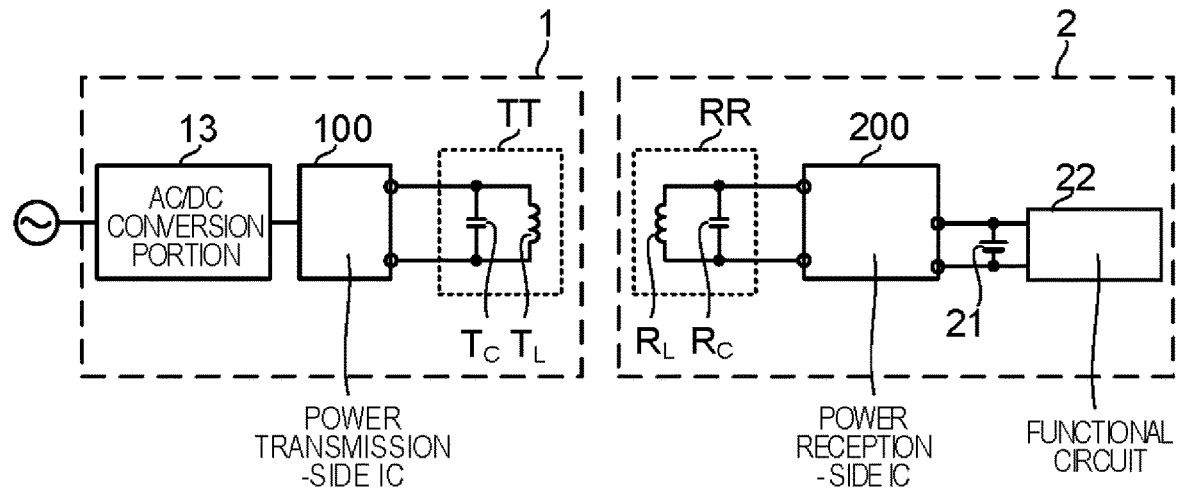
FIG. 3 is a schematic internal configuration diagram of the power feeding device and the electronic device in the first embodiment of the present invention.

As shown in FIG. 3, the resonant circuit TT includes a coil $T_L$ which is a power transmission-side coil and a capacitor $T_C$ which is a power transmission-side capacitor, and the resonant circuit RR includes a coil $R_L$ which is a power reception-side coil and a capacitor $R_C$ which is a power reception-side capacitor. In the following description, it is assumed that in order to give a concrete form to the description, unless otherwise described, the power transmission-side coil $T_L$ and the power transmission-side capacitor $T_C$ are connected in parallel to each other so as to form the resonant circuit TT as a parallel resonant circuit, and that the power reception-side coil $R_L$ and the power reception-side capacitor $R_C$ are connected in parallel to each other so as to form the resonant circuit RR as a parallel resonant circuit. However, the power transmission-side coil $T_L$ and the power transmission-side capacitor $T_C$ may be connected in series with each other so as to form the resonant circuit TT as a series resonant circuit, and the power reception-side coil $R_L$ and the power reception-side capacitor $R_C$ may be connected in series with each other so as to form the resonant circuit RR as a series resonant circuit.

As shown in FIG. 1B, when the electronic device 2 is placed within a predetermined region on the power feeding table 12, by a magnetic field resonance method (that is, by the utilization of magnetic field resonance), it is possible to perform communication, power transmission and power reception between the devices 1 and 2. The magnetic field resonance is also referred to as magnetic field sympathetic oscillation or the like.

The communication between the devices 1 and 2 is wireless communication (hereinafter referred to as NFC communication) by NFC (Near field communication), and the frequency of a carrier for the communication is 13.56 MHz (megahertz). In the following description, 13.56 MHz is referred to as a reference frequency. Since the NFC communication between the devices 1 and 2 is performed by the magnetic field resonance method utilizing the resonant circuits TT and RR, the resonant frequencies of the resonant circuits TT and RR are set to the reference frequency. However, the resonant frequency of the resonant circuit RR can be temporarily changed from the reference frequency as will be described later.

The power transmission and the power reception between the devices 1 and 2 are the power transmission by the NFC from the power feeding device 1 to the electronic device 2 and the power reception by the NFC in the electronic device 2. The power transmission and the power reception are collectively referred to as NFC power transfer or power transfer in a simple manner. Power is transmitted by the magnetic field resonance method from the coil $T_L$ to the coil $R_L$, and thus the power transfer is realized in a non-contact manner.

In the power transfer utilizing the magnetic field resonance, an alternating current is passed through the power transmission-side coil $T_L$, and thus an alternating magnetic field at the reference frequency is generated in the power transmission-side coil $T_L$. Then, the alternating magnetic field is transmitted to the resonant circuit RR which resonates at the reference frequency (that is, which performs sympathetic oscillation) such that an alternating current flows through the power reception-side coil $R_L$. In other words, power is transmitted from the resonant circuit TT including the power transmission-side coil $T_L$ to the resonant circuit RR including the power reception-side coil $R_L$. In the following description, the magnetic field which is generated by the coil $T_L$ or the coil $R_L$ in the NFC communication or the power transfer is the alternating magnetic field which oscillates at the reference frequency unless otherwise described though the description thereof may be omitted.

A state where the electronic device 2 is placed within a predetermined power transmission region on the power feeding table 12 (the power feeding device 1 and the electronic device 2 are in a predetermined positional relationship), that is, the electronic device 2 is placed within a predetermined range on the power feeding table 12 such that it is possible to realize the NFC communication and the power transfer described above is referred to as a reference arrangement state (see FIG. 1B). When the magnetic field resonance is utilized, even if the distance to the device on the other end is relatively long, it is possible to perform the communication and the power transfer whereas if the electronic device 2 is located a considerable distance away from the power feeding table 12, it is impossible to realize the communication and the power transfer. A state where the electronic device 2 is located sufficiently away from the power feeding table 12 such that it is impossible to realize the communication and the power transfer described above is referred to as a separate state (see FIG. 1A). Although in the power feeding table 12 shown in FIG. 1A, the front surface is flat, a recess or the like which corresponds to the shape of the electronic device 2 to be placed thereon may be formed in the power feeding table 12. The reference arrangement state may be interpreted so as to belong to a state where the electronic device 2 is present in the predetermined power transmission region (that is, the region for performing the power transmission and the power reception) in which it is possible to perform the transmission and reception of power between the power feeding device 1 and the electronic device 2, and the separate state may be interpreted so as to belong to a state where the electronic device 2 is not present in the power transmission region.

Figure 4:
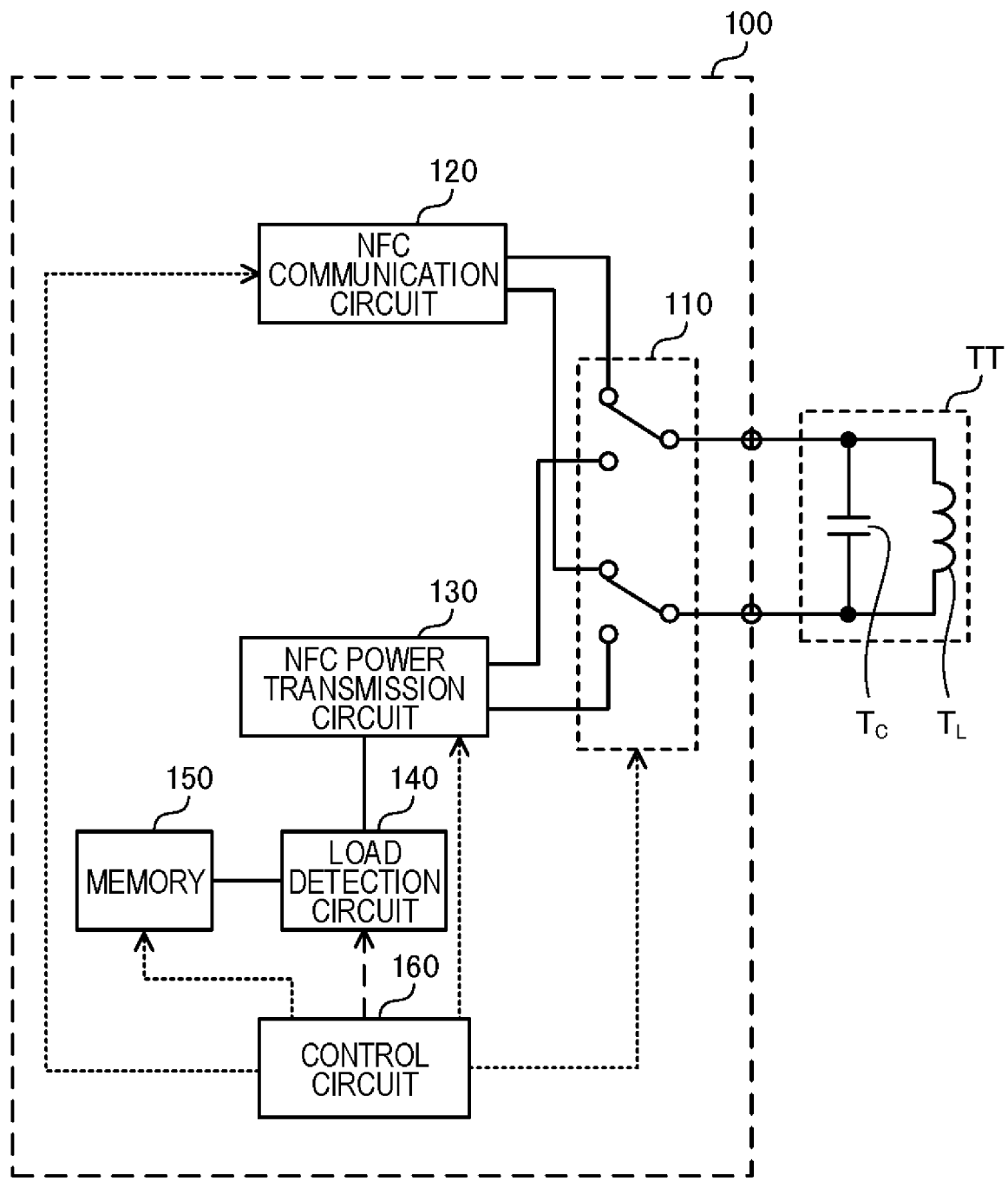
FIG. 4 is a partial configuration diagram of the power feeding device including an internal block diagram of an IC within the power feeding device in the first embodiment of the present invention.
Figure 5:
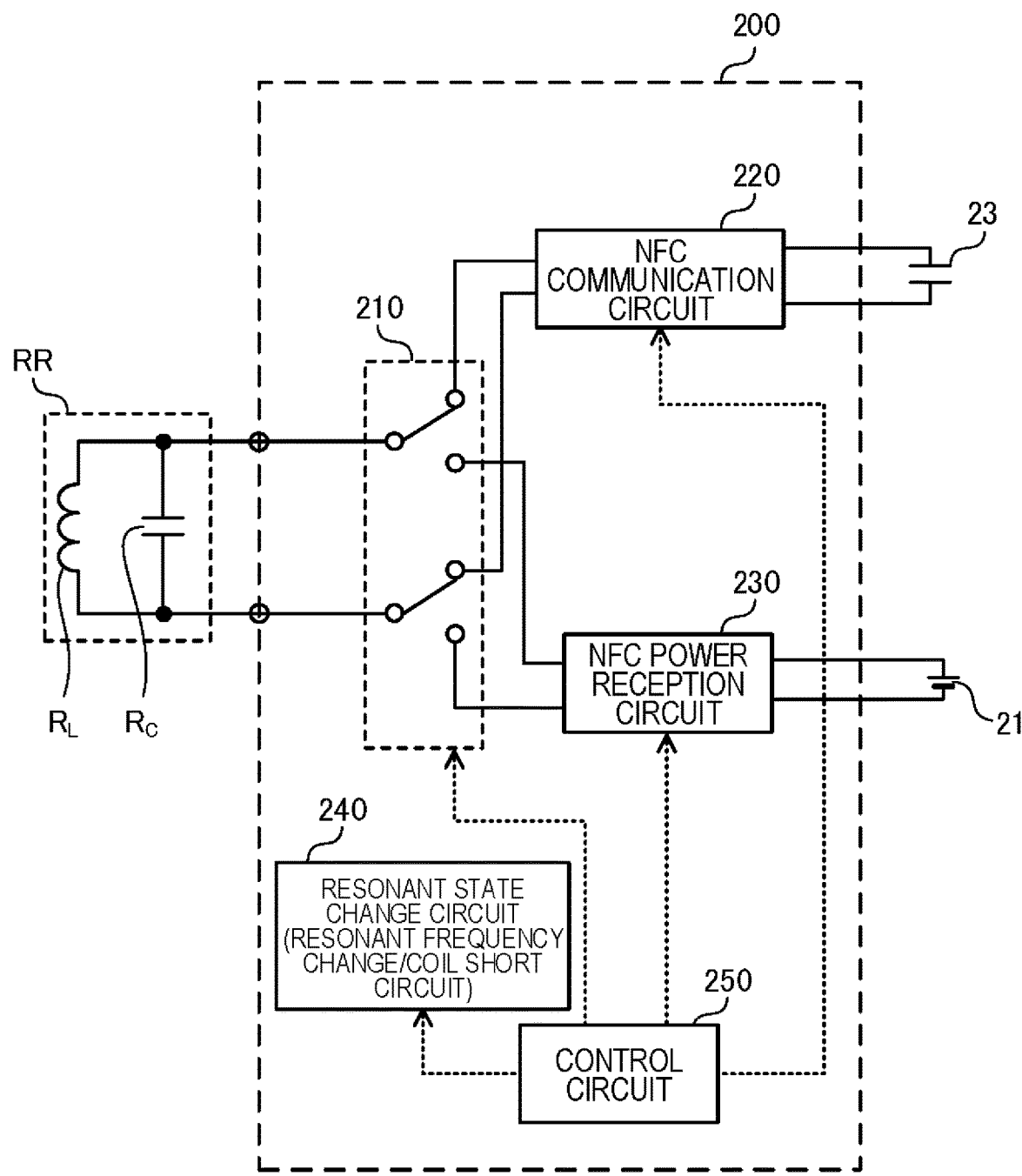
FIG. 5 is a partial configuration diagram of the electronic device including an internal block diagram of an IC within the electronic device in the first embodiment of the present invention.

FIG. 4 shows a partial configuration diagram of the power feeding device 1 including an internal block diagram of the IC 100. In the IC 100, individual portions are provided which are represented by symbols 110, 120, 130, 140, 150 and 160. FIG. 5 shows a partial configuration diagram of the electronic device 2 including an internal block diagram of the IC 200. In the IC 200, individual portions are provided which are represented by symbols 210, 220, 230, 240 and 250. A capacitor 23 which outputs the drive voltage for the IC 200 may be connected to the IC 200. The capacitor 23 can output the direct current voltage obtained by rectifying the signal for the NFC communication received from the power feeding device 1.

The switching circuit 110 connects, under control of the control circuit 160, either of the NFC communication circuit 120 and the NFC power transmission circuit 130 to the resonant circuit TT. The switching circuit 110 can be formed with a plurality of switches which are interposed between the resonant circuit TT and the circuits 120 and 130. An arbitrary switch which is described in the present specification may be formed with a semiconductor switching element such as a field effect transistor.

The switching circuit 210 connects, under control of the control circuit 250, the resonant circuit RR to either of the NFC communication circuit 220 and the NFC power reception circuit 230. The switching circuit 210 can be formed with a plurality of switches which are interposed between the resonant circuit RR and the circuits 220 and 230.

A state where the resonant circuit TT is connected through the switching circuit 110 to the NFC communication circuit 120 and where the resonant circuit RR is connected through the switching circuit 210 to the NFC communication circuit 220 is referred to as a communication connection state. In the communication connection state, the NFC communication can be performed. In the communication connection state, the NFC communication circuit 120 can supply an alternating current signal (an alternating current voltage) at the reference frequency to the resonant circuit TT. The NFC communication between the devices 1 and 2 is performed by a half-duplex method.

When in the communication connection state, the power feeding device 1 is a transmission side, an arbitrary information signal is superimposed on the alternating current signal supplied by the NFC communication circuit 120 to the resonant circuit TT, and thus the information signal is transmitted from the coil $T_L$ serving as a power feeding device-side antenna coil and is received by the coil $R_L$ serving as an electronic device-side antenna coil. The information signal received in the coil $R_L$ is extracted in the NFC communication circuit 220. When in the communication connection state, the electronic device 2 is the transmission side, the NFC communication circuit 220 can transmit an arbitrary information signal (response signal) from the coil $R_L$ in the resonant circuit RR to the coil $T_L$ in the resonant circuit TT. As is known, this transmission is realized by a load modulation method in which based on an ISO standard (for example, ISO 14443 standard), the impedance of the coil $R_L$ (the electronic device-side antenna coil) seen from the coil $T_L$ (the power feeding device-side antenna coil) is changed. The information signal transmitted from the electronic device 2 is extracted in the NFC communication circuit 120.

A state where the resonant circuit TT is connected through the switching circuit 110 to the NFC power transmission circuit 130 and where the resonant circuit RR is connected through the switching circuit 210 to the NFC power reception circuit 230 is referred to as a power feeding connection state.

In the power feeding connection state, the NFC power transmission circuit 130 can perform a power transmission operation, and the NFC power reception circuit 230 can perform a power reception operation. The power transfer is realized by the power transmission operation and the power reception operation. In the power transmission operation, the power transmission circuit 130 supplies, to the resonant circuit TT, a power transmission alternating current signal (power transmission alternating current voltage) at the reference frequency so as to generate a power transmission magnetic field (power transmission alternating magnetic field) at the reference frequency in the power transmission-side coil $T_L$, and thus power is fed by the magnetic field resonance method from the resonant circuit TT (the power transmission-side coil $T_L$) to the resonant circuit RR. The power received in the power reception-side coil $R_L$ based on the power transmission operation is fed to the power reception circuit 230, and in the power reception operation, the power reception circuit 230 generates arbitrary direct current power from the received power and outputs it. With the output power of the power reception circuit 230, it is possible to charge the battery 21.

Figure 6:
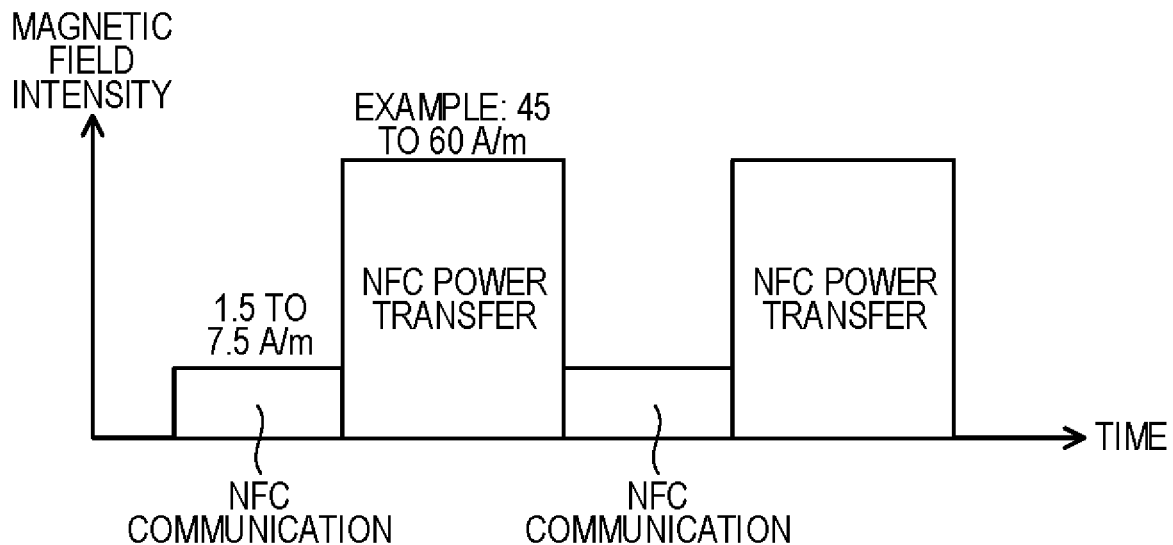
FIG. 6 is a diagram showing a change in a magnetic field intensity when NFC communication and power transfer are alternately performed.

Although a magnetic field is also generated in the coil $T_L$ or the coil $R_L$ when the NFC communication is performed in the communication connection state, a magnetic field intensity in the NFC communication falls within a predetermined range. The lower limit value and the upper limit value in the range are defined in the standard of the NFC so as to be 1.5 A/m and 7.5 A/m, respectively. By contract, in the power transfer (that is, the power transmission operation), the intensity of a magnetic field (the intensity of the power transmission magnetic field) generated in the power transmission-side coil $T_L$ is more than the upper limit value described above so as to be, for example, about 45 to 60 A/m. In the non-contact power feeding system including the devices 1 and 2, it is possible to alternately perform the NFC communication and the power transfer (NFC power transfer), and the state of a magnetic field intensity at that time is shown in FIG. 6.

Figure 7:
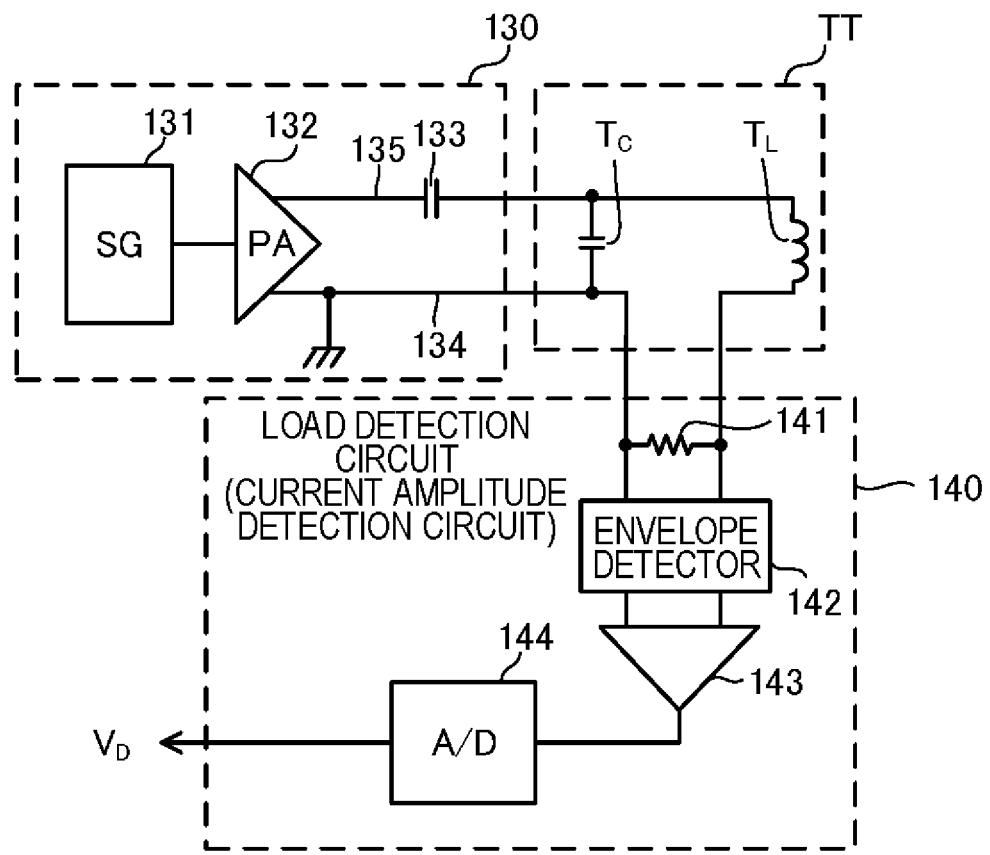
FIG. 7 is a diagram showing a relationship between a power transmission circuit, a load detection circuit and a resonant circuit within the power feeding device.

The load detection circuit 140 detects the magnitude of a load for the power transmission-side coil $T_L$, that is, the magnitude of a load for the power transmission-side coil $T_L$ when the alternating current signal is supplied from the power transmission circuit 130 to the power transmission-side coil $T_L$. FIG. 7 shows a relationship between the power transmission circuit 130, the load detection circuit 140 and the resonant circuit TT in the power feeding connection state. In FIG. 7, the switching circuit 110 is omitted.

The power transmission circuit 130 includes: a signal generator 131 which generates a sinusoidal signal at the reference frequency; an amplifier (power amplifier) 132 which amplifies the sinusoidal signal generated in the signal generator 131 so as to output the amplified sinusoidal signal between lines 134 and 135 with reference to the potential of the line 134; and a capacitor 133. On the other hand, the load detection circuit 140 includes a sense resistor 141, an envelope detector 142, an amplifier 143 and an A/D converter 144. Although the intensity of the sinusoidal signal generated by the signal generator 131 is fixed to a constant value, the amplification factor of the amplifier 132 is variably set by the control circuit 160.

One end of the capacitor 133 is connected to the line 135. In the power feeding connection state, the other end of the capacitor 133 is connected in common to one ends of the capacitor $T_C$ and the coil $T_L$, and the other end of the coil $T_L$ is connected in common to the line 134 and the other end of the capacitor $T_C$ through the sense resistor 141.

Figure 8:
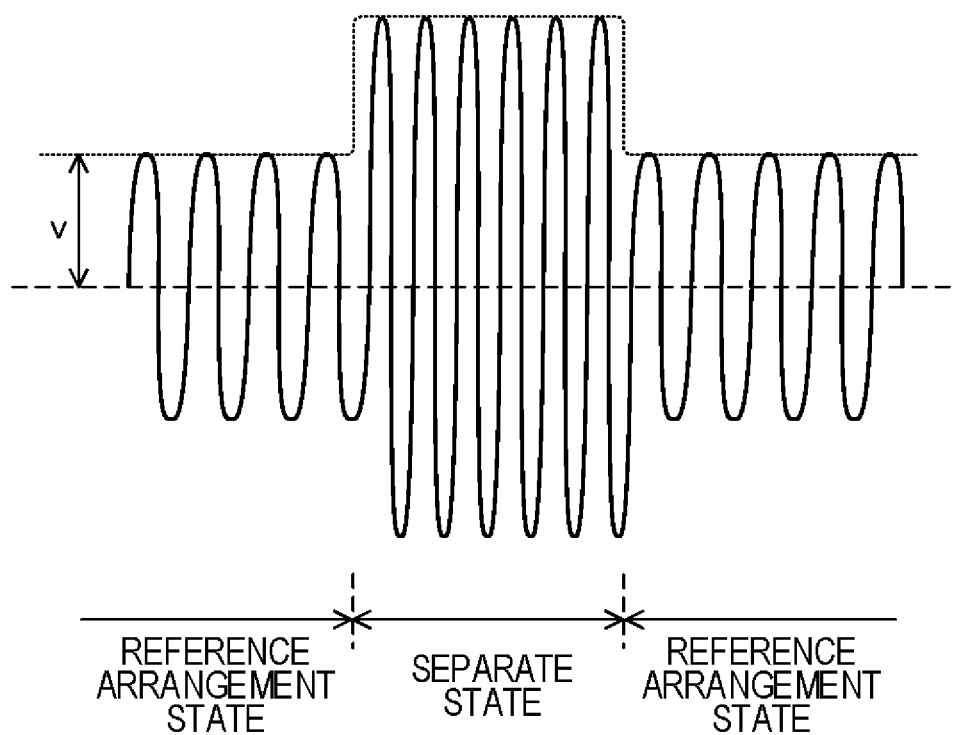
FIG. 8 is a waveform diagram of a voltage drop of a sense resistor in the load detection circuit of FIG. 7.

The power transmission operation is realized by supplying an alternating current signal (power transmission alternating current voltage) from the amplifier 132 through the capacitor 133 to the resonant circuit TT. In the power feeding connection state, the alternating current signal from the amplifier 132 is supplied to the resonant circuit TT, and thus an alternating current at the reference frequency flows through the power transmission-side coil $T_L$, with the result that an alternating current voltage drop is produced in the sense resistor 141. The solid line waveform of FIG. 8 is a voltage waveform of the voltage drop produced by the sense resistor 141. When on the resonant circuit TT, under the condition in which the intensity of the magnetic field generated in the power transmission-side $T_L$ is constant, the electronic device 2 is brought close to the power feeding table 12, a current based on the magnetic field generated in the power transmission-side coil $T_L$ flows through the power reception-side coil $R_L$ whereas a counter electromotive force based on the current flowing through the power reception-side coil $R_L$ is generated in the power transmission-side coil $T_L$, and the counter electromotive force acts so as to reduce the current flowing through the power transmission-side coil $T_L$. Hence, as shown in FIG. 8, the amplitude of the voltage drop of the sense resistor 141 in the reference arrangement state is smaller than that in the separate state.

The envelope detector 142 detects the envelope of a signal of the voltage drop in the sense resistor 141 so as to output an analogue voltage signal proportional to the voltage v of FIG. 8. The amplifier 143 amplifies the output signal of the envelope detector 142 and outputs it. The A/D converter 144 converts the output voltage signal of the amplifier 143 into a digital signal so as to output a digital voltage value $V_D$. As is understood from the above description, the voltage value $V_D$ has a value proportional to the amplitude of the current flowing through the sense resistor 141 (hence, the amplitude of the current flowing through the power transmission-side coil $T_L$) (as the amplitude is increased, the voltage value $V_D$ is increased). Hence, the load detection circuit 140 can be said to be a current amplitude detection circuit which detects the amplitude of the current flowing through the power transmission-side coil $T_L$, and the amplitude detection value thereof can be considered to be the voltage value $V_D$. The envelope detector 142 may be provided in a stage subsequent to the amplifier 143. However, as shown in FIG. 7, when the envelope detector 142 is provided in a stage preceding the amplifier 143, it is advantageously possible to adopt the amplifier 143 whose response performance for high frequencies is low.

For the power transmission-side coil $T_L$ which generates a magnetic field, a coil such as the power reception-side coil $R_L$ which is magnetically coupled to the power transmission-side coil $T_L$ can be considered to be a load, and depending on the magnitude of the load, the voltage value $V_D$ which is the detection value of the load detection circuit 140 is changed. Hence, it can also be considered that the load detection circuit 140 detects the magnitude of the load by the output of the voltage value $V_D$. The magnitude of the load here can be said to be the magnitude of the load for the power transmission-side coil $T_L$ in the power transmission or can be said to be the magnitude of the load in the electronic device 2 which is seen from the power feeding device 1 in the power transmission. The sense resistor 141 may be provided within the IC 100 or may be provided outside the IC 100.

The memory 150 (see FIG. 4) is formed with a nonvolatile memory, and stores arbitrary information in a nonvolatile manner. The control circuit 160 comprehensively controls the operations of the individual portions within the IC 100. The control performed by the control circuit 160 includes, for example, control on the switching operation of the switching circuit 110, control on the details of the communication operation and the power transmission operation of the communication circuit 120 and the power transmission circuit 130 and control on whether or not the operations are performed, control on the operation of the load detection circuit 140 and control on the storage of the memory 150 and control on the reading thereof. The control circuit 160 incorporates a timer (unillustrated), and thereby can measure the length of a time between arbitrary timings.

The resonant state change circuit 240 (see FIG. 5) in the electronic device 2 is a resonant frequency change circuit which changes the resonant frequency of the resonant circuit RR from the reference frequency to another predetermined frequency $f_M$ or a coil short circuit which short-circuits the power reception-side coil $R_L$ in the resonant circuit RR.

A resonant frequency change circuit 240A in FIG. 9 is an example of the resonant frequency change circuit serving as the resonant state change circuit 240. The resonant frequency change circuit 240A is formed with a series circuit of a capacitor 241 and a switch 242, one end of the series circuit is connected in common to one ends of the capacitor $R_C$ and the coil $R_L$ and the other end of the series circuit is connected in common to the other ends of the capacitor $R_C$ and the coil $R_L$. The switch 242 is turned on or off under control of the control circuit 250. When the switch 242 is turned off, the capacitor 241 is separated from the capacitor $R_C$ and the coil $R_L$, and thus when a parasitic inductance and a parasitic capacitance are ignored, the resonant circuit RR is formed with only the coil $R_L$ and the capacitor $R_C$, and the resonant frequency of the resonant circuit RR coincides with the reference frequency. In other words, when the switch 242 is turned off, a power reception-side capacitance for determining the resonant frequency of the resonant circuit RR is the capacitor $R_C$ itself. When the switch 242 is turned on, since the capacitor 241 is connected in parallel to the capacitor $R_C$, the resonant circuit RR is formed with the coil $R_L$ and the combined capacitance of the capacitors $R_C$ and 241, with the result that the resonant frequency of the resonant circuit RR is the frequency $f_M$ which is lower than the reference frequency. In other words, when the switch 242 is turned on, the power reception-side capacitance for determining the resonant frequency of the resonant circuit RR is the combined capacitance described above. Here, it is assumed that when the switch 242 is turned on, the frequency $f_M$ is separate from the reference frequency such that the resonant circuit RR does not function as a load for the power transmission-side coil $T_L$ (that is, such that magnetic field resonance is not sufficiently produced between the resonant circuits TT and RR). For example, the resonant frequency (that is, the frequency $f_M$) of the resonant circuit RR when the switch 242 is turned on is set to several hundred kHz to 1 MHz.

As long as the resonant frequency of the resonant circuit RR can be changed to the frequency $f_M$, the resonant frequency change circuit serving as the change circuit 240 is not limited to the resonant frequency change circuit 240A, and the frequency $f_M$ may be higher than the reference frequency. For example, the resonant frequency change circuit may be a circuit which switches connection and non-connection between the coil $R_L$ and the capacitor $R_C$ by turning on and off a switch that is inserted in series on a current loop for connecting the coil $R_L$ and the capacitor $R_C$ (when the state is switched to the non-connection, the resonant frequency (»the reference frequency) of the resonant circuit RR is determined by the coil $R_L$ and the parasitic capacitance of the wiring). In other words, with consideration given to the fact that the power reception-side resonant circuit RR can be a series resonant circuit, the following can be said. The power reception-side resonant circuit RR includes the parallel circuit or the series circuit of the power reception-side coil ($R_L$) and the power reception-side capacitance, and when the power reception-side capacitance coincides with a predetermined reference capacitance, the resonant frequency $f_O$ of the power reception-side resonant circuit RR coincides with the reference frequency. The resonant frequency change circuit increases or decreases the power reception-side capacitance from the reference capacitance with necessary timing. In this way, in the power reception-side resonant circuit RR, the parallel circuit or the series circuit is formed with the power reception-side coil ($R_L$) and the power reception-side capacitance which is higher or lower than the reference capacitance, with the result that the resonant frequency $f_O$ of the power reception-side resonant circuit RR is changed from the reference frequency.

A coil short circuit 240B in FIG. 10 is an example of the coil short circuit serving as the resonant state change circuit 240. The coil short circuit 240B is formed with a switch 243 that is connected (inserted) between a node to which the one end of the capacitor $R_C$ and one end of the coil $R_L$ in the resonant circuit RR are connected in common and a node to which the other end of the capacitor $R_C$ and the other end of the coil $R_L$ in the resonant circuit RR are connected in common. The switch 243 is turned on or off under control of the control circuit 250. When the switch 243 is turned on, the coil $R_L$ in the resonant circuit RR is short-circuited (more specifically, both ends of the coil $R_L$ are short-circuited). In a state where the power reception-side coil $R_L$ is short-circuited, the power reception-side resonant circuit RR is not present (a state equivalent to a state where the power reception-side resonant circuit RR is not present is entered). Hence, while the power reception-side coil $R_L$ is short-circuited, a load for the power transmission-side coil $T_L$ is sufficiently reduced (that is, a state as if the electronic device 2 were not present on the power feeding table 12 is entered).

As long as the power reception-side coil $R_L$ can be short-circuited, the coil short circuit serving as the change circuit 240 is not limited to the coil short circuit 240B.

In the following description, an operation which changes the resonant frequency $f_O$ of the power reception-side resonant circuit RR from the reference frequency to the predetermined frequency $f_M$ is referred to as a resonant frequency change operation, and an operation which short-circuits the power reception-side coil $R_L$ with the coil short circuit is referred to as a coil short circuit operation. For simplification of description, the resonant frequency change operation or the coil short circuit operation is also referred to as an $f_O$ change/short circuit operation.

The control circuit 250 (see FIG. 5) comprehensively controls the operations of the individual portions within the IC 200. The control performed by the control circuit 250 includes, for example, control on the switching operation of the switching circuit 210, control on the details of the communication operation and the power reception operation of the communication circuit 220 and the power reception circuit 230 and control on whether or not the operations are performed and control on the operation of the change circuit 240. The control circuit 250 incorporates a timer (unillustrated), and thereby can measure the length of a time between arbitrary timings. For example, the timer in the control circuit 250 can measure time during which the change of the resonant frequency $f_O$ to the predetermined frequency $f_M$ or the short-circuiting of the power reception-side coil $R_L$ by the $f_O$ change/short circuit operation is maintained (that is, the measurement of a time $T_M$ which will be described later; see step S207 in FIG. 19).

Incidentally, the control circuit 160 of the power feeding device 1 determines whether or not a foreign object is present on the power feeding table 12, and can control the power transmission circuit 130 such that only when the foreign object is not present, the power transmission operation is performed. The foreign object in the present embodiment differs from the electronic device 2 and the constituent elements of the electronic device 2 (such as the power reception-side coil $R_L$). The foreign object includes an object which can generate a current (current within the foreign object) based on the magnetic field generated in the power transmission-side coil $T_L$ when the power feeding device 1 is brought close thereto. In the present embodiment, the presence of the foreign object may be interpreted so as to mean that the foreign object is present in such a position that an unignorable current based on the magnetic field generated in the power transmission-side coil $T_L$ flows within the foreign object. The current flowing within the foreign object based on the magnetic field generated in the power transmission-side coil $T_L$ generates an electromotive force (or a counter electromotive force) in the coil ($T_L$ or $R_L$) which is opposite the foreign object or is coupled thereto, with the result that the current can exert an unignorable influence on the properties of the circuit including the coil.

FIG. 11A shows a schematic outline view of a foreign object 3 which is one type of foreign object, and FIG. 11B shows a schematic internal configuration diagram of the foreign object 3. The foreign object 3 includes a resonant circuit JJ which is formed with a parallel circuit of a coil $J_L$ and a capacitor $J_C$ and a foreign object internal circuit 300 which is connected to the resonant circuit JJ. The resonant frequency of the resonant circuit JJ is set to the reference frequency. Unlike the electronic device 2, the foreign object 3 is a device which does not correspond to the power feeding device 1. For example, the foreign object 3 is an object (such as a non-contact IC card) which includes a wireless IC tag having an antenna coil (the coil $J_L$) of 13.56 MHz that does not respond to NFC communication. For example, the foreign object 3 is also an electronic device in which an NFC communication function itself is included but in which the function is disabled. For example, a smart phone in which the NFC communication function is included but in which the function is turned off by a software setting can be the foreign object 3. A smart phone in which the NFC communication function is enabled but in which a power reception function is not included is also classified as the foreign object 3.

If in a state where the foreign object 3 described above is arranged on the power feeding table 12, the power feeding device 1 performs the power transmission operation, the foreign object 3 may be destroyed by a strong magnetic field (for example, a magnetic field having a magnetic field intensity of 12 A/m or more) generated in the power transmission-side coil $T_L$. For example, the strong magnetic field at the time of the power transmission operation may increase the terminal voltage of the coil $J_L$ in the foreign object 3 on the power feeding table 12 to 100 to 200V, and unless a foreign object 3 which can withstand such a high voltage is formed, the foreign object 3 is destroyed.

[pFOD Processing (pFOD Processing Before Power Transfer)]

Figure 12:
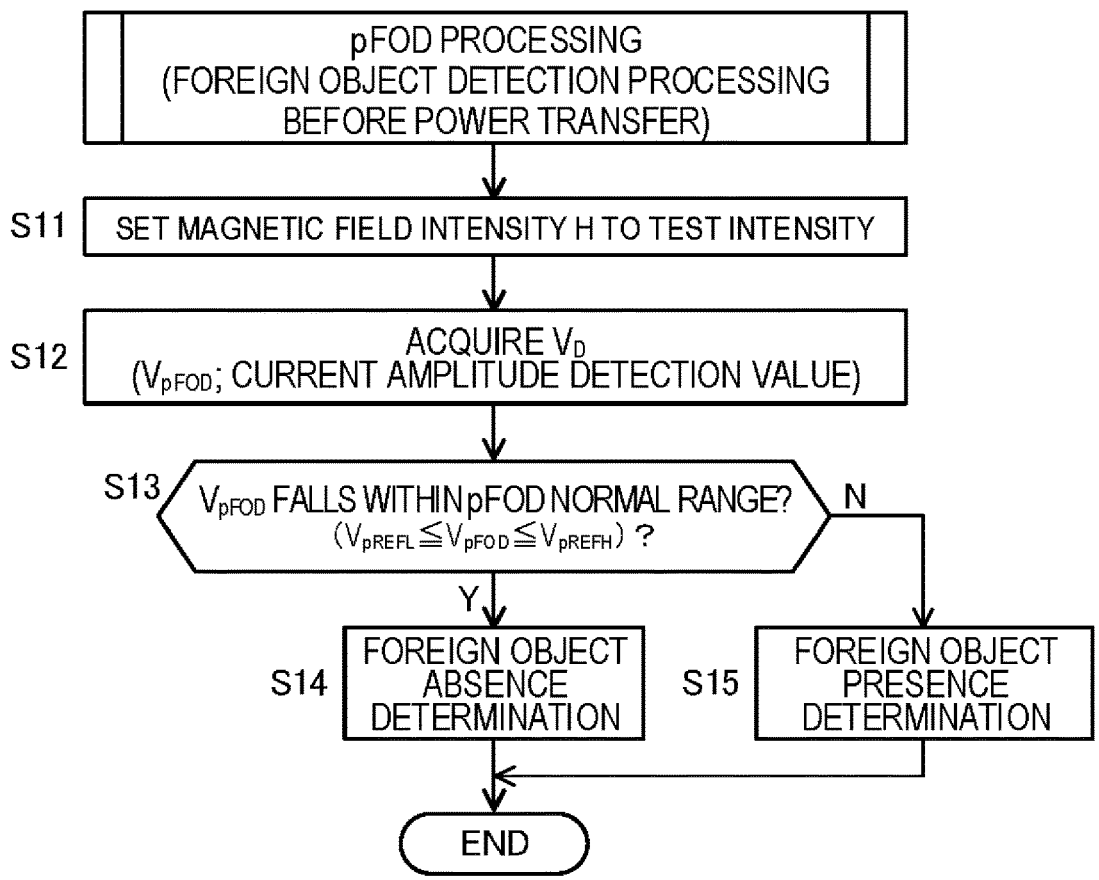
FIG. 12 is an operational flowchart of pFOD processing which is performed in the power feeding device.

Foreign object detection processing for detecting whether or not a foreign object is present will be described with reference to FIG. 12. FIG. 12 is a flowchart of the foreign object detection processing (hereinafter referred to as pFOD processing) which is performed before the power transfer by the power feeding device 1.

When the pFOD processing is performed, the power transmission circuit 130 is connected to the resonant circuit TT. In the pFOD processing, the control circuit 160 first sets, in step S11, the magnetic field intensity H of the power transmission-side coil $T_L$ to a predetermined test intensity. The magnetic field intensity H is the intensity of a magnetic field generated in the power transmission-side coil $T_L$, and more specifically, the magnetic field intensity H indicates the magnetic field intensity of an alternating magnetic field which is generated in the power transmission-side coil $T_L$ and which oscillates at the reference frequency. The setting of the magnetic field intensity H to the test intensity means to control the power transmission circuit 130 so that a predetermined test alternating current signal (test alternating current voltage) is supplied to the resonant circuit TT, and hence to make the power transmission-side coil $T_L$ generate a test magnetic field as the alternating magnetic field which has the test intensity and which oscillates at the reference frequency. The test intensity which is the intensity of the test magnetic field is considerably lower than the intensity of the magnetic field (that is, the intensity of the power transmission magnetic field; for example, 45 to 60 A/m) generated in the power transmission-side coil $T_L$ in the power transfer (that is, the power transmission operation), and falls within a range from a lower limit value of "1.5 A/m" to an upper limit value of "7.5 A/m" in a communication magnetic field intensity. Hence, the foreign object 3 is prevented from being subjected to destruction or the like by the test magnetic field or is unlikely to be subjected thereto. The control circuit 160 controls the amplification factor of the amplifier 132 (see FIG. 7) and thereby can variably set the magnetic field intensity H. The amplification factor of the amplifier 132 is preferably controlled such that when the test magnetic field is generated, the predetermined test alternating current voltage is supplied and applied to the resonant circuit TT and that when the power transmission magnetic field is generated, a predetermined power transmission alternating current voltage which has a larger amplitude than the test alternating current voltage is supplied and applied to the resonant circuit TT.

In step S12 subsequent to step S11, the control circuit 160 uses the load detection circuit 140 so as to acquire, as a current amplitude detection value $V_{pFOD}$, the voltage value $V_D$ when the test magnetic field is generated. The current amplitude detection value $V_{pFOD}$ has a value corresponding to the amplitude of the current flowing through the power transmission-side coil $T_L$ when the test magnetic field is generated in the power transmission-side coil $T_L$. During a period in which the pFOD processing is performed, according to an instruction from the power feeding device 1 through the NFC communication, in the electronic device 2, the $f_O$ change/short circuit operation (the resonant frequency change operation or the coil short circuit operation) is performed. Hence, the resonant circuit RR (the power reception-side coil $R_L$) does not substantially function as a load for the power transmission-side coil $T_L$, and thus the current amplitude detection value $V_{pFOD}$ is prevented from being reduced or is hardly reduced.

In step S13 subsequent to step S12, the control circuit 160 determines whether or not the current amplitude detection value $V_{pFOD}$ falls within a predetermined pFOD normal range. Then, when the current amplitude detection value $V_{pFOD}$ falls within the pFOD normal range, the control circuit 160 determines that the foreign object 3 is not present on the power feeding table 12 (step S14). This determination is referred to as a foreign object absence determination. On the other hand, when the current amplitude detection value $V_{pFOD}$ falls outside the pFOD normal range, the control circuit 160 determines that the foreign object 3 is present on the power feeding table 12 (step S15). This determination is referred to as a foreign object presence determination. When the foreign object absence determination is made, the control circuit 160 determines that the power transmission operation can be performed by the power transmission circuit 130 so as to allow the performance of the power transmission operation (the power transmission using the resonant circuit TT) whereas when the foreign object presence determination is made, the control circuit 160 determines that the power transmission operation cannot be performed by the power transmission circuit 130 so as to prohibit the performance of the power transmission operation. When the control circuit 160 determines that the power transmission operation can be performed, in the power transmission operation, the control circuit 160 can control the power transmission circuit 130 such that a predetermined power transmission magnetic field is generated in the power transmission-side coil $T_L$.

The pFOD normal range is a range which is equal to or more than a predetermined lower limit value $V_{pREFL}$ but equal to or less than a predetermined upper limit value $V_{pREFH}$ ($0<V_{pREFL}<V_{pREFH}$). Hence, when a determination inequality "$V_{pREFL} \le V_{pFOD} \le V_{pREFH}$" is satisfied, the foreign object absence determination is made whereas when the determination inequality is not satisfied, the foreign object presence determination is made.

In a case where the foreign object 3 is present on the power feeding table 12 when the pFOD processing is performed, the resonant circuit JJ (the coil $J_L$) of the foreign object 3 functions as a load for the power transmission-side coil $T_L$, with the result that as compared with a case where the foreign object 3 is not present on the power feeding table 12, the current amplitude detection value $V_{pFOD}$ is reduced.

As the foreign object, a foreign object 3a (unillustrated) which is different from the foreign object 3 can also be considered. The foreign object 3a is, for example, a metal body (an aluminum foil or an aluminum plate) which is formed so as to contain aluminum or a metal body which is formed so as to contain copper. In a case where the foreign object 3a is present on the power feeding table 12 when the pFOD processing is performed, as compared with a case where the foreign object 3a is not present on the power feeding table 12, the current amplitude detection value $V_{pFOD}$ is increased by electrical and magnetic action.

Before the power transfer is performed, the lower limit value $V_{pREFL}$ and the upper limit value $V_{pREFH}$ are previously set and stored in the memory 150 through experiments and the like such that when the foreign object 3 is present on the power feeding table 12, the current amplitude detection value $V_{pFOD}$ falls below the lower limit value $V_{pREFL}$, that when the foreign object 3a is present on the power feeding table 12, the current amplitude detection value $V_{pFOD}$ exceeds the upper limit value $V_{pREFH}$ and that when the foreign object (3 or 3a) is not present on the power feeding table 12, the current amplitude detection value $V_{pFOD}$ falls within the pFOD normal range.

When the power transmission magnetic field is generated in a state where the foreign object 3a is present on the power feeding table 12, power is absorbed by the foreign object 3a such that the foreign object 3a may generate heat. In the present embodiment, since it is assumed that the reference frequency serving as a carrier frequency in the power transfer is 13.56 MHz, it can be said that it is highly unlikely that the foreign object 3a generates heat. Hence, a configuration may be adopted in which without any consideration being given to the presence of the foreign object 3a, only when the current amplitude detection value $V_{pFOD}$ falls below the lower limit value $V_{pREFL}$, the foreign object presence determination is made, and in which when the current amplitude detection value $V_{pFOD}$ is equal to or more than the lower limit value $V_{pREFL}$, the foreign object absence determination is constantly made (in other words, the upper limit value $V_{pREFH}$ may be abolished). However, in the invention related to the present embodiment, the reference frequency is not limited to 13.56 MHz, and when the reference frequency is set to, for example, several hundred kHz, it is highly likely that the foreign object 3a generates heat, with the result that it is preferable to adopt the above method in which not only the lower limit value $V_{pREFL}$ but also the upper limit value $V_{pREFH}$ is determined to be within the pFOD normal range.

Figure 13:
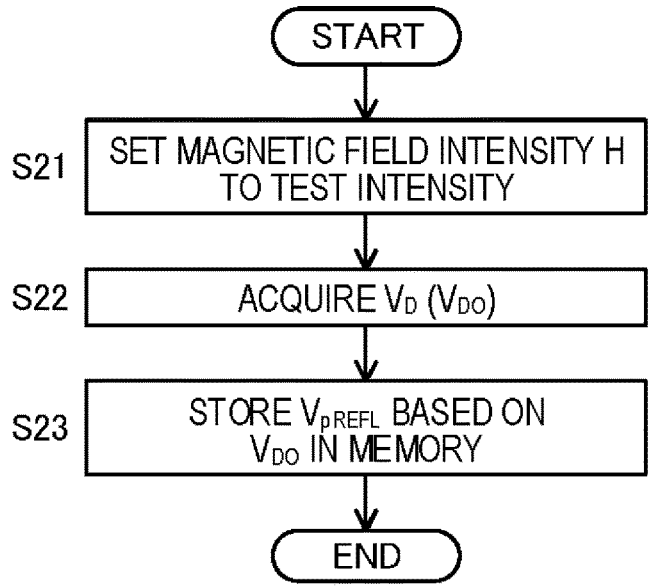
FIG. 13 is an operational flowchart of initial setting processing which is performed in the power feeding device.

An additional description will be given of the method of determining the lower limit value $V_{pREFL}$. The lower limit value $V_{pREFL}$ is determined in initial setting processing. FIG. 13 is an operational flowchart of the initial setting processing. The initial setting processing is performed by the IC 100 under an initial setting environment below. In the initial setting environment, a load for the power transmission-side coil $T_L$ is not present at all or is small enough to be ignored, and an object (including a coil which is magnetically coupled to the power transmission-side coil $T_L$) which can produce a current by the magnetic field generated in the power transmission-side coil $T_L$ is not present except the constituent components of the power feeding device 1. The separate state of FIG. 1A may be considered to satisfy the initial setting environment. In order to ensure the acquisition of the initial setting environment, for example, the initial setting processing may be performed such as when the power feeding device 1 is manufactured or delivered. However, as long the initial setting environment can be acquired, the initial setting processing can be performed with arbitrary timing.

When the initial setting processing is performed, the power transmission circuit 130 is connected to the resonant circuit TT. Then, in step S21, the magnetic field intensity H of the power transmission-side coil $T_L$ is set to the predetermined test intensity, and then in step S22, in the set state, the voltage value $V_D$ acquired from the A/D converter 144 is obtained as a voltage value $V_{DO}$. Thereafter, in step S23, the lower limit value $V_{pREFL}$ based on the voltage value $V_{DO}$ is stored in the memory 150. The lower limit value $V_{pREFL}$ is set lower than the voltage value $V_{DO}$ such that only under the presence of the foreign object 3, the foreign object presence determination is made in the pFOD processing. For example, it is preferable to make a setting such that "$V_{pREFL}=V_{DO}-\Delta V$" or "$V_{pREFL}=V_{DO}\times k$". Here, $\Delta V$ is a predetermined positive minute value (however, it is possible to make a setting such that $\Delta V=0$). Here, k is a coefficient which has a positive predetermined value less than 1. The voltage value $V_D$ which can be obtained when under the initial setting environment, the magnetic field intensity H is set to the predetermined test intensity can be estimated in a design stage. Based on the value derived by this estimation, without the initial setting processing being performed, the lower limit value $V_{pREFL}$ may be determined and stored in the memory 150.

Consider first to fourth cases on the detection of the foreign object 3 with reference to FIGS. 14A to 14D. In the first case, only the electronic device 2 is present on the power feeding table 12. In the second case, the electronic device 2 and the foreign object 3 are present on the power feeding table 12. In the third case, only the foreign object 3 is present on the power feeding table 12. In the fourth case, neither the electronic device 2 nor the foreign object 3 is present on the power feeding table 12.

As described previously, since during the period in which the pFOD processing is performed, in the electronic device 2, the $f_O$ change/short circuit operation is performed, in the first case, a load for the power transmission-side coil $T_L$ is sufficiently reduced (that is, the state as if the electronic device 2 were not present on the power feeding table 12 is entered), and thus the current amplitude detection value $V_{pFOD}$ is sufficiently increased, with the result that the foreign object absence determination is made. On the other hand, in the second case, although the resonant frequency of the resonant circuit RR is changed to the frequency $f_M$ or the power reception-side coil $R_L$ is short-circuited, since the foreign object 3 continues to be present as the load for the power transmission-side coil $T_L$ (since the resonant frequency of the resonant circuit JJ in the foreign object 3 remains the reference frequency), the current amplitude detection value $V_{pFOD}$ is sufficiently decreased, with the result that the foreign object presence determination is made.

In the third and fourth cases, since the electronic device 2 which responds to the NFC communication is not present on the power feeding table 12, the power transmission operation is not necessary in the first place, and thus the pFOD processing itself is not performed. The power feeding device 1 can determine whether or not the electronic device 2 which can handle the power transfer is present on the power feeding table 12 by the NFC communication. The state where the foreign object 3 is present on the power feeding table 12 is not limited to a state where the foreign object 3 is in direct contact with the power feeding table 12. For example, as shown in FIG. 15, a state where the electronic device 2 is present on the power feeding table 12 so as to be in direct contact with the power feeding table 12 and where the foreign object 3 is present on the electronic device 2 also belongs to the state where the foreign object 3 is present on the power feeding table 12 as long as the foreign object presence determination is made.

Figure 16:
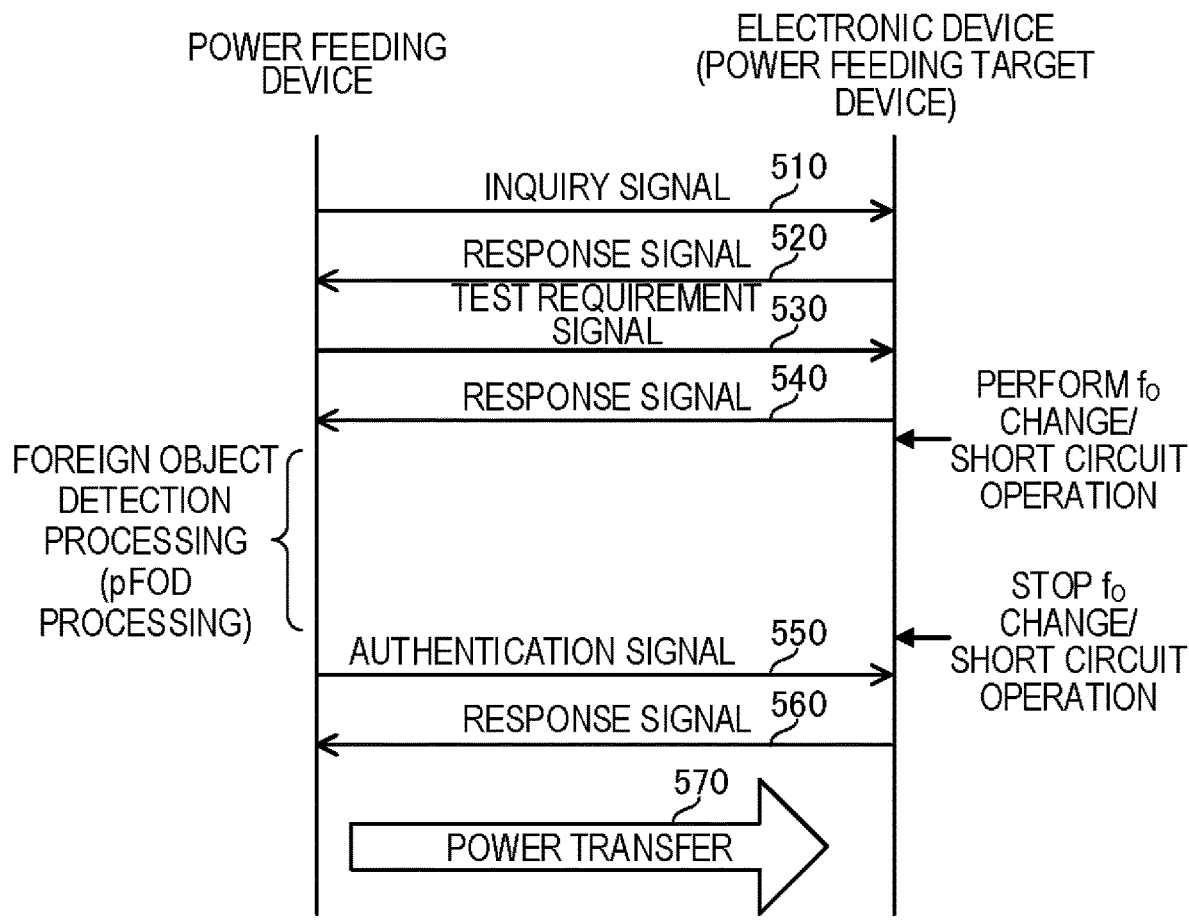
FIG. 16 is a diagram for illustrating the exchange of signals between the power feeding device and the electronic device in the first embodiment of the present invention.

[Exchange of Signals Until Power Transfer: FIG. 16]

The exchange of signals between the devices 1 and 2 until the power transfer is performed will be described with reference to FIG. 16. In the following description, unless otherwise described, it is assumed that the electronic device 2 is present on the power feeding table 12 in the reference arrangement state (FIG. 1B).

First, the power feeding device 1 serves as the transmission side and the electronic device 2 serves as the reception side, and the power feeding device 1 (the IC 100) transmits, by the NFC communication, an inquiry signal 510 to a device on the power feeding table 2 (hereinafter also referred to as a power feeding target device). The power feeding target device includes the electronic device 2, and can include the foreign object 3. The inquiry signal 510 includes, for example, a signal for inquiring the unique identification information of the power feeding target device, a signal for inquiring whether the power feeding target device is in a state where the power feeding target device can perform the NFC communication and a signal for inquiring whether the power feeding target device can receive power or the power feeding target device requires the transmission of power.

The electronic device 2 (the IC 200) which receives the inquiry signal 510 transmits, by the NFC communication, to the power feeding device 1, a response signal 520 for responding to the details of the inquiry in the inquiry signal 510. The power feeding device 1 (the IC 100) which receives the response signal 520 analyzes the response signal 520, and when the power feeding target device can perform the NFC communication and can receive power or requires the transmission of power, the power feeding device 1 transmits a test requirement signal 530 to the power feeding target device by the NFC communication. The electronic device 2 (the IC 200) serving as the power feeding target device which receives the test requirement signal 530 transmits a response signal 540 for the test requirement signal 530 to the power feeding device 1 by the NFC communication, and then immediately performs the $f_O$ change/short circuit operation (the resonant frequency change operation or the coil short circuit operation). The test requirement signal 530 is, for example, a signal for requiring the performance of the $f_O$ change/short circuit operation or providing an instruction to perform it, and the control circuit 250 of the electronic device 2 makes the resonant state change circuit 240 perform the $f_O$ change/short circuit operation by being triggered by the reception of the test requirement signal 530. Before the reception of the test requirement signal 530, the $f_O$ change/short circuit operation is not performed. As long as the test requirement signal 530 triggers the performance of the $f_O$ change/short circuit operation, the test requirement signal 530 may be any signal, and the test requirement signal 530 may be included in the inquiry signal 510.

The power feeding device 1 (the IC 100) which receives the response signal 540 performs the pFOD processing described above. During the period in which the pFOD processing is performed, the electronic device 2 (the IC 200) continues to perform the $f_O$ change/short circuit operation. Specifically, the electronic device 2 (the IC 200) uses the incorporated timer so as to maintain the performance of the $f_O$ change/short circuit operation only for a time corresponding to the length of a period in which the pFOD processing is performed, and then stops the $f_O$ change/short circuit operation.

When in the pFOD processing, it is determined that the foreign object is not present on the power feeding table 12, the power feeding device 1 (the IC 100) transmits an authentication signal 550 to the power feeding target device by the NFC communication. The authentication signal 550 includes, for example, a signal for notifying the power feeding target device of the fact that the power transmission is performed from now. The electronic device 2 (the IC 200) which receives the authentication signal 550 transmits a response signal 560 corresponding to the authentication signal 550 to the power feeding device 1 by the NFC communication. The response signal 560 includes, for example, a signal for providing a notification that the details indicated by the authentication signal 550 are recognized or a signal for allowing the details indicated by the authentication signal 550. The power feeding device 1 (the IC 100) which receives the response signal 560 connects the power transmission circuit 130 to the resonant circuit TT so as to perform the power transmission operation, with the result that power transfer 570 is realized.

Figure 17:
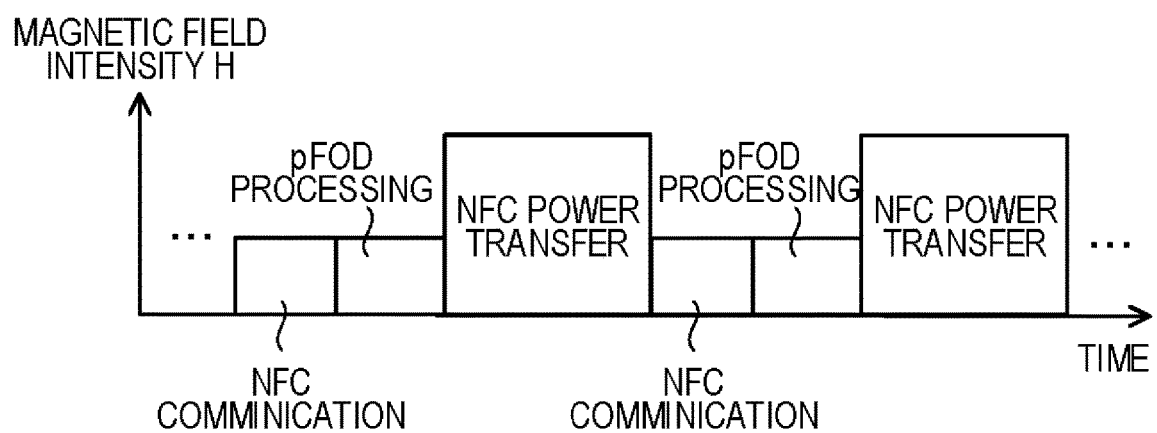
FIG. 17 is a diagram showing how the NFC communication, the pFOD processing and the power transfer are performed sequentially and repeatedly in the first embodiment of the present invention.

Although in the first case of FIG. 14A, the power transfer 570 is performed by the procedure described above, in the second case of FIG. 14B, the processing proceeds up to the transmission and reception of the response signal 540 but in the pFOD processing, it is determined that the foreign object is present on the power feeding table 12, with the result that the power transfer 570 is not performed. One round of the power transfer 570 may be performed only for a predetermined time, and a series of processing steps from the transmission of the inquiry signal 510 to the power transfer 570 may be repeatedly performed. In actuality, as shown in FIG. 17, the NFC communication, the pFOD processing and the power transfer (NFC power transfer) can be performed sequentially and repeatedly. In other words, in the non-contact power feeding system, the operation for performing the NFC communication, the operation for performing the pFOD processing and the operation for performing the power transfer (NFC power transfer) can be sequentially and repeatedly performed in a time division manner.

[Operational Flowchart of Power Feeding Device and Electronic Device]

Figure 18:
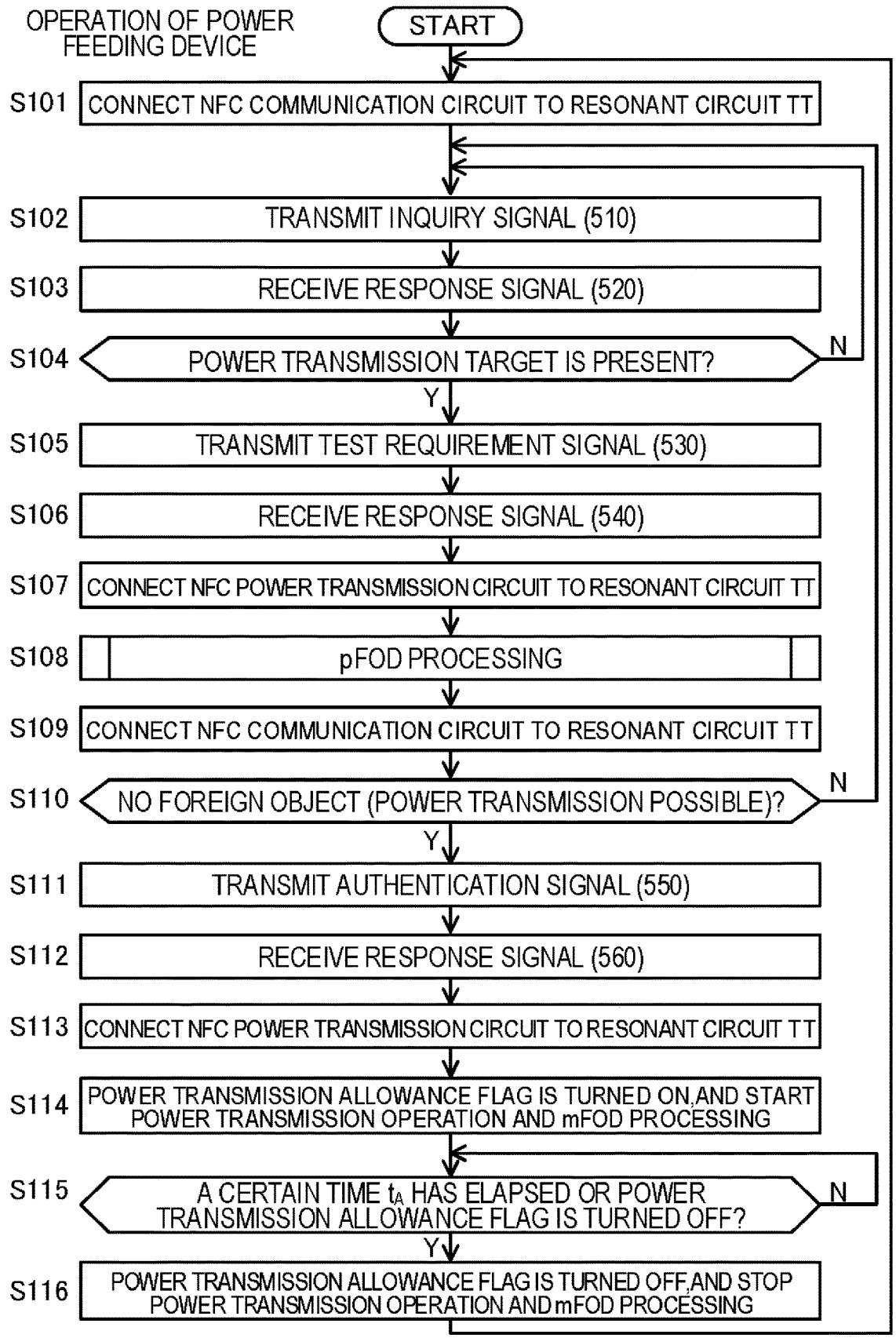
FIG. 18 is an operational flowchart of the power feeding device in the first embodiment of the present invention.

The flow of the operation of the power feeding device 1 will then be described. FIG. 18 is an operational flowchart of the power feeding device 1. The operations of the communication circuit 120 and the power transmission circuit 130 are performed under control of the control circuit 160.

When the power feeding device 1 is started up, in step S101, the control circuit 160 first connects the communication circuit 120 to the resonant circuit TT through the control of the switching circuit 110. Then, in step S102, the control circuit 160 transmits the inquiry signal 510 to the power feeding target device by the NFC communication using the communication circuit 120 and the resonant circuit TT, and is thereafter placed, in step S103, on standby for the reception of the response signal 520. When the response signal 520 is received in the communication circuit 120, the control circuit 160 analyzes the response signal 520, and when the power feeding target device can perform the NFC communication and can receive power or requires the transmission of power, the control circuit 160 determines that the power transmission target is present (Y in step S104), the process proceeds to step S105 whereas when the power transmission target is not present (N in step S104), the process returns to step S102.

In step S105, the control circuit 160 transmits the test requirement signal 530 to the power feeding target device by the NFC communication using the communication circuit 120 and the resonant circuit TT, and is thereafter placed, in step S106, on standby for the reception of the response signal 540. When the response signal 540 is received in the communication circuit 120, in step S107, the control circuit 160 connects the power transmission circuit 130 to the resonant circuit TT through the control of the switching circuit 110, and then performs the pFOD processing in step S108.

After the pFOD processing, in step S109, the control circuit 160 connects the communication circuit 120 to the resonant circuit TT through the control of the switching circuit 110, and the process proceeds to step S110. When in the pFOD processing of step S108, the foreign object presence determination is made, the process returns from step S110 to step S102 whereas when the foreign object absence determination is made, the process proceeds from step S110 to step S111.

In step S111, the control circuit 160 transmits the authentication signal 550 to the power feeding target device by the NFC communication using the communication circuit 120 and the resonant circuit TT, and is thereafter placed, in step S112, on standby for the reception of the response signal 560. When the response signal 560 is received in the communication circuit 120, in step S113, the control circuit 160 connects the power transmission circuit 130 to the resonant circuit TT through the control of the switching circuit 110, and then the process proceeds to step S114.

The control circuit 160 sets, in step S114, a power transmission allowance flag on, and starts the power transmission operation and mFOD processing, and thereafter the process proceeds to step S115. Although details will be described later, whether or not the foreign object is present in the power transfer is detected by the mFOD processing, and when the foreign object is detected, the power transmission allowance flag is turned off. The control circuit 160 measures the time which has elapsed since the time when the power transmission operation is started, and in step S115, compares the elapsed time with a predetermined time $t_A$ (for example, 10 minutes) and checks the state of the power transmission allowance flag. When the elapsed time reaches the predetermined time $t_A$ or when the power transmission allowance flag is set off by the mFOD processing, the process proceeds to step S116. In step S116, the control circuit 160 switches the power transmission allowance flag from on to off or keeps the power transmission allowance flag off, and stops the power transmission operation and the mFOD processing, and thereafter the process returns to step S101.

Figure 19:
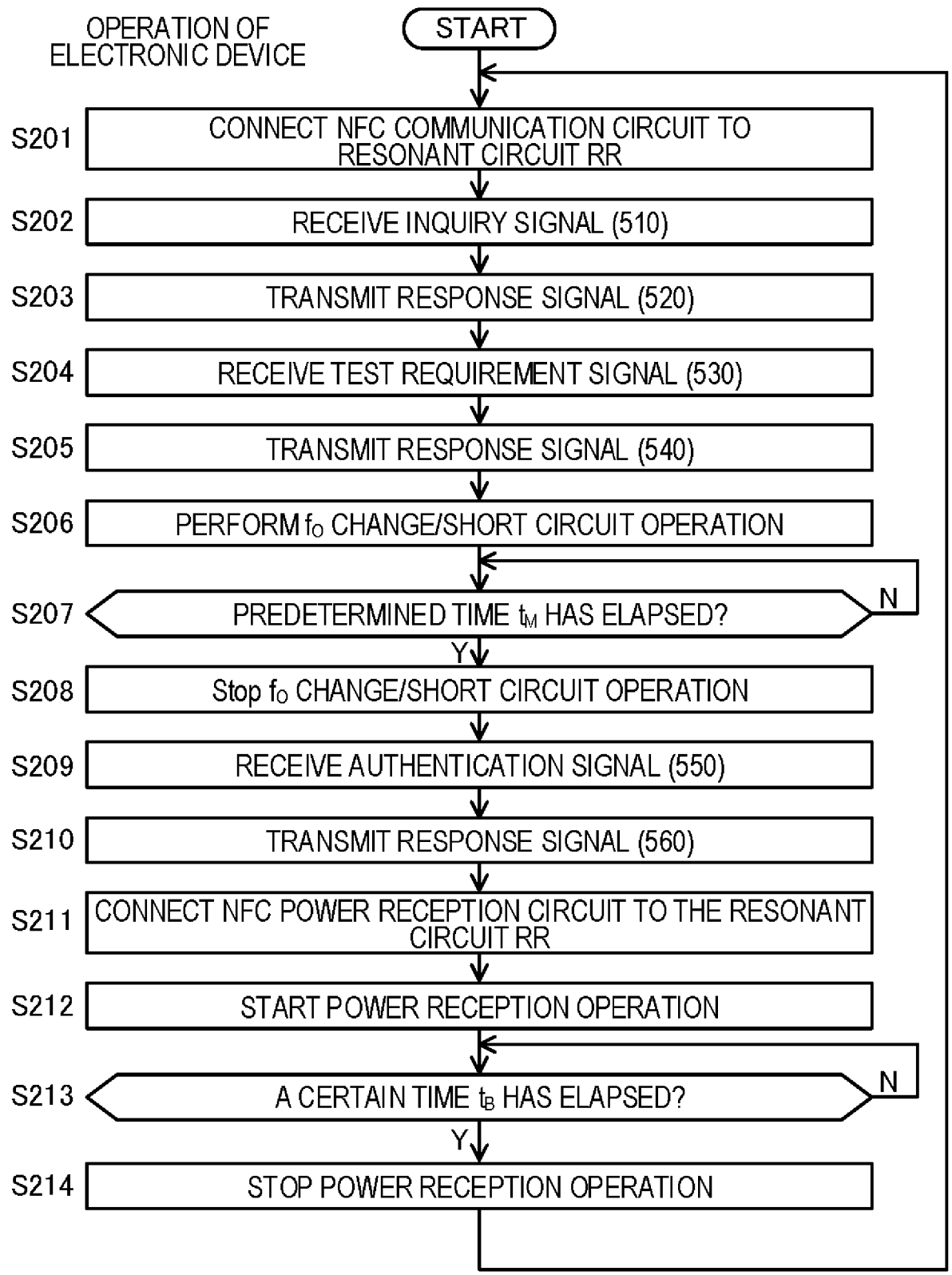
FIG. 19 is an operational flowchart of the electronic device which is operated according to the operation of FIG. 18.

The flow of the operation of the electronic device 2 will then be described. FIG. 19 is an operational flowchart of the electronic device 2, and the processing starting from step S201 is performed as the operation of the power feeding device 1 shown in FIG. 18 is performed. The operations of the communication circuit 220 and the power reception circuit 230 are performed under control of the control circuit 250.

When the electronic device 2 is started up, in step S201, the control circuit 250 first connects the communication circuit 220 to the resonant circuit RR through the control of the switching circuit 210. When the electronic device 2 is started up, the $f_O$ change/short circuit operation is not performed. Then, in step S202, the control circuit 250 uses the communication circuit 220 so as to be on standby for the reception of the inquiry signal 510. When the inquiry signal 510 is received in the communication circuit 220, in step S203, the control circuit 250 analyzes the inquiry signal 510 so as to generate the response signal 520, and transmits the response signal 520 to the power feeding device 1 by the NFC communication using the communication circuit 220. Here, when the control circuit 250 checks the state of the battery 21, then the battery 21 is not fully charged and an abnormality is not recognized in the battery 21, the control circuit 250 includes, in the response signal 520, a signal for being able to receive power or requiring the transmission of power. On the other hand, when the battery 21 is fully charged or an abnormality is recognized in the battery 21, the control circuit 250 includes, in the response signal 520, a signal indicating that it is impossible to receive power.

Then, in step S204, when the test requirement signal 530 is received in the communication circuit 220, the process proceeds to step S205. In step S205, the control circuit 250 transmits the response signal 540 to the power feeding device 1 by the NFC communication using the communication circuit 220, and then in step S206, uses the resonant state change circuit 240 so as to perform the $f_O$ change/short circuit operation. In other words, the resonant frequency $f_O$ is changed from the reference frequency to the frequency $f_M$ or the power reception-side coil $R_L$ is short-circuited. The control circuit 250 measures the time which has elapsed since the time when the $f_O$ change/short circuit operation is started (step S207), and stops the $f_O$ change/short circuit operation when the elapsed time reaches a predetermined time $t_M$ (step S208). In other words, the resonant frequency $f_O$ is returned to the reference frequency or the short circuit of the power reception-side coil $R_L$ is cancelled. Thereafter, the process proceeds to step S209. The time $t_M$ is previously set such that during the period in which the pFOD processing is performed in the power feeding device 1 (that is, during the period in which the test magnetic field is generated), the performance of the $f_O$ change/short circuit operation is maintained, and that immediately after the period is completed, the $f_O$ change/short circuit operation is stopped. In the test requirement signal 530, the time $t_M$ may be specified.

In step S209, the control circuit 250 uses the communication circuit 220 so as to be on standby for the reception of the authentication signal 550. When the authentication signal 550 is received in the communication circuit 220, in step S210, the control circuit 250 transmits the response signal 560 for the authentication signal 550 to the power feeding device 1 by the NFC communication using the communication circuit 220. When the foreign object is present on the power feeding table 12, since the authentication signal 550 is not transmitted from the power feeding device 1 (see step S110 in FIG. 18), the process is preferably returned to step S201 in a case where the authentication signal 550 is not received for a certain period of time in step S209.

After the transmission of the response signal 560, in step S211, the control circuit 250 connects the power reception circuit 230 to the resonant circuit RR through the control of the switching circuit 210, and then in step S212, starts the power reception operation using the power reception circuit 230. The control circuit 250 measures the time which has elapsed since the time when the power reception operation is started, and compares the elapsed time with a predetermined time $t_B$ (step S213). Then, when the elapsed time reaches the time $t_B$ (Y in step S213), in step S214, the control circuit 250 stops the power reception operation, and the process returns to step S201.

The time $t_B$ is previously determined or is specified in the authentication signal 550 such that the period during which the power reception operation is performed substantially coincides with the period during which the power transmission operation is performed in the power feeding device 1. A configuration may be adopted in which after the start of the power reception operation, the control circuit 250 monitors a charging current for the battery 21, and in which when the charging current value becomes equal to or less than a predetermined value, the control circuit 250 determines that the power transmission operation is completed so as to stop the power reception operation and transfer to step S201.

[mFOD Processing]

After the start of the power transmission operation, the foreign object may be placed on the power feeding table 12. The mFOD processing functions as the foreign object detection processing in the power transfer, and whether or not the foreign object is present in the power transfer is continuously monitored by the mFOD processing.

Figure 20:
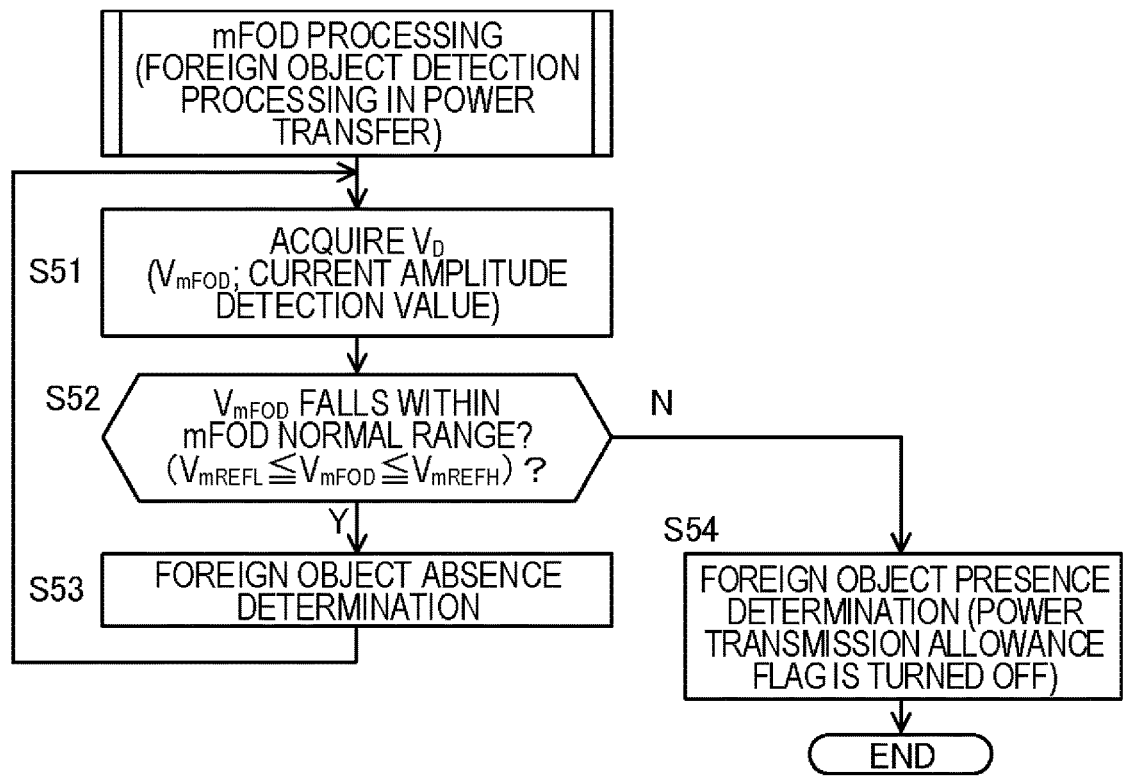
FIG. 20 is an operational flowchart of mFOD processing which is performed in the power feeding device.

FIG. 20 is an operational flowchart of the mFOD processing. During the period in which the power transmission operation is performed, the control circuit 160 repeatedly performs the mFOD processing in FIG. 20. In the mFOD processing, the control circuit 160 first acquires, in step S51, the latest voltage value $V_D$ as a current amplitude detection value $V_{mFOD}$. The current amplitude detection value $V_{mFOD}$ has a value corresponding to the amplitude of the current flowing through the power transmission-side coil $T_L$ when the power transmission magnetic field is generated in the power transmission-side coil $T_L$. Then, in step S52, the control circuit 160 determines whether or not the current amplitude detection value $V_{mFOD}$ falls within a predetermined mFOD normal range. When the current amplitude detection value $V_{mFOD}$ falls within the mFOD normal range, the foreign object absence determination is made (step S53), the process returns to step S51 and the processing in steps S51 and S52 is repeated whereas when the current amplitude detection value $V_{mFOD}$ falls outside the mFOD normal range, in step S54, the foreign object presence determination is made such that the power transmission allowance flag is set off. The power transmission allowance flag is controlled by the control circuit 160 so as to be set on or off. When the power transmission allowance flag is on, the control circuit 160 allows the performance of the power transmission operation whereas when the power transmission allowance flag is off, the control circuit 160 prohibits the performance of the power transmission operation or stops the power transmission operation.

The mFOD normal range is a range which is equal to or more than a predetermined lower limit value $V_{mREFL}$ but equal to or less than a predetermined upper limit value $V_{mREFH}$ ($0<V_{mREFL}<V_{mREFH}$). Hence, when a determination inequality "$V_{mREFL} \leq V_{mFOD} \leq V_{mREFH}$" is satisfied, the foreign object absence determination is made whereas when the determination inequality is not satisfied, the foreign object presence determination is made.

Figure 21A:
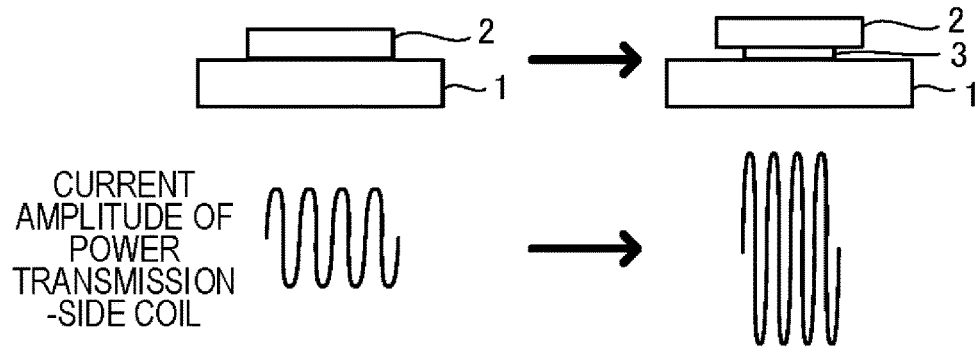
FIGS. 21A and 21B are diagrams for illustrating a change in the current amplitude of a power transmission-side coil when the foreign object is inserted in the power transfer.

Consider, with reference to FIG. 21A, for example, a case where when the power transmission operation is performed, the foreign object 3 which is formed as a non-contact IC card is inserted between the power feeding table 12 of the power feeding device 1 and the electronic device 2. In this case, the power reception-side coil $R_L$ of the electronic device 2 is magnetically coupled to the coil $J_L$ of the foreign object 3, and thus the resonant frequency of the resonant circuit RR in the electronic device 2 is displaced from the reference frequency (13.56 MHz) together with the resonant frequency of the resonant circuit JJ in the foreign object 3. Then, the power received in the power reception-side coil $R_L$ is lowered, and thus the load of the power transmission seen from the power transmission-side coil $T_L$ is reduced, with the result that the amplitude of the current flowing through the power transmission-side coil $T_L$ is increased (in this case, the upper limit value $V_{mREFH}$ is preferably determined such that "$V_{mREFH} < V_{mFOD}$").

Figure 21B:
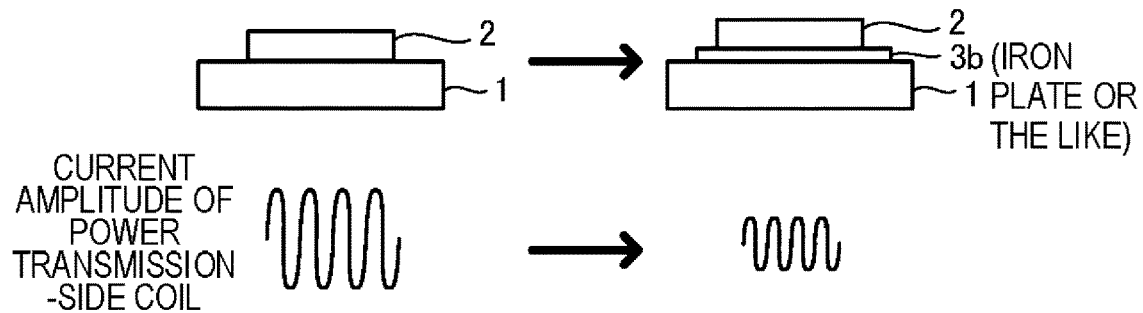

For example, with reference to FIG. 21B, when the power transmission operation is performed, if a foreign object 3b serving as an iron plate or a ferrite sheet is inserted between the power feeding table 12 of the power feeding device 1 and the electronic device 2, a current flows within the foreign object 3b through electrical and magnetic action, with the result that the amplitude of the current flowing through the power transmission-side coil $T_L$ is decreased (in this case, the lower limit value $V_{mREFL}$ is preferably determined such that "$V_{mFOD} < V_{mREFL}$").

As described above, a change in the current amplitude detection value $V_{mFOD}$ is produced by whether or not the foreign object including the foreign objects 3 and 3b is present. Through experiments and the like with the assumption of the types of foreign objects and the states of arrangement which can be considered, the lower limit value $V_{mREFL}$ and the upper limit value $V_{mREFH}$ which are previously appropriately determined are preferably stored in the memory 150. To what degree the current amplitude detection value $V_{mFOD}$ is changed by the presence of the foreign object in the power transfer is estimated by theoretical calculation, and based on the result of the estimation, the lower limit value $V_{mREFL}$ and the upper limit value $V_{mREFH}$ may be determined and stored in the memory 150 without need for the experiments. Here, for example, with reference to the center value of the mFOD normal range, an object which changes the current amplitude detection value $V_{mFOD}$ by a predetermined rate of change or more may be defined as the foreign object.

The amplification factor of the amplifier 143 shown in FIG. 7 is variable. The amplitude of the current flowing through the power transmission-side coil $T_L$ when the power transmission operation and the mFOD processing are performed is considerably larger than that when the pFOD processing is performed. Hence, when the mFOD processing is performed, the control circuit 160 sets the amplification factor of the amplifier 143 smaller than that when the pFOD processing is performed, and thus the pFOD processing and the mFOD processing are set substantially equal to each other in the input signal range of the A/D converter 144.

For example, between the envelope detector 142 and the A/D converter 144 (more specifically, between the envelope detector 142 and the amplifier 143 or between the amplifier 143 and the A/D converter 144), a high-frequency reduction circuit (unillustrated) may be inserted. In this case, amplitude information which is obtained by performing high-frequency reduction processing (in other words, averaging processing or low-pass filtering) on a voltage drop signal for the sense resistor 141 can be obtained as the voltage value $V_D$ from the A/D converter 144. In the high-frequency reduction processing here, the signal components of relatively low frequencies in the voltage drop signal for the sense resistor 141 are passed whereas the signal components of relatively high frequencies are reduced (attenuated). By the high-frequency reduction processing, the performance of control on the prohibition of the power transmission caused such as by noises or light vibrations in the electronic device 2 on the power feeding table 12 is reduced.

For example, instead of the provision of the high-frequency reduction circuit between the envelope detector 142 and the A/D converter 144, high-frequency reduction processing by computation may be performed on the voltage value $V_D$ of the output signal of the A/D converter 144, and the voltage value $V_D$ after the high-frequency reduction processing may be used as the current amplitude detection value $V_{mFOD}$ (the same may be true for the current amplitude detection value $V_{pFOD}$ in the pFOD processing). The high-frequency reduction processing by computation is performed in the control circuit 160, and the signal components of relatively low frequencies in the output signal of the A/D converter 144 are passed whereas the signal components of relatively high frequencies are reduced (attenuated).

The role of the mFOD processing is not limited to the determination as to whether or not the foreign object is present. In other words, the mFOD processing plays a role in turning off the power transmission allowance flag under any conditions which are unsuitable for the continuation of the power transmission operation such as a condition in which the current amplitude detection value $V_{mFOD}$ falls outside the mFOD normal range. For example, when after the start of the power transmission operation, the electronic device 2 is removed from the top of the power feeding table 12, the load of the power transmission seen from the power transmission-side coil $T_L$ is reduced such that the current amplitude detection value $V_{mFOD}$ exceeds the upper limit value $V_{mREFH}$ and thus the power transmission allowance flag is turned off (step S54 in FIG. 20).

As described above, when the transmission of power is performed by the power transmission operation, the control circuit 160 monitors whether or not the current amplitude detection value $V_{mFOD}$ falls outside the mFOD normal range so as to control whether or not the continuation of the power transmission is allowed. In this way, under conditions, such as when the foreign object is placed on the power feeding table 12 after the start of the power transmission operation, which are unsuitable for the continuation of the power transmission operation, the power transmission operation is stopped through the mFOD processing, and thus it is possible to prevent the destruction of the foreign object or the like caused by the continuation of the power transmission operation.

«First Consideration on the Present Invention»

The present invention embodied in the first embodiment described above will be considered.

A power transmission device $WA_1$ according to one aspect of the present invention which can transmit power to a power reception device by a magnetic field resonance method includes: a power transmission-side resonant circuit (TT) which includes a power transmission-side coil ($T_L$) that transmits the power; a power transmission circuit (130) which can supply an alternating current voltage to the power transmission-side resonant circuit; a detection circuit (140) which detects the amplitude of a current flowing through the power transmission-side coil; and a control circuit (160) which performs power transmission control on the power by controlling the power transmission circuit, where when the power is transmitted, the control circuit controls, based on the amplitude detection value ($V_{mFOD}$) of the detection circuit, whether or not the continuation of the power transmission is allowed.

A non-contact power feeding system $WA_2$ according to one aspect of the present invention includes: a power transmission device having a power transmission-side resonant circuit (TT) including a power transmission-side coil ($T_L$) that transmits power; and a power reception device having a power reception-side resonant circuit (RR) including a power reception-side coil ($R_L$) that receives the power and can transmit and receive the power by a magnetic field resonance method, where the power transmission device includes: a power transmission circuit (130) which can supply an alternating current voltage to the power transmission-side resonant circuit; a detection circuit (140) which detects the amplitude of a current flowing through the power transmission-side coil; and a control circuit (160) which performs power transmission control on the power by controlling the power transmission circuit, and when the power is transmitted, the control circuit controls, based on the amplitude detection value ($V_{mFOD}$) of the detection circuit, whether or not the continuation of the power transmission is allowed.

In the power transmission device $WA_1$ and the non-contact power feeding system $WA_2$, under conditions, such as when the foreign object is present in a position affected by the magnetic field generated in the power transmission-side coil after the start of the power transmission operation, which are unsuitable for the continuation of the power transmission operation, the power transmission operation can be stopped, and thus it is possible to prevent, for example, the destruction of the foreign object or the like caused by the continuation of the power transmission operation.

Specifically, for example, in the power transmission device $WA_1$ or the non-contact power feeding system $WA_2$, when the power is transmitted, the control circuit preferably monitors whether or not the amplitude detection value of the detection circuit falls outside a predetermined range (mFOD normal range) so as to control whether or not the continuation of the power transmission is allowed.

More specifically, for example, in the power transmission device $WA_1$ or the non-contact power feeding system $WA_2$, when the control circuit detects that the amplitude detection value of the detection circuit falls outside the predetermined range, the control circuit preferably stops the power transmission.

It can be considered that the condition in which the amplitude detection value of the detection circuit falls outside the predetermined range corresponds to the conditions, such as when the foreign object is present in the position affected by the magnetic field generated in the power transmission-side coil, which are unsuitable for the continuation of the power transmission operation. Under such conditions, the power transmission is stopped, and thus it is possible to prevent, for example, the destruction of the foreign object or the like caused by the continuation of the power transmission operation.

For example, preferably, in the power transmission device $WA_1$ or the non-contact power feeding system $WA_2$, when the power is transmitted, the control circuit determines whether or not the amplitude detection value of the detection circuit falls outside the predetermined range so as to determine whether or not a foreign object is present which is different from the power reception device and which can generate a current based on the magnetic field generated in the power transmission-side coil, and when the control circuit determines that the foreign object is present, the control circuit stops the power transmission.

Here, for example, preferably, in the power transmission device $WA_1$ or the non-contact power feeding system $WA_2$, when the power is transmitted, the control circuit determines whether or not the amplitude detection value of the detection circuit exceeds an upper limit value of the predetermined range so as to determine whether or not as the foreign object, a foreign object including a coil is present.

For example, preferably, in the power transmission device $WA_1$, the power reception device includes: a power reception-side resonant circuit (RR) which includes a power reception-side coil ($R_L$) that receives the power; and a change/short circuit (240) which changes the resonant frequency of the power reception-side resonant circuit from a resonant frequency when the power is received or short-circuits the power reception-side coil before the reception of the power, the control circuit (160) includes: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion (pFOD processing) which determines, based on the amplitude detection value ($V_{pFOD}$) of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil and the detection circuit (140) detects, through processing which amplifies a signal indicating the amplitude of the current flowing through the power transmission-side coil, the amplitude, and an amplification factor in the amplification when the power transmission magnetic field is generated in the power transmission-side coil is smaller than an amplification factor in the amplification when the test magnetic field is generated in the power transmission-side coil.

For example, preferably, in the non-contact power feeding system $WA_2$, the power reception device includes a change/short circuit (240) which changes the resonant frequency of the power reception-side resonant circuit from a resonant frequency when the power is received or short-circuits the power reception-side coil before the reception of the power, the control circuit (160) includes: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion (pFOD processing) which determines, based on the amplitude detection value ($V_{pFOD}$) of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil and the detection circuit (140) detects, after processing which amplifies a signal indicating the amplitude of the current flowing through the power transmission-side coil, the amplitude, and an amplification factor in the amplification when the power transmission magnetic field is generated in the power transmission-side coil is smaller than an amplification factor in the amplification when the test magnetic field is generated in the power transmission-side coil.

The second processing portion is provided, and thus it is possible to prevent the power transmission from being performed under conditions, such as when the foreign object is present in the position affected by the magnetic field generated in the power transmission-side coil, which are unsuitable for the performance of the power transmission operation, with the result that it is possible to prevent, for example, the destruction of the foreign object or the like caused by the performance (the start of the performance) of the power transmission. The amplification factor is determined as described above, and thus it is possible to set the signal level after the amplification when the test magnetic field is generated and the signal level after the amplification when the transmission magnetic field is generated substantially equal to each other, with the result that, for example, it is easy to share the circuit which processes the signal after the amplification.

The power feeding device 1 itself in the first embodiment described above may function as the power transmission device according to the present invention or part of the power feeding device 1 in the first embodiment described above may function as the power transmission device according to the present invention. Likewise, the electronic device 2 itself in the first embodiment described above may function as the power reception device according to the present invention or part of the electronic device 2 in the first embodiment described above may function as the power reception device according to the present invention.

Second Embodiment

A second embodiment of the present invention will be described. The second embodiment is an embodiment based on the first embodiment, and for items which are not particularly described in the second embodiment, the description of the first embodiment is also applied to the second embodiment unless otherwise a contradiction arises.

Figure 22:
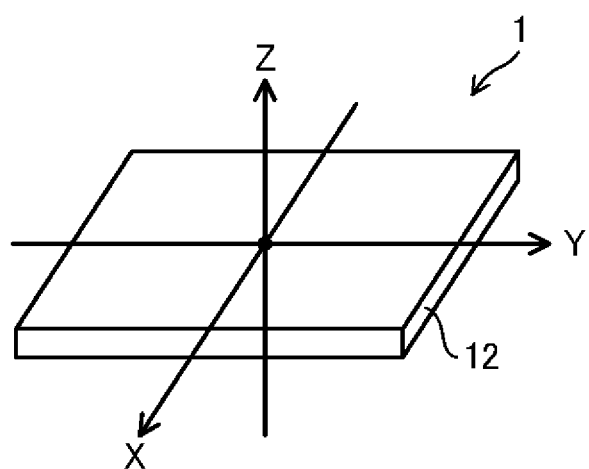
FIG. 22 is a diagram showing a relationship between an X axis, a Y axis, a Z axis and the power feeding table in a second embodiment of the present invention.

As shown in FIG. 22, an X axis, a Y axis and a Z axis which are orthogonal to each other will be defined. A plane parallel to the X axis and the Y axis, a plane parallel to the Y axis and the Z axis and a plane parallel to the Z axis and the X axis may be referred to as an XY plane, a YZ plane and a ZX plane, respectively. The X axis and the Y axis are parallel to the placement surface of the power feeding table 12, and thus the Z axis is orthogonal to the placement surface of the power feeding table 12. The placement surface of the power feeding table 12 is a surface on which the electronic device 2 needs to be placed, and the electronic device 2 and the foreign object can be placed on the placement surface. In the description of the second embodiment and third and fourth embodiments which will be described later and in the drawings referenced therein, unless otherwise described, it is assumed that the electronic device 2 is placed on the placement surface of the power feeding table 12 in the reference arrangement state. In the reference arrangement state, the power feeding device 1 and the electronic device 2 are in a predetermined positional relationship for performing the transmission and reception of power.

Figure 23A:
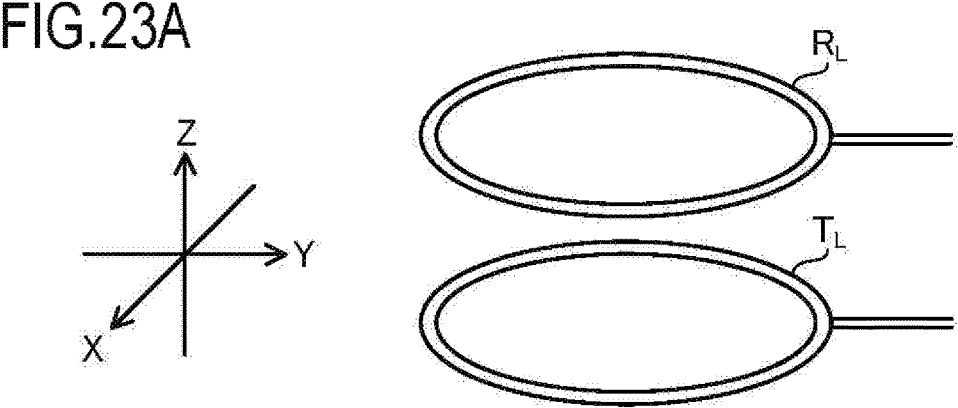
FIGS. 23A and 23B are a schematic perspective view and a schematic cross-sectional view of a power transmission-side coil and a power reception-side coil in the second embodiment of the present invention.
Figure 23B:
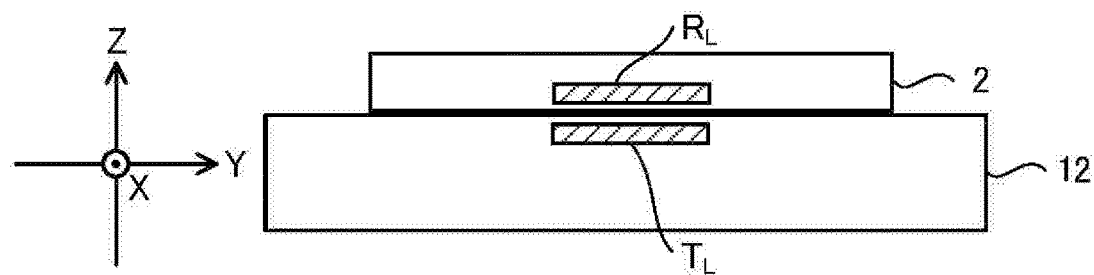
Figure 24A:
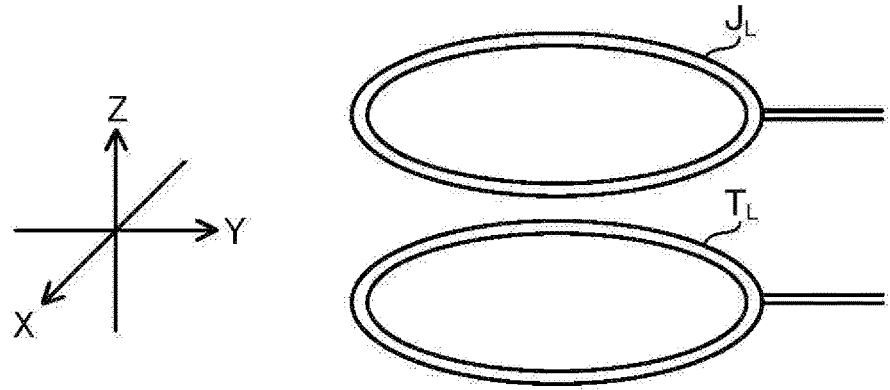
FIGS. 24A and 24B are a schematic perspective view and a schematic cross-sectional view of the power transmission-side coil and the coil of a foreign object in the second embodiment of the present invention.
Figure 24B:
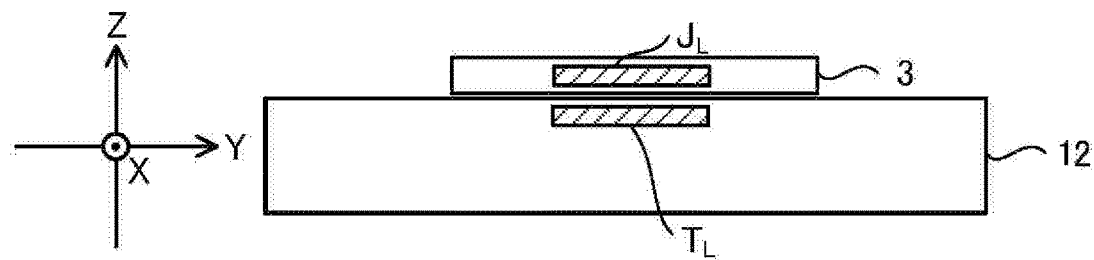

FIGS. 23A and 23B are a schematic perspective view and a schematic cross-sectional view of the power transmission-side coil $T_L$ and the power reception-side coil $R_L$ in the power feeding device 1 and the electronic device 2 in the reference arrangement state. FIGS. 24A and 24B are a schematic perspective view and a schematic cross-sectional view of the coils $T_L$ and $J_L$ in the power feeding device 1 and the foreign object 3 in a state where the foreign object 3 such as a non-contact IC card is placed on the placement surface of the power feeding table 12. In FIGS. 23A and 24A, for simplification of illustration and for prevention of complication thereof, the windings of the coils $T_L$, $R_L$ and $J_L$ are expressed by double circles (the same is true for FIG. 25C and the like which will be described later). In the drawing including the illustration of the coil, a line segment which is extended laterally from the double circle representing the coil indicates the lead wire of the coil. The cross sections in the cross-sectional views of FIGS. 23B and 24B are parallel to the YZ plane. Each of the coils $T_L$, $R_L$ and $J_L$ forms a loop antenna. In the reference arrangement state, the loop surfaces of the loop antennas serving as the coils $T_L$ and $R_L$ (that is, the surfaces in which the windings of the coils $T_L$ and $R_L$ are arranged) are parallel to the XY plane, and thus the center axes of the coils $T_L$ and $R_L$ are parallel to the Z axis. The coil $T_L$ is formed by winding the winding wires (such as copper wires) around the center axis thereof (the same is true for the coils $R_L$ and $J_L$). In a state where the foreign object 3 is placed on the placement surface of the power feeding table 12, the loop surface of the loop antenna serving as the coil $J_L$ (that is, the surface in which the winding of the coil $J_L$ is arranged) is normally parallel to the XY plane as with the coil $T_L$, and thus the center axis of the coil $J_L$ is parallel to the Z axis.

In order for a coupling coefficient between the coils $T_L$ and $R_L$ to be increased, on the XY plane, the coils $T_L$ and $R_L$ have the same shape (however, they can have different shapes). In the present specification, the shape of the coil is a conception which includes the size of the coil. On an arbitrary coil, the size of the coil may be considered to indicate an area which is occupied by the outer periphery of the coil in a direction orthogonal to the center axis of the coil. When the coil forms a loop antenna, an area surrounded by the winding of the coil in the loop surface of the loop antenna (that is, the surface in which the winding of the coil is arranged) corresponds to the size of the coil.

Although in FIG. 23A and the like, the outer peripheral shapes of the coils $T_L$ and $R_L$ (in other words, the outline shapes thereof) are circles, in each of the coils $T_L$ and $R_L$, the outer peripheral shape of the coil is not limited to the circle, and may be oval or polygonal (such as rectangular) or a straight line and a curve may be present together with the outer peripheral shape of the coil in a mixed manner.

In the second embodiment which will be described below, it is assumed that a metal portion (hereinafter referred to as a power reception-side metal portion $MT_2$: unillustrated) is provided in the electronic device 2. In the third and fourth embodiments which will be described later, the same assumption is also made. The power reception-side metal portion $MT_2$ may form the entire enclosure of the electronic device 2 or part thereof. Specifically, for example, the power reception-side metal portion $MT_2$ may be a box-shaped metal case serving as the enclosure of the electronic device 2. Alternatively, for example, the enclosure of the electronic device 2 may be formed of a resin material, and the power reception-side metal portion $MT_2$ may be fixed within the enclosure of the electronic device 2. The power reception-side metal portion $MT_2$ is mainly provided so as to enhance, for example, the structural strength and the texture of the electronic device 2.

The metal of the power reception-side metal portion $MT_2$ is assumed to be aluminum. The metal of the power reception-side metal portion $MT_2$ may be an alloy of aluminum and another metal, that is, an aluminum alloy (for example, a duralumin serving as an alloy of aluminum and copper).

However, as long as the same influence as the case where the power reception-side metal portion $MT_2$ is formed of aluminum or an aluminum alloy is exerted on the coils $R_L$ and $T_L$, the metal of the power reception-side metal portion $MT_2$ may be a metal other than aluminum and the aluminum alloy.

Figure 25A:
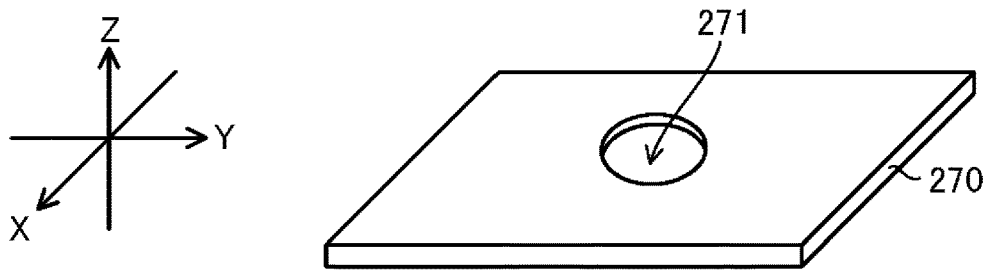
FIGS. 25A to 25C are respectively a perspective view of a metal plate, a transparent view of some components of a power feeding device and an electronic device and a plan view of the metal plate and a power reception-side coil in the second embodiment of the present invention.

Although the power reception-side metal portion $MT_2$ may have any shape, the power reception-side metal portion $MT_2$ is assumed to include a metal plate 270 which has an opening portion 271 as shown in FIG. 25A. In the reference arrangement state, the metal plate 270 is parallel to the XY plane. The opening portion 271 is a hole which is provided in the metal plate 270 so as to penetrate the metal plate 270 along the direction of the Z axis, and thus no metal is present in the opening portion 271. On the XY plane, the opening portion 271 forms a closed region, and no contact is present between the opening portion 271 and the outer periphery of the metal plate 270. Hence, in the XY plane, around the opening portion 271, an electrical path (current loop) made of aluminum is formed. The opening portion 271 can be sealed with a material other than metal such as a resin material. The resin material is, for example, polycarbonate or polypropylene.

On the XY plane, the outline shape of the metal plate 270 is rectangular. However, on the XY plane, the outline shape of the metal plate 270 is not limited to this shape, and may include a curve or a straight line and a curve may be present together with the outline shape of the metal plate 270 in a mixed manner. Although here, the shape of the opening portion 271 on the XY plane can be considered to be a circle (can be three-dimensionally considered to be a cylindrical shape), on the XY plane, the shape of the opening portion 271 is not limited to the circle, and may be oval or polygonal (such as rectangular) or a straight line and a curve may be present together with the shape of the opening portion 271 in a mixed manner.

Figure 26:
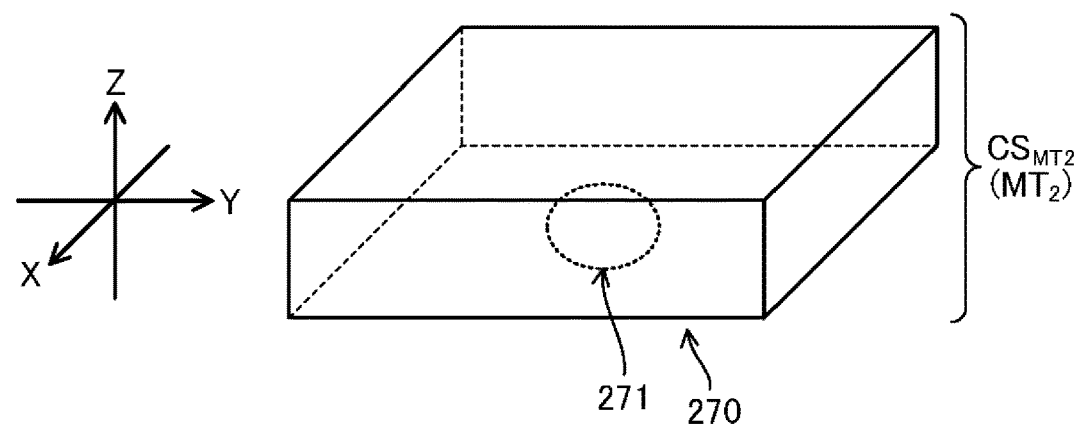
FIG. 26 is a perspective view of a metal case which is provided in the electronic device in the second embodiment of the present invention.

The power reception-side metal portion $MT_2$ may include another metal portion in addition to the metal plate 270. Specifically, for example, as shown in FIG. 26, when the power reception-side metal portion $MT_2$ is a box-shaped metal case $CS_{MT2}$ serving as the enclosure of the electronic device 2, the metal plate 270 forms one surface (bottom surface) of the metal case $CS_{MT2}$.

Figure 25B:
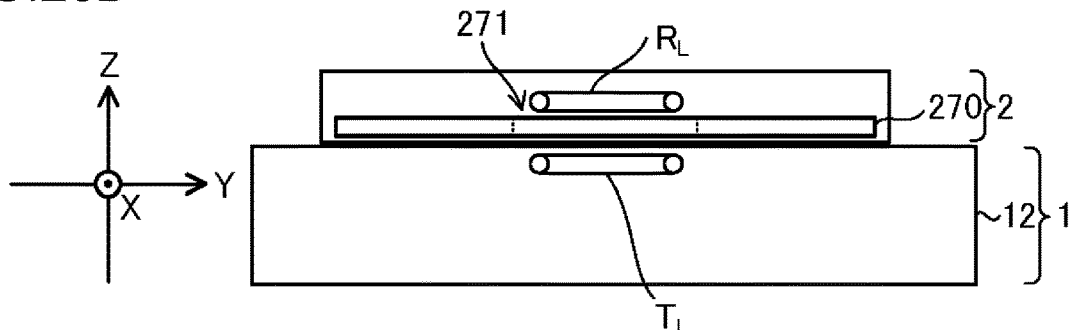
Figure 25C:
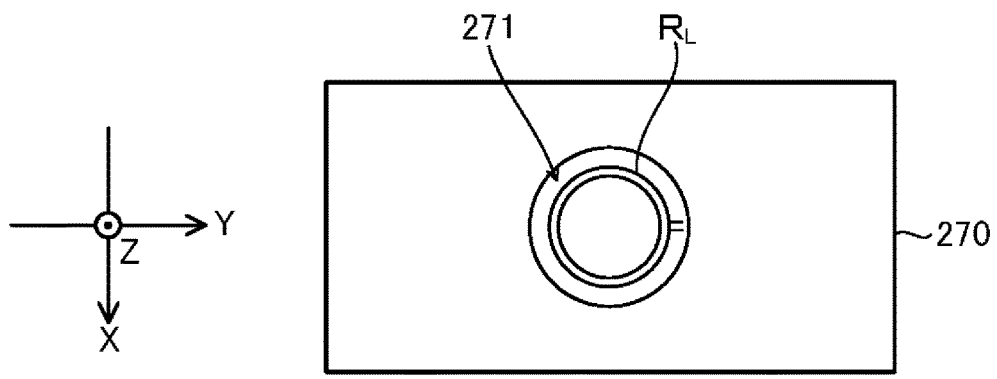

However, in the following description and the drawings (including FIGS. 25A to 25C) referenced in the following description, for simplification of description and illustration, on the power reception-side metal portion $MT_2$, attention is focused on only the metal plate 270. FIG. 25A is a perspective view of the metal plate 270 in the reference arrangement state, and FIG. 25B is a transparent view of some components of the power feeding device 1 and the electronic device 2 in the reference arrangement state. FIG. 25C is a plan view of the metal plate 270 and the power reception-side coil $R_L$ in the reference arrangement state when seen in the direction of the Z axis. The opening portion 271 is provided in an opposite position of the arrangement position of the power reception-side coil $R_L$ (the position opposite the arrangement position of the power reception-side coil $R_L$), and in the reference arrangement state, the opening portion 271 is located between the coils $T_L$ and $R_L$, and the coils $T_L$ and $R_L$ are opposite each other through the opening portion 271.

Figure 27:
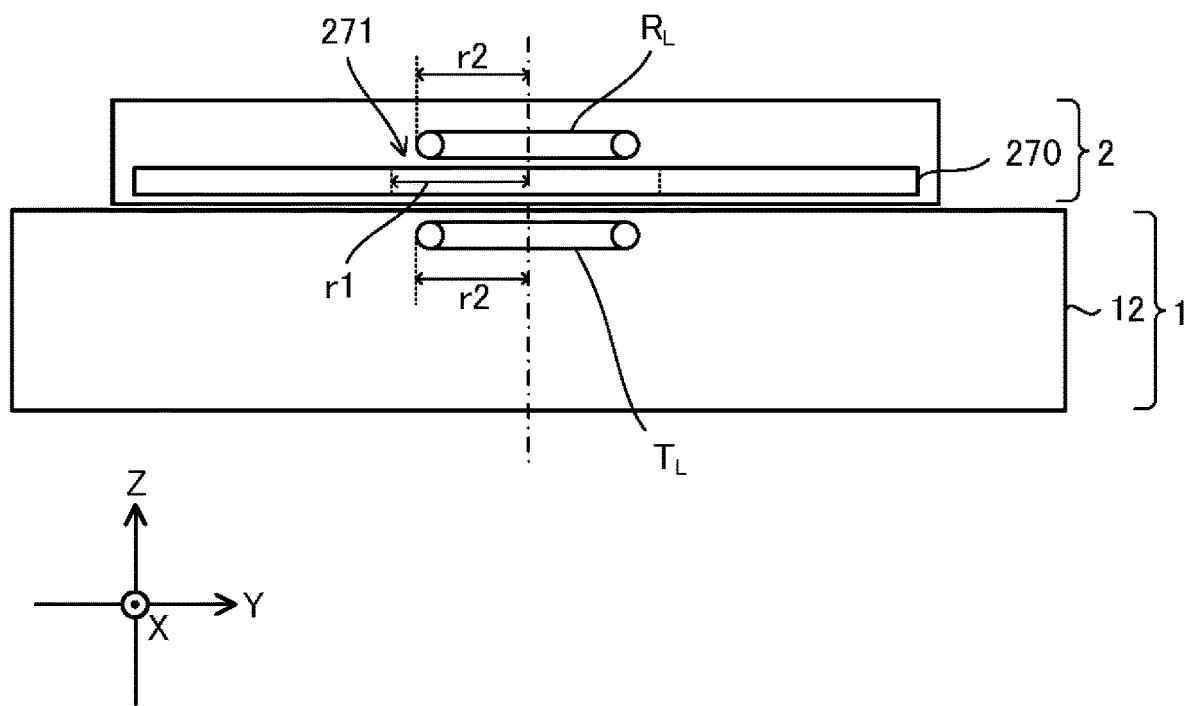
FIG. 27 is a diagram for illustrating a relationship of the sizes of the opening portion of the metal plate, the power transmission-side coil and the power reception-side coil in the second embodiment of the present invention.

In the XY plane, the size of the opening portion 271 is larger than the sizes of the coils $T_L$ and $R_L$, and when the coil $R_L$, the opening portion 271 and the coil $T_L$ are seen along the direction of the Z axis, the outer peripheries of the coils $R_L$ and $T_L$ which are overlaid on each other are included within the opening portion 271. When it is considered that the shape of the opening portion 271 and the outer peripheral shapes of the coils $T_L$ and $R_L$ are all circles, the centers of the circles are located on one straight line parallel to the Z axis, and as shown in FIG. 27, the radius r1 of the circle serving as the shape of the opening portion 271 is larger than the radius r2 of the circle serving as the outer peripheral shapes of the coils $T_L$ and $R_L$. Hence, it is possible to satisfactorily realize the power transfer using the coils $T_L$ and $R_L$ though a slight loss is caused. For example, when the radius r1 is set 5 mm (millimeters) larger than the radius r2, a ratio of loss with respect to a case where the metal plate 270 is not present is about 10 to 20%.

The influence of the metal plate 270 formed of aluminum will be described.

With reference to FIG. 28A, in the reference arrangement state, the power transmission-side coil $T_L$ is magnetically coupled to the metal plate 270 which includes the opening portion 271. When an alternating current $I_1$ flows through the power transmission-side coil $T_L$, based on the magnetic field generated in the power transmission-side coil $T_L$ in this way, by electromagnetic induction, an alternating current $I_{31}$ in a direction opposite to the alternating current $I_1$ (that is, whose phase is displaced 180 degrees) flows through the electrical path around the opening portion 271 within the metal plate 270. When a coupling coefficient between the power transmission-side coil $T_L$ and the metal plate 270 is assumed to be $K_{13}$, the alternating current $I_{31}$ is represented by "$I_{31}=K_{13}\times I_1$".

On the other hand, with reference to FIG. 28B, within the electronic device 2, the power reception-side coil $R_L$ is also magnetically coupled to the metal plate 270 which includes the opening portion 271. When an alternating current $I_2$ flows through the power reception-side coil $R_L$, based on the magnetic field generated in the power reception-side coil $R_L$ in this way, by electromagnetic induction, an alternating current $I_{32}$ in a direction opposite to the alternating current $I_2$ (that is, whose phase is displaced 180 degrees) flows through the electrical path around the opening portion 271 within the metal plate 270. When a coupling coefficient between the power reception-side coil $R_L$ and the metal plate 270 is assumed to be $K_{23}$, the alternating current $I_{32}$ is represented by "$I_{32}=K_{23}\times I_2$".

FIG. 28C shows the currents $I_1$, $I_2$, $I_{31}$ and $I_{32}$ on a complex plane. The alternating current $I_2$ is a resonant current which flows through the power reception-side coil $R_L$ based on the alternating current $I_1$, and is represented by "$I_2=jQK_{12}\times I_1$". Here, $K_{12}$ is a coupling coefficient between the coils $T_L$ and $R_L$ in the reference arrangement state, Q is Q in the power reception-side coil $R_L$ and j is an imaginary number. The current $I_2$ lags in phase with respect to the current $I_1$ by 90 degrees.

When the resonant frequency of the resonant circuit TT is considered, the presence of the metal plate 270 which generates the alternating current $I_{31}$ acts so as to equivalently reduce the inductance of the power transmission-side coil $T_L$ (that is, so as to reduce the inductance component of the resonant circuit TT) and consequently acts so as to increase the resonant frequency of the resonant circuit TT.

When the resonant frequency of the resonant circuit RR is considered, the presence of the metal plate 270 which generates the alternating current $I_{32}$ acts so as to equivalently reduce the inductance of the power reception-side coil $R_L$ (that is, so as to reduce the inductance component of the resonant circuit RR) and consequently acts so as to increase the resonant frequency of the resonant circuit RR.

Hence, when the power feeding device 1 and the electronic device 2 are designed regardless of the presence of the metal plate 270, the resonant frequencies of the resonant circuits TT and RR are displaced from the reference frequency by the presence of the metal plate 270 (hereinafter, such a displacement is referred to as a resonant frequency shift phenomenon). The resonant frequency shift phenomenon can exert influences such as a decrease in the efficiency of the power transfer utilizing magnetic field resonance.

When an alternating magnetic field is generated in the power transmission-side coil $T_L$, a voltage based on a current which flows through the metal plate 270 by the magnetic field generated in the power transmission-side coil $T_L$ is generated in the power transmission-side coil $T_L$, and the voltage acts so as to increase the amplitude of the current flowing through the power transmission-side coil $T_L$ (hereinafter, this increase is referred to as a current amplitude increase phenomenon). Consequently, even when the foreign object 3 is not present on the power feeding table 12, in the pFOD processing or the mFOD processing, the presence of the foreign object may be erroneously recognized. In other words, the metal plate 270 may be erroneously recognized as the foreign object (since the metal plate 270 is a constituent component of the electronic device 2, it is naturally necessary to prevent the metal plate 270 from being erroneously recognized as the foreign object). Although it can be considered that in order for such an erroneous recognition to be avoided, the upper limit value in the pFOD normal range or the mFOD normal range is set higher, such a setting leads to the degradation of the detection performance of the foreign object to be actually detected. For example, when attention is focused on the detection of the foreign object 3 such as a non-contact IC card, in the pFOD processing, it is observed that the current amplitude of the power transmission-side coil $T_L$ is lowered by the presence of the foreign object 3. However, when the current amplitude of the power transmission-side coil $T_L$ is increased by being affected by the metal plate 270, such an increase functions as noise in the observation of the lowering of the current amplitude caused by presence of the foreign object 3, with the result that the detection of the foreign object 3 is not easily performed.

Third Embodiment

Hence, in a third embodiment of the present invention, a magnetic member portion $MG_2$ which acts so as to cancel the influence of the metal plate 270 is added to the electronic device 2 of the second embodiment. In the present embodiment, although the cancelling ideally indicates the complete cancelling of a target to be cancelled, the cancelling also indicates partial cancelling. The third embodiment is an embodiment based on the first and second embodiments, and for items which are not particularly described in the third embodiment, the description of the first and second embodiments is also applied to the third embodiment unless otherwise a contradiction arises (for items which contradict, the description of the third embodiment is prioritized).

The magnetic member portion $MG_2$ is formed of an arbitrary magnetic material which indicates high permeability, and is formed of, for example, ferrite. Although an example of the detailed structure will be described later, in the reference arrangement state (that is, when the power feeding device 1 and the electronic device 2 are in the predetermined positional relationship for performing the transmission and reception of power), the magnetic member portion $MG_2$ is provided in a position which affects at least one of the resonant frequencies of the resonant circuits TT and RR, and thus it is possible to perform the power transfer in a state where the resonant frequencies of the resonant circuits TT and RR are made equal to the reference frequency.

In examples EX3_1 to EX3_5 which belong to the third embodiment, the detailed structure of the magnetic member portion $MG_2$ and the like will be described below. Unless otherwise a contradiction arises, items which are described in an arbitrary example among the examples EX3_1 to EX3_5 can also be applied to another arbitrary example.

Example EX3_1

Figure 29A:
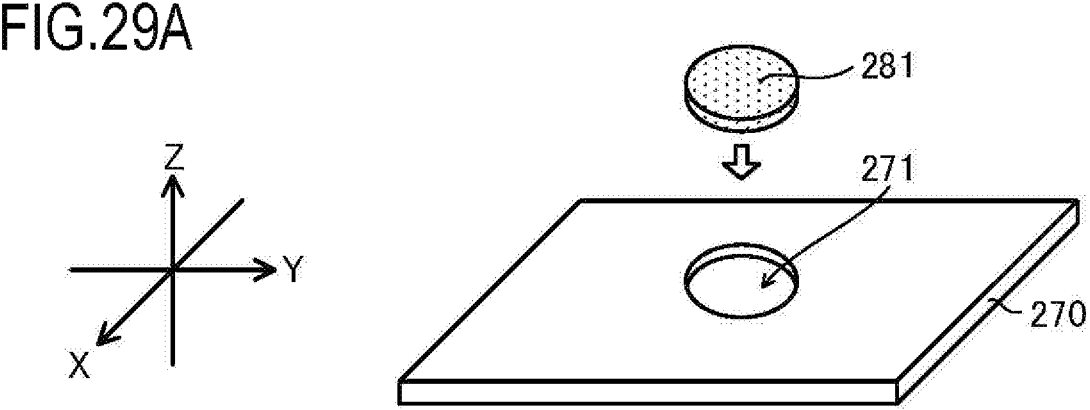
FIGS. 29A to 29C are diagrams for illustrating the structures and the positional relationship of a power transmission-side coil, a power reception-side coil, a metal plate and a magnetic member plate in an example (EX3_1) of a third embodiment of the present invention.
Figure 29B:
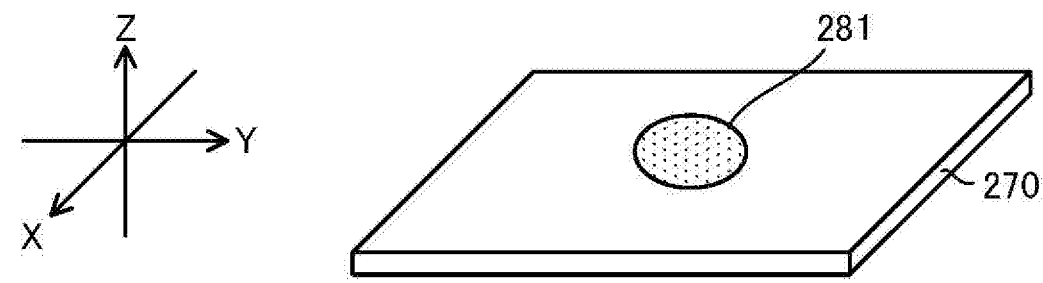
Figure 29C:
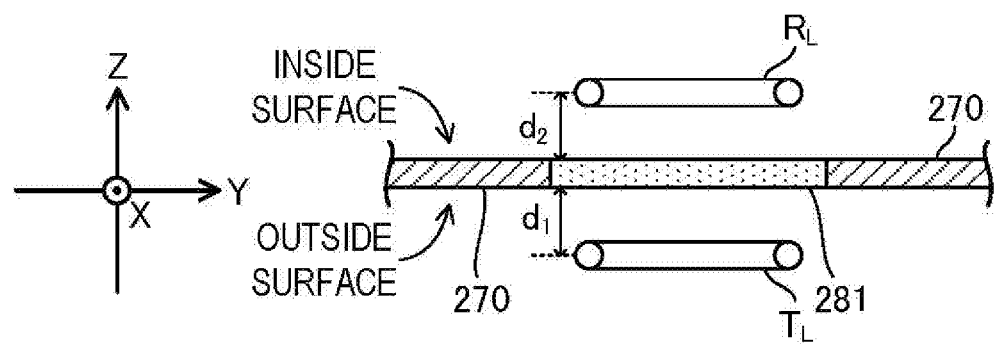

The example EX3_1 will be described with reference to FIGS. 29A to 29C. In the example EX3_1, as the magnetic member portion $MG_2$, a magnetic member plate (magnetic member within the opening portion) 281 is provided. Although the magnetic member portion $MG_2$ can include another magnetic member portion in addition to the magnetic member plate 281, attention is focused on only the magnetic member plate 281 here. As shown in FIG. 29B, the magnetic member plate 281 is arranged and fixed within the opening portion 271 of the metal plate 270. FIG. 29B is a perspective view of the metal plate 270 in a state where the magnetic member plate 281 is fixed within the opening portion 271, and FIG. 29A is an exploded perspective view of the magnetic member plate 281 and the metal plate 270. In FIGS. 29A to 29C, for ease of illustration, the magnetic member plate 281 is expressed by a dotted region.

The magnetic member plate 281 has substantially the same shape as the opening portion 271, and in a state where the magnetic member plate 281 is fitted into the opening portion 271, an adhesive or the like is used to fix the magnetic member plate 281 within the opening portion 271. With a resin sheet (unillustrated) which couples the metal plate 270 and the magnetic member plate 281 together, the fixing strength of the magnetic member plate 281 within the opening portion 271 may be increased. Since the configuration is adopted in which the magnetic member plate 281 is fitted into the opening portion 271, though the magnetic member plate 281 has the same cylindrical shape as the shape (here, the cylindrical shape) of the opening portion 271, as the shape of the opening portion 271 is changed, the shape of the magnetic member plate 281 is changed. As described above, the opening portion 271 is sealed by the magnetic member plate 281, and thus the distribution of air through the opening portion 271 is prevented or is hardly performed. As shown in FIG. 26, when the power reception-side metal portion $MT_2$ is the box-shaped metal case $CS_{MT2}$ serving as the enclosure of the electronic device 2, the opening portion 271 is sealed by the magnetic member plate 281, and thus airtightness within the metal case $CS_{MT2}$ is kept, and the strength of the case itself is also assured.

In FIG. 29C, a cross-sectional view (the cross-sectional view of a cross section which passes through the center of the opening portion 271 and which is parallel to the YZ plane) of the metal plate 270 and the magnetic member plate 281 in the state where the magnetic member plate 281 is fitted into the opening portion 271 is shown together with the coils $T_L$ and $R_L$. In the reference arrangement state, the power transmission-side coil $T_L$, the magnetic member plate 281 and the power reception-side coil $R_L$ are aligned along the Z axis, and a distance between the power transmission-side coil $T_L$ and the magnetic member plate 281 and a distance between the power reception-side coil $R_L$ and the magnetic member plate 281 are represented by $d_1$ and $d_2$, respectively.

Each of the metal plate 270 and the magnetic member plate 281 has an outside surface and an inside surface parallel to the XY plane, the outside surface of the metal plate 270 and the outside surface of the magnetic member plate 281 are located on the same plane (that is, are made flush therewith) and the inside surface of the metal plate 270 and the inside surface of the magnetic member plate 281 are located on the same other plane (that is, are made flush therewith). In the metal plate 270 and the magnetic member plate 281, the outside surface is a surface which is closer to the power transmission-side coil $T_L$ than the inside surface, and thus the inside surface is a surface which is closer to the power reception-side coil $R_L$ than the outside surface. The distance $d_1$ may be considered to be a distance between the outside surface (or the center) of the magnetic member plate 281 and the center of the power transmission-side coil $T_L$ in the direction of the Z axis. Likewise, the distance $d_2$ may be considered to be a distance between the inside surface (or the center) of the magnetic member plate 281 and the center of the power reception-side coil $R_L$ in the direction of the Z axis.

A relationship of currents flowing through the power transmission-side coil $T_L$, the power reception-side coil $R_L$, the metal plate 270 and the magnetic member plate 281 will be described. The relationship thereof is schematically shown in FIGS. 30A to 30C.

Figure 30A:
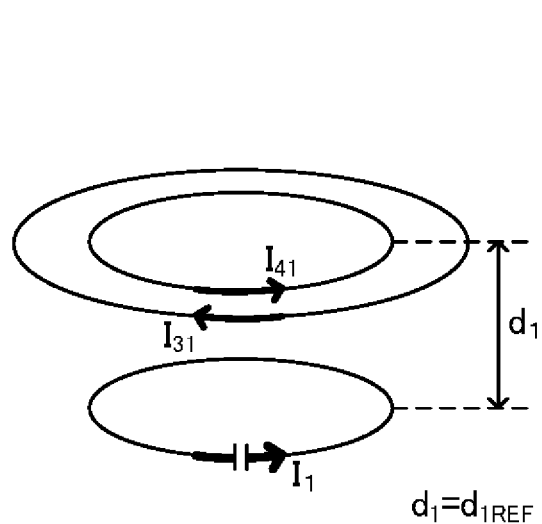
FIGS. 30A to 30C are relationship diagrams of currents flowing through the power transmission-side coil, the power reception-side coil, the metal plate and the magnetic member plate in the example (EX3_1) of the third embodiment of the present invention.
Figure 30B:
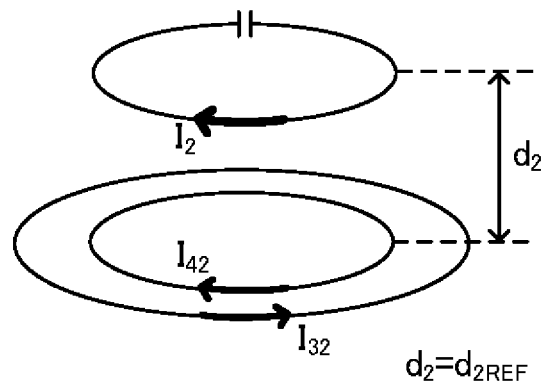
Figure 30C:
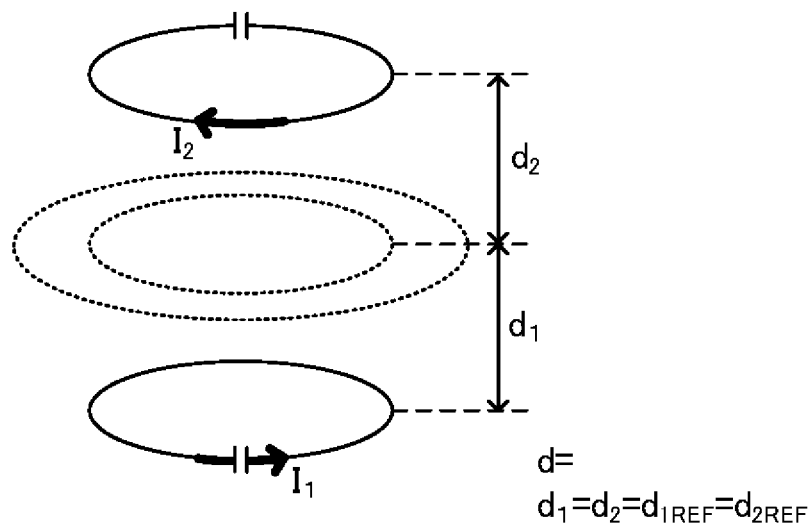

With reference to FIG. 30A, in the reference arrangement state, the power transmission-side coil $T_L$ is magnetically coupled to the metal plate 270 having the opening portion 271, and is also magnetically coupled to the magnetic member plate 281. When the alternating current $I_1$ flows through the power transmission-side coil $T_L$, based on the magnetic field generated in the power transmission-side coil $T_L$ in this way, the alternating current $I_{31}$ in a direction opposite to the alternating current $I_1$ (that is, whose phase is displaced 180 degrees) flows through the electrical path around the opening portion 271 within the metal plate 270 whereas an alternating current $I_{41}$ in the same direction as the alternating current $I_1$ (that is, which has the same phase as the alternating current $I_1$) flows through the magnetic member plate 281.

Since the current $I_{41}$ and the current $I_{31}$ are currents whose directions are opposite to each other, the magnetic member plate 281 provides action opposite to the metal plate 270 having the opening portion 271 to the resonant circuit TT. Specifically, contrary to the metal plate 270 having the opening portion 271, the presence of the magnetic member plate 281 which generates the current $I_{41}$ acts so as to equivalently increase the inductance of the power transmission-side coil $T_L$ (that is, so as to increase the inductance component of the resonant circuit TT) and consequently acts so as to reduce the resonant frequency of the resonant circuit TT, and also acts so as to reduce the amplitude of the current flowing through the power transmission-side coil $T_L$.

Since as described above, the magnetic member plate 281 provides the action opposite to the metal plate 270 to the resonant circuit TT, it is possible to cancel (reduce), with the magnetic member plate 281, the influence on the resonant circuit TT exerted by the presence of the metal plate 270. A distance $d_{1REF}$ over which the action of the current $I_{31}$ and the action of the current $I_{41}$ on the resonant circuit TT exactly cancel each other depends on the shape of the opening portion 271, the shape of the power transmission-side coil $T_L$ and the like so as to be uniquely determined, and here it is assumed that "$d_1=d_{1REF}$".

With reference to FIG. 30B, within the electronic device 2, the power reception-side coil $R_L$ is magnetically coupled to the metal plate 270 having the opening portion 271, and is also magnetically coupled to the magnetic member plate 281. When the alternating current $I_2$ flows through the power reception-side coil $R_L$, based on the magnetic field generated in the power reception-side coil $R_L$ in this way, the alternating current $I_{32}$ in a direction opposite to the alternating current $I_2$ (that is, whose phase is displaced 180 degrees) flows through the electrical path around the opening portion 271 within the metal plate 270 whereas an alternating current $I_{42}$ in the same direction as the alternating current $I_2$ (that is, which has the same phase as the alternating current $I_2$) flows through the magnetic member plate 281.

Since the current $I_{42}$ and the current $I_{32}$ are currents whose directions are opposite to each other, the magnetic member plate 281 provides action opposite to the metal plate 270 having the opening portion 271 to the resonant circuit RR. Specifically, contrary to the metal plate 270 having the opening portion 271, the presence of the magnetic member plate 281 which generates the current $I_{42}$ acts so as to equivalently increase the inductance of the power reception-side coil $R_L$ (that is, so as to increase the inductance component of the resonant circuit RR) and consequently acts so as to reduce the resonant frequency of the resonant circuit RR, and also acts so as to reduce the amplitude of the current flowing through the power reception-side coil $R_L$.

Since as described above, the magnetic member plate 281 provides the action opposite to the metal plate 270 to the resonant circuit RR, it is possible to cancel (reduce), with the magnetic member plate 281, the influence on the resonant circuit RR exerted by the presence of the metal plate 270. A distance $d_{2REF}$ over which the action of the current $I_{32}$ and the action of the current $I_{42}$ on the resonant circuit RR exactly cancel each other depends on the shape of the opening portion 271, the shape of the power reception-side coil $R_L$ and the like so as to be uniquely determined, and here it is assumed that "$d_2=d_{2REF}$".

When as described above, it is assumed that the shapes of the power transmission-side coil $T_L$ and the power reception-side coil $R_L$ are the same as each other, "$d_{1REF}=d_{2REF}$" and hence it is assumed that "$d=d_1=d_2$". Specifically, as shown in FIG. 30C, the coil $T_L$ and the coil $R_L$ are arranged in positions of images by inversion with reference to the magnetic member plate 281. Then, in the reference arrangement state, the coil $T_L$ and the coil $R_L$ are brought into a state as if the metal plate 270 and the magnetic member plate 281 were not present. In the electronic device 2, the power reception-side coil $R_L$ and the metal plate 270 are fixed within the electronic device 2 with mechanical components, a substrate and the like which are not illustrated, in the power feeding device 1, the power transmission-side coil $T_L$ is fixed within the power feeding device 1 with mechanical components, a substrate and the like which are not illustrated and the enclosures of the power feeding device 1 and the electronic device 2 are formed such that in the reference arrangement state, "$d_1=d_{1REF}=d_2=d_{2REF}$".

When the inductance of the power transmission-side coil $T_L$ is represented by $L_1$, and the capacitance of the power transmission-side capacitor $T_C$ is represented by $C_1$, the resonant frequency $f_1$ of the resonant circuit TT which is determined only by $L_1$ and $C_1$ is $1/(2\pi(L_1C_1)^{1/2})$ (that is, the reciprocal of a product of $2\pi$ and the square root of $(L_1C_1)$). When the inductance of the power reception-side coil $R_L$ is represented by $L_2$, and the capacitance of the power reception-side capacitor $R_C$ is represented by $C_2$, the resonant frequency $f_2$ of the resonant circuit RR which is determined only by $L_2$ and $C_2$ is $1/(2\pi(L_2C_2)^{1/2})$ (that is, the reciprocal of a product of $2\pi$ and the square root of $(L_2C_2)$). In the example EX3_1, as in the first embodiment, the resonant frequency $f_1$ of the resonant circuit TT and the resonant frequency $f_2$ of the resonant circuit RR (in the first embodiment, represented by the symbol $f_O$) are set to the predetermined reference frequency (13.56 MHz).

With consideration given to the influence of aluminum and/or ferrite, the resonant frequency of the resonant circuit RR can be changed from the frequency $f_2$ but when the metal plate 270 and the magnetic member plate 281 are arranged in the position of a distance d seen from the power reception-side coil $R_L$, the resonant frequency of the resonant circuit RR is not changed from the reference frequency. Even when in this state, the power transmission-side coil $T_L$ is placed in the position of the distance d with respect to the metal plate 270, the resonant frequency of the resonant circuit TT is not changed from the reference frequency. In other words, for the power transfer between the resonant circuits TT and RR, the metal plate 270 and the magnetic member plate 281 can be regarded as being not present except that they produce a slight loss.

In the configuration of the example EX3_1, a change in the resonant frequency of the resonant circuit RR caused by the presence of the metal plate 270 is cancelled (reduced) by the magnetic member plate 281, and a change in the resonant frequency of the resonant circuit TT caused by the presence of the metal plate 270 in the reference arrangement state is cancelled (reduced) by the magnetic member plate 281, with the result that the influence based on the resonant frequency shift phenomenon is cancelled. An increase in the current amplitude of the power transmission-side coil $T_L$ caused by the presence of the metal plate 270 is cancelled (reduced) by the action of the magnetic member plate 281, and thus the influence based on the current amplitude increase phenomenon is also cancelled.

When the shapes of the coils $T_L$ and $R_L$ are made the same as each other such that the degree of magnetic coupling between the coils $T_L$ and $R_L$ is enhanced, the distance $d_1$ $(=d_{1REF})$ and the distance $d_2$ $(=d_{2REF})$ are set to the same distance d, and thus the effect of the cancelling described above is optimized.

However, when the shapes of the coils $T_L$ and $R_L$ are different from each other, the distance $d_1$ $(=d_{1REF})$ and the distance $d_2$ $(=d_{2REF})$ are different from each other. Although the cancelling effect is reduced, the distance $d_1$ may be slightly displaced from the distance $d_{1REF}$, and the distance $d_2$ may be slightly displaced from the distance $d_{2REF}$ (and consequently, "$d_1 \neq d_2$" may hold true).

The sealing of the opening portion 271 which is necessary in terms of ensuring the mechanical strength, the airtightness or the like of the electronic device 2 is realized by the magnetic member plate 281, and thus it is not necessary to additionally perform sealing processing on the opening portion 271 with a resin material or the like, with the result that the configuration and the manufacturing of the electronic device 2 are simplified and facilitated.

However, the magnetic member plate 281 can also be made to have the shape of a ring which has a hole portion that penetrates along the direction of the Z axis. However, in this case, since it is necessary to perform sealing processing on the hole portion with a resin material or the like, the hole portion is preferably prevented from being provided in the magnetic member plate 281.

Since the magnetic member plate 281 is arranged such that the outside surface and the inside surface thereof are flush with the outside surface and the inside surface of the metal plate 270, the influence of the metal plate 270 and the magnetic member plate 281 on the power reception-side coil $R_L$ and the influence of the metal plate 270 and the magnetic member plate 281 on the power transmission-side coil $T_L$ can be easily and reliably made equal to each other, and when the enclosure of the electronic device 2 is formed with the metal plate 270, a step which can provide an uncomfortable feeling to a user of the electronic device 2 is prevented from being formed.

However, in particular, for example, when the enclosure of the electronic device 2 is not formed with the metal plate 270 (when the metal plate 270 is not located in the outermost periphery of the electronic device 2), it is not always necessary that the magnetic member plate 281 be arranged so as to be flush with the outside surface of the metal plate 270, and moreover, it is not always necessary that the magnetic member plate 281 be arranged so as to be flush with the inside surface of the metal plate 270.

Example EX3_2

The example EX3_2 will be described. As described above, the metal plate 270 having the opening portion 271 changes the resonant circuits TT and RR so as to increase the resonant frequencies thereof. In order to cancel the change so as to keep the resonant frequencies of the resonant circuits TT and RR at the reference frequency, magnetic member plates are preferably provided in the vicinity of the power transmission-side coil $T_L$ and the power reception-side coil $R_L$, respectively. To keep the resonant frequencies at the reference frequency by cancelling a change in the resonant frequency from the reference frequency caused by the presence of the metal plate 270 is referred to as "neutralization" here. In the example EX3_2, the magnetic member plate is provided in the vicinity of the power reception-side coil $R_L$, and thus the neutralization is performed only on the resonant circuit RR.

Figure 31A:
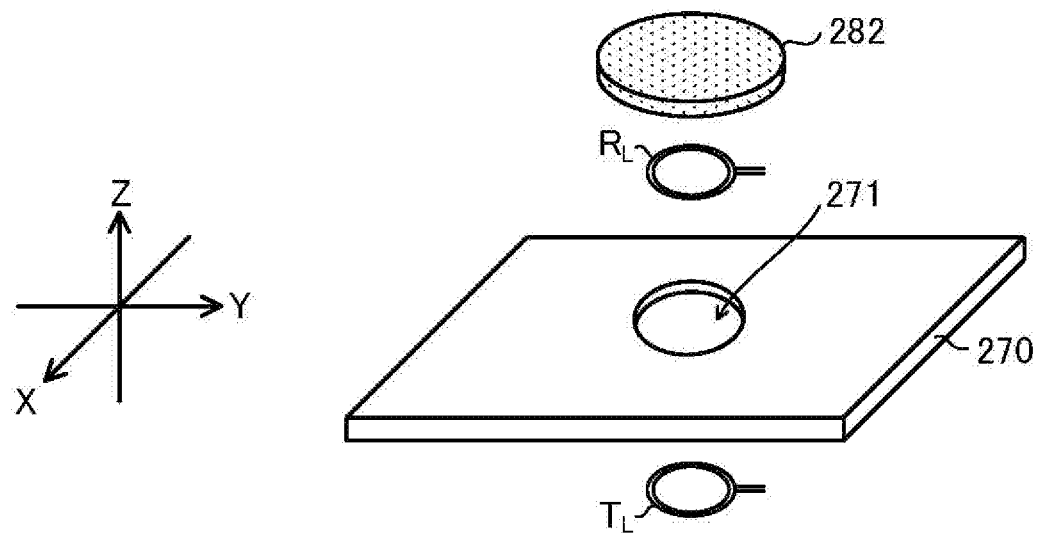
FIGS. 31A and 31B are diagrams for illustrating the structures and the positional relationship of the power transmission-side coil, the power reception-side coil, the metal plate and the magnetic member plate in an example (EX3_2) of the third embodiment of the present invention.
Figure 31B:
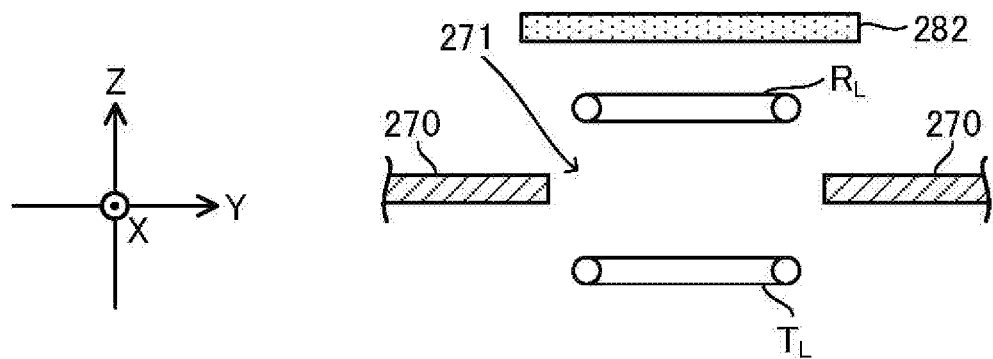

FIGS. 31A and 31B are referenced. In the example EX3_2, as the magnetic member portion $MG_2$, a magnetic member plate 282 is provided. In the present specification, the magnetic member plate may be one that is referred to as a magnetic member sheet whose thickness is thin, and this configuration is not limited to the present example. Although the magnetic member portion $MG_2$ can include another magnetic member portion in addition to the magnetic member plate 282, attention is focused on only the magnetic member plate 282 here. The magnetic member plate 282 acts so as to cancel a change in the resonant frequency of the resonant circuit RR from the reference frequency caused by the presence of the metal plate 270 and thereby keep the resonant frequency at the reference frequency. Hence, the resonant frequency $f_2$ of the resonant circuit RR which is determined only by the inductance $L_2$ of the power reception-side coil $R_L$ and the capacitance $C_2$ of the power reception-side capacitor $R_C$ may be set to the reference frequency.

FIG. 31A is a perspective view of the magnetic member plate 282, the power reception-side coil $R_L$, the metal plate 270 and the power transmission-side coil $T_L$ in the reference arrangement state. In FIG. 31B, a cross-sectional view (the cross-sectional view of a cross section which passes through the center of the opening portion 271 and which is parallel to the YZ plane) of the metal plate 270 and the magnetic member plate 282 is shown together with the coils $T_L$ and $R_L$. In FIGS. 31A and 31B, the magnetic member plate 282 is expressed by a dotted region. Although the opening portion 271 is actually sealed with a resin material or the like, the state of the sealing is not shown in FIGS. 31A and 31B.

The magnetic member plate 282 is a magnetic member which has a circular outline shape on the XY plane. However, the outline shape of the magnetic member plate 282 on the XY plane can be arbitrarily changed. For example, the outline shape may be oval or polygonal. In the magnetic member plate 282, a hole portion which penetrates in the direction of the Z axis may be provided. The power reception-side coil $R_L$, the magnetic member plate 282 and the metal plate 270 are fixed within the electronic device 2 with mechanical components, a substrate and the like which are not illustrated such that in the electronic device 2, the power reception-side coil $R_L$ is located between the magnetic member plate 282 and the metal plate 270 (in other words, a plane in which the power reception-side coil $R_L$ is arranged is located between a plane in which the magnetic member plate 282 is arranged and a plane in which the metal plate 270 is arranged).

A relationship of currents flowing through the power transmission-side coil $T_L$, the power reception-side coil $R_L$, the metal plate 270 and the magnetic member plate 282 will be described. The relationship thereof is schematically shown in FIGS. 32A and 32B.

With reference to FIG. 32A, within the electronic device 2, the power reception-side coil $R_L$ is magnetically coupled to the metal plate 270 having the opening portion 271, and is also magnetically coupled to the magnetic member plate 281. Based on the magnetic field generated in the power transmission-side coil $T_L$ as a result of the alternating current $I_1$ flowing through the power transmission-side coil $T_L$, the alternating current $I_2$ flows through the power reception-side coil $R_L$. Then, based on the magnetic field generated in the power reception-side coil $R_L$ as a result of the flow of the alternating current $I_2$, the alternating current $I_{32}$ in a direction opposite to the alternating current $I_2$ (that is, whose phase is displaced 180 degrees) flows through the electrical path around the opening portion 271 within the metal plate 270 whereas the alternating current $I_{42}$ in the same direction as the alternating current $I_2$ (that is, which has the same phase as the alternating current $I_2$) flows through the magnetic member plate 282.

FIG. 32B shows the currents $I_1$, $I_2$, $I_{32}$ and $I_{42}$ on a complex plane. The relationship of the currents $I_1$, $I_2$ and $I_{32}$ is as already described (see FIG. 28C). When a coupling coefficient between the power reception-side coil $R_L$ and the magnetic member plate 282 is assumed to be $K_{24}$, the alternating current $I_{42}$ is represented by "$I_{42}=K_{24} \times I_2$".

Since the current $I_{42}$ and the current $I_{32}$ are currents whose directions are opposite to each other, the magnetic member plate 282 provides action opposite to the metal plate 270 having the opening portion 271 to the resonant circuit RR. Specifically, contrary to the metal plate 270 having the opening portion 271, the presence of the magnetic member plate 282 which generates the current $I_{42}$ acts so as to equivalently increase the inductance of the power reception-side coil $R_L$ (that is, so as to increase the inductance component of the resonant circuit RR) and consequently acts so as to reduce the resonant frequency of the resonant circuit RR, and also acts so as to reduce the amplitude of the current flowing through the power reception-side coil $R_L$.

Since as described above, the magnetic member plate 282 provides the action opposite to the metal plate 270 to the resonant circuit RR, it is possible to cancel (reduce), with the magnetic member plate 282, the influence on the resonant circuit RR exerted by the presence of the metal plate 270. The shape, the arrangement position and the like of the magnetic member plate 282 are determined according to the shape of the opening portion 271, the shape of the power reception-side coil $R_L$ and the like such that the action of the current $I_{32}$ and the action of the current $I_{42}$ on the resonant circuit RR exactly cancel each other, that is, the neutralization on the resonant circuit RR is realized.

The neutralization on the resonant circuit RR is performed regardless of the position of the power transmission-side coil $T_L$, and the power transmission-side coil $T_L$ is significantly affected by the metal plate 270 which is located relatively closer thereto than the magnetic member plate 282. With consideration given to this fact, the resonant frequency $f_1$ of the resonant circuit TT determined only by the inductance $L_1$ of the power transmission-side coil $T_L$ and the capacitance $C_1$ of the power transmission-side capacitor $T_C$ in the separate state is set to a predetermined frequency (for example, 13 MHz) lower than the reference frequency such that the resonant frequency of the resonant circuit TT is increased by being affected by the metal plate 270 in the reference arrangement state (or by being affected by the metal plate 270 and the magnetic member plate 282) and that consequently, the resonant frequency of the resonant circuit TT is the reference frequency. In this way, the power transfer is performed in a state where the resonant frequencies of the resonant circuits TT and RR are set to the reference frequency, and thus the influence based on the resonant frequency shift phenomenon is cancelled. However, since an increase in the current amplitude of the power transmission-side coil $T_L$ caused by the presence of the metal plate 270 is not cancelled, in terms of the cancellation of the influence based on the current amplitude increase phenomenon, the example EX3_1 is preferable.

The magnetic member plate 282 may also be used for a magnetic field interruption application for an integrated circuit and the like. As shown in FIG. 33, in the electronic device 2, a substrate SUB is provided on which an electronic circuit EL including an integrated circuit such as a power reception-side IC 200 is mounted. The electronic circuit EL is arranged on the side opposite to the magnetic member plate 282 when seen from the power reception-side coil $R_L$. In other words, the magnetic member plate 282 is inserted between the electronic circuit EL including the integrated circuit and the power reception-side coil $R_L$. More specifically, for example, the electronic circuit EL including the integrated circuit is mounted on the component surface of the substrate SUB, and on the surface opposite to the component surface of the substrate SUB, the magnetic member plate (magnetic member sheet) 282 is adhered. In this way, the magnetic field which is generated in the coil $R_L$ or $T_L$ and which is not necessary for the operation of the electronic circuit EL is absorbed in the magnetic member plate 282, and this contributes to the reduction of an erroneous operation and the like of the electronic circuit EL. If in order to reduce an erroneous operation and the like of the electronic circuit EL, it is originally necessary to insert the magnetic member plate (magnetic member sheet) between the electronic circuit EL and the power reception-side coil $R_L$, it can be said that the magnetic member plate (magnetic member sheet) is also used for the neutralization on the resonant circuit RR.

In the electronic device 2, the power reception-side coil $R_L$, the metal plate 270 and the magnetic member plate 282 are fixed within the electronic device 2 with mechanical components, a substrate and the like which are not illustrated, in the power feeding device 1, the power transmission-side coil $T_L$ is fixed within the power feeding device 1 with mechanical components, a substrate and the like which are not illustrated and the enclosures of the power feeding device 1 and the electronic device 2 are formed such that the details described above in the example EX3_2 are realized.

Example EX3_3

The example EX3_3 will be described. In the example EX3_3, in the reference arrangement state, the magnetic member plate is inserted between the metal plate 270 and the power transmission-side coil $T_L$ such that the neutralization is performed on the resonant circuit TT.

Figure 34A:
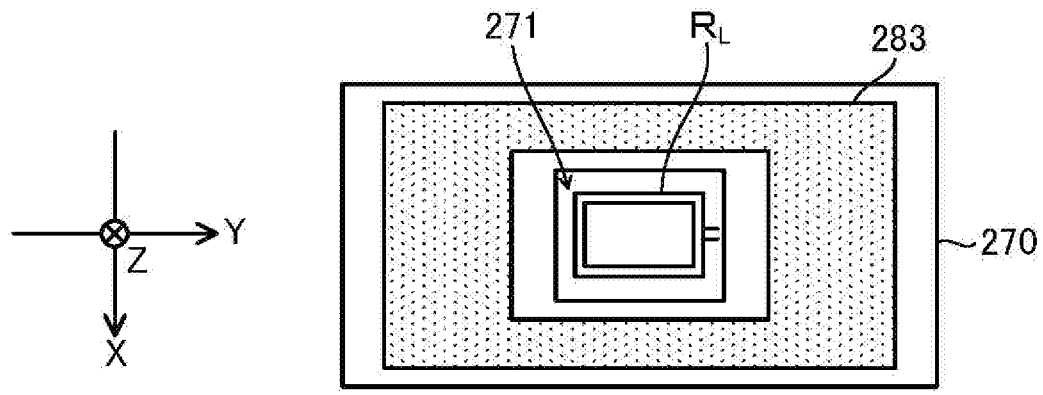
FIGS. 34A and 34B are diagrams for illustrating the structures and the positional relationship of a power transmission-side coil, a power reception-side coil, a metal plate and a magnetic member plate in an example (EX3_3) of the third embodiment of the present invention.
Figure 34B:
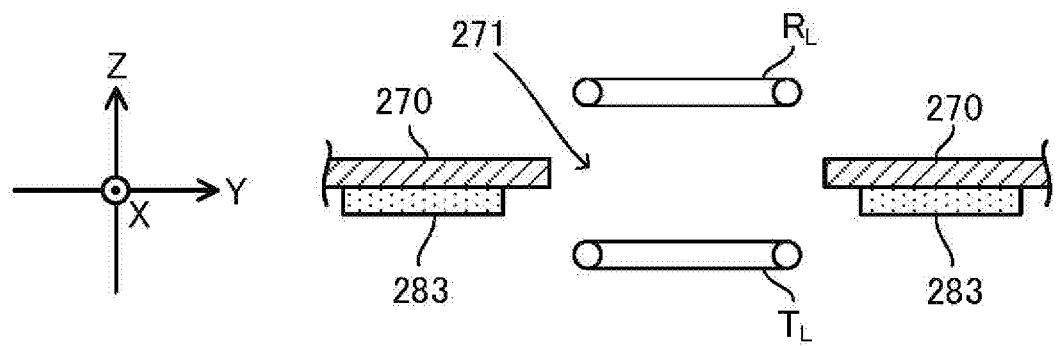

FIGS. 34A and 34B are referenced. In the example EX3_3 and the example EX3_4 which will be described later, the shape of the opening portion 271 on the XY plane is assumed to be rectangular. When the shape of the opening portion 271 is assumed to be rectangular, the outer peripheral shapes of the coils $T_L$ and $R_L$ may also be rectangular. In the example EX3_3, as the magnetic member portion $MG_2$, a magnetic member plate 283 (which may be the magnetic member sheet as described previously) is provided. Although the magnetic member portion $MG_2$ can include another magnetic member portion in addition to the magnetic member plate 283, attention is focused on only the magnetic member plate 283 here. In the reference arrangement state, the magnetic member plate 283 acts so as to cancel a change in the resonant frequency of the resonant circuit TT from the reference frequency caused by the presence of the metal plate 270 and thereby keep the resonant frequency at the reference frequency. Hence, the resonant frequency $f_1$ of the resonant circuit TT determined only by the inductance $L_1$ of the power transmission-side coil $T_L$ and the capacitance $C_1$ of the power transmission-side capacitor $T_C$ may be set to the reference frequency.

FIG. 34A is a plan view of the metal plate 270 and the magnetic member plate 283 when the metal plate 270 is seen along the direction of the Z axis from the side opposite to the power reception-side coil $R_L$. In FIG. 34A, the coil $R_L$ is also shown. In FIG. 34A, for simplification of illustration and for prevention of complication thereof, the winding of the coil $R_L$ is expressed by double rectangles, and a line segment which is extended laterally from the double rectangles indicates the lead wire of the coil (the same is true for FIG. 36 and the like which will be described later). In FIG. 34B, a cross-sectional view (the cross-sectional view of a cross section which passes through the center of the opening portion 271 and which is parallel to the YZ plane) of the metal plate 270 and the magnetic member plate 283 is shown together with the coils $T_L$ and $R_L$. In FIGS. 34A and 34B, the magnetic member plate 283 is expressed by a dotted region. Although the opening portion 271 is actually sealed with a resin material or the like, the state of the sealing is not shown in FIGS. 34A and 34B.

The magnetic member plate 283 is a magnetic member plate in a rectangular shape (rectangular shape having hollow) which is adhered to the outside surface of the metal plate 270 so as to cover part of the metal plate 270 around the opening portion 271. As previously described, in the metal plate 270, the outside surface is closer to the power transmission-side coil $T_L$ than the inside surface, and thus the inside surface is closer to the power reception-side coil $R_L$ than the outside surface. As with the metal plate 270, the magnetic member plate 283 includes an opening portion, and on the XY plane, within the opening portion of the magnetic member plate 283, the opening portion 271 of the metal plate 270 is present. The outline shape of the magnetic member plate 283 shown here is simply illustrative, and for example, the outline shape of the magnetic member plate 283 may include a curve (may include a circle, an oval or the like). The opening portion does not need to be present in the magnetic member plate 283.

As is clear from the positional relationship described previously, the metal plate 270 is arranged between the power reception-side coil $R_L$ and the magnetic member plate 283 (in other words, a plane in which the metal plate 270 is arranged is located between a plane in which the power reception-side coil $R_L$ is arranged and a plane in which the magnetic member plate 283 is arranged), and in the reference arrangement state, the magnetic member plate 283 is arranged between the metal plate 270 and the power transmission-side coil $T_L$ (in other words, in the reference arrangement state, the plane in which the magnetic member plate 283 is arranged between the plane in which the metal plate 270 is arranged and the plane in which the power transmission-side coil $T_L$ is arranged).

Figure 35:
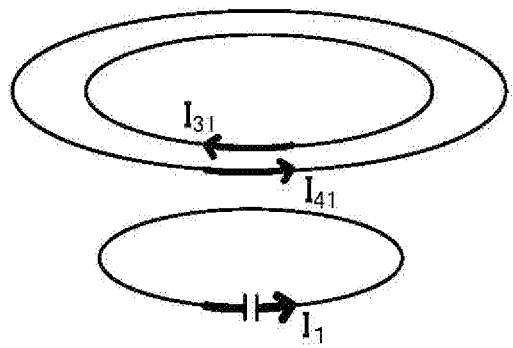
FIG. 35 is a relationship diagram of currents flowing through the power transmission-side coil, the metal plate and the magnetic member plate in the example (EX3_3) of the third embodiment of the present invention.

A relationship of currents flowing through the power transmission-side coil $T_L$, the metal plate 270 and the magnetic member plate 283 will be described. The relationship thereof is schematically shown in FIG. 35. In the reference arrangement state, the power transmission-side coil $T_L$ is magnetically coupled to the metal plate 270 having the opening portion 271, and is also magnetically coupled to the magnetic member plate 283. When the alternating current $I_1$ flows through the power transmission-side coil $T_L$, based on the magnetic field generated in the power transmission-side coil $T_L$ in this way, the alternating current $I_{31}$ in a direction opposite to the alternating current $I_1$ (that is, whose phase is displaced 180 degrees) flows through the electrical path around the opening portion 271 within the metal plate 270 whereas an alternating current $I_{41}$ in the same direction as the alternating current $I_1$ (that is, which has the same phase as the alternating current $I_1$) flows through the magnetic member plate 283.

Since the current $I_{41}$ and the current $I_{31}$ are currents whose directions are opposite to each other, the magnetic member plate 283 provides action opposite to the metal plate 270 having the opening portion 271 to the resonant circuit TT. Specifically, contrary to the metal plate 270 having the opening portion 271, the presence of the magnetic member plate 283 which generates the current $I_{41}$ acts so as to equivalently increase the inductance of the power transmission-side coil $T_L$ (that is, so as to increase the inductance component of the resonant circuit TT) and consequently acts so as to reduce the resonant frequency of the resonant circuit TT, and also acts so as to reduce the amplitude of the current flowing through the power transmission-side coil $T_L$.

Since as described above, the magnetic member plate 283 provides the action opposite to the metal plate 270 to the resonant circuit TT, it is possible to cancel (reduce), with the magnetic member plate 283, the influence on the resonant circuit TT exerted by the presence of the metal plate 270. The shape, the arrangement position and the like of the magnetic member plate 283 are determined according to the shape of the opening portion 271, the shape of the power transmission-side coil $T_L$ and the like such that the action of the current $I_{31}$ and the action of the current $I_{41}$ on the resonant circuit TT exactly cancel each other, that is, the neutralization on the resonant circuit TT is realized.

If the entire outside surface of the metal plate 270 is covered with the magnetic member plate 283, the power transmission-side coil $T_L$ is hardly affected by the metal plate 270 whereas the power transmission-side coil $T_L$ is unnecessarily affected by the magnetic member plate 283. Hence, part of the metal plate 270 is covered with the magnetic member plate 283. Here, preferably, a ratio between the area of the part of the outside surface of the metal plate 270 which is covered with the magnetic member plate 283 and the area of the part of the outside surface of the metal plate 270 which is not covered with the magnetic member plate 283 is determined, and the shape of the magnetic member plate 283 and the position in which the magnetic member plate 283 is adhered are determined such that the action of the metal plate 270 on the resonant circuit TT is exactly cancelled by the action of the magnetic member plate 283. For example, when the metal plate 270 is formed of aluminum, and the magnetic member plate 283 is formed of ferrite, with consideration given to the fact that the increase property of the inductance of the power transmission-side coil $T_L$ caused by the ferrite is greater than the reduction property of the inductance of the power transmission-side coil $T_L$ caused by the aluminum, the area ratio described above is preferably determined through appropriate experiments and the like.

In the configuration of the example EX3_3, an increase in the current amplitude of the power transmission-side coil $T_L$ caused by the presence of the metal plate 270 can be cancelled (reduced) by the magnetic member plate 283, and thus the influence based on the current amplitude increase phenomenon is cancelled.

On the other hand, the power reception-side coil $R_L$ is significantly affected by the metal plate 270 which is located relatively closer thereto than the magnetic member plate 283. As shown in FIGS. 34A and 34B, when the magnetic member plate 283 is provided on the outside surface of the metal plate 270, the influence of the magnetic member plate 283 on the power reception-side coil $R_L$ is small enough to be ignored. With consideration given to this fact, the resonant frequency $f_2$ of the resonant circuit RR determined only by the inductance $L_2$ of the power reception-side coil $R_L$ and the capacitance $C_2$ of the power reception-side capacitor $T_C$ is set to a predetermined frequency (for example, 13 MHz) lower than the reference frequency such that the resonant frequency of the resonant circuit RR is increased by being affected by the metal plate 270 (or by being affected by the metal plate 270 and the magnetic member plate 283) and that consequently, the resonant frequency of the resonant circuit RR is the reference frequency. In this way, the power transfer is performed in a state where the resonant frequencies of the resonant circuits TT and RR are set to the reference frequency, and thus the influence based on the resonant frequency shift phenomenon is also cancelled.

Although here, it is assumed that the magnetic member plate 283 is in contact with the outside surface of the metal plate 270, that is, that the distance between the magnetic member plate 283 and the outside surface of the metal plate 270 is zero, the arrangement position of the magnetic member plate 283 can also be shifted such that the distance has a predetermined positive value (the magnetic member plate 283 can also be shifted in a direction away from the power reception-side coil $R_L$).

Figure 36:
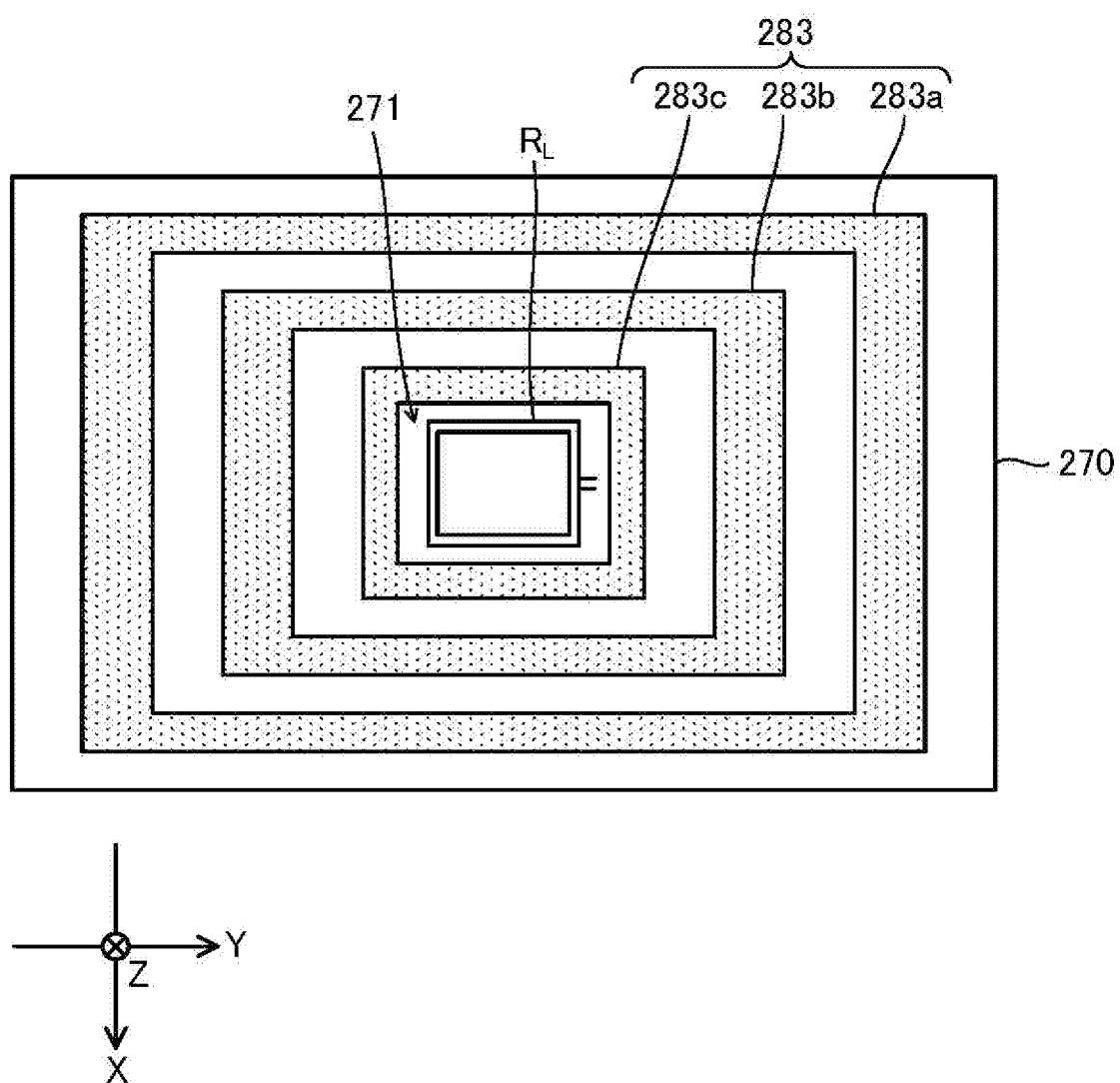
FIG. 36 is a diagram showing another structure of the magnetic member plate in the example (EX3_3) of the third embodiment of the present invention.

FIG. 36 is a plan view of the metal plate 270 and the magnetic member plate 283 when the metal plate 270 is seen along the direction of the Z axis from the side opposite to the power reception-side coil $R_L$, and is a diagram showing another example of the configuration of the magnetic member plate 283. In FIG. 36, the coil $R_L$ is also shown. In the example of FIG. 36, the magnetic member plate 283 is formed with magnetic member plates 283a, 283b and 283c which are separated from each other. Each of the magnetic member plates 283a, 283b and 283c is a magnetic member plate in a rectangular shape (rectangular shape having hollow) which is adhered to the outside surface of the metal plate 270 with the opening portion 271 in the center. In the XY plane, the sizes of the magnetic member plates 283a, 283b and 283c are different from each other, the size of the magnetic member plate 283a is the largest and the size of the magnetic member plate 283c is the smallest. More specifically, in the XY plane, each of the magnetic member plates 283a to 283c is a rectangular magnetic member plate which has an opening portion, the magnetic member plate 283b is arranged within the opening portion of the magnetic member plate 283a, the magnetic member plate 283c is arranged within the opening portion of the magnetic member plate 283b and the opening portion of the magnetic member plate 283c coincides with the opening portion 271 of the metal plate 270 (or although a configuration is different from the configuration shown in FIG. 36, the opening portion 271 of the metal plate 270 is located within the opening portion of the magnetic member plate 283c).

The shapes of the magnetic member plate 283 shown in FIGS. 34A and 34B and FIG. 36 are simply illustrative, and the shape can be changed variously. For example, instead of adhering the seamless magnetic member plate in a rectangular shape (rectangular shape having hollow) as described previously on the metal plate 270, a plurality of strip-shaped (that is, rectangular) magnetic member plates may be adhered to the outside surface of the metal plate 270 such that the strip-shaped magnetic member plates are aligned as a whole in a rectangular shape (rectangular shape having hollow) on the metal plate 270.

In the electronic device 2, the power reception-side coil $R_L$, the metal plate 270 and the magnetic member plate 283 are fixed within the electronic device 2 with mechanical components, a substrate and the like which are not illustrated, in the power feeding device 1, the power transmission-side coil $T_L$ is fixed within the power feeding device 1 with mechanical components, a substrate and the like which are not illustrated and the enclosures of the power feeding device 1 and the electronic device 2 are formed such that the details described above in the example EX3_3 are realized.

Example EX3_4

The example EX3_4 will be described. In the example EX3_4, the magnetic member plate is inserted between the power reception-side coil $R_L$ and the metal plate 270 such that the neutralization is performed on the resonant circuit RR.

Figure 37A:
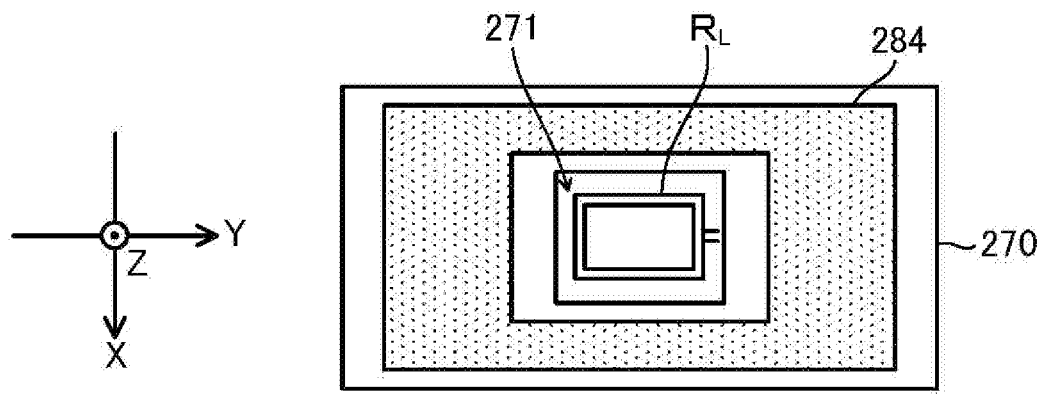
FIGS. 37A and 37B are diagrams for illustrating the structures and the positional relationship of the power transmission-side coil, the power reception-side coil, the metal plate and the magnetic member plate in an example (EX3_4) of the third embodiment of the present invention.
Figure 37B:
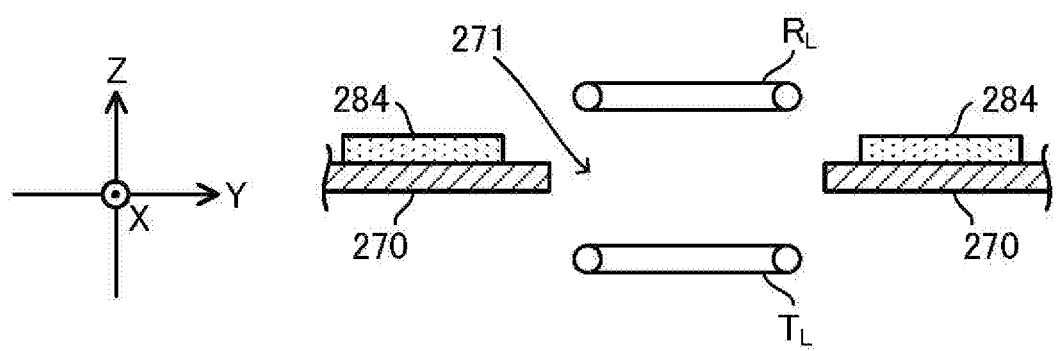

FIGS. 37A and 37B are referenced. In the example EX3_4, as the magnetic member portion $MG_2$, a magnetic member plate 284 (which may be the magnetic member sheet as described previously) is provided. Although the magnetic member portion $MG_2$ can include another magnetic member portion in addition to the magnetic member plate 284, attention is focused on only the magnetic member plate 284 here. The magnetic member plate 284 acts so as to cancel a change in the resonant frequency of the resonant circuit RR from the reference frequency caused by the presence of the metal plate 270 in the electronic device 2 and thereby keep the resonant frequency at the reference frequency. Hence, the resonant frequency $f_2$ of the resonant circuit RR determined only by the inductance $L_2$ of the power reception-side coil $R_L$ and the capacitance $C_2$ of the power reception-side capacitor $R_C$ may be set to the reference frequency.

FIG. 37A is a plan view of the metal plate 270 and the magnetic member plate 284 when the metal plate 270 is seen along the direction of the Z axis from the side on which the power reception-side coil $R_L$ is present. In FIG. 37A, the coil $R_L$ is also shown. In FIG. 37B, a cross-sectional view (the cross-sectional view of a cross section which passes through the center of the opening portion 271 and which is parallel to the YZ plane) of the metal plate 270 and the magnetic member plate 284 is shown together with the coils $T_L$ and $R_L$. In FIGS. 37A and 37B, the magnetic member plate 284 is expressed by a dotted region. Although the opening portion 271 is actually sealed with a resin material or the like, the state of the sealing is not shown in FIGS. 37A and 37B.

The magnetic member plate 284 is a magnetic member plate in a rectangular shape (rectangular shape having hollow) which is adhered to the inside surface of the metal plate 270 so as to cover part of the metal plate 270 around the opening portion 271. As already described, in the metal plate 270, the inside surface is closer to the power reception-side coil $R_L$ than the outside surface. As with the metal plate 270, the magnetic member plate 284 includes an opening portion, and on the XY plane, within the opening portion of the magnetic member plate 284, the opening portion 271 of the metal plate 270 is present. The outline shape of the magnetic member plate 284 shown here is simply illustrative, and for example, the outline shape of the magnetic member plate 284 may include a curve (may include a circle, an oval or the like). The opening portion does not need to be present in the magnetic member plate 284.

As is clear from the positional relationship described previously, the magnetic member plate 284 is arranged between the power reception-side coil $R_L$ and the metal plate 270 (in other words, a plane in which the magnetic member plate 284 is arranged is located between a plane in which the power reception-side coil $R_L$ is arranged and a plane in which the metal plate 270 is arranged).

Figure 38:
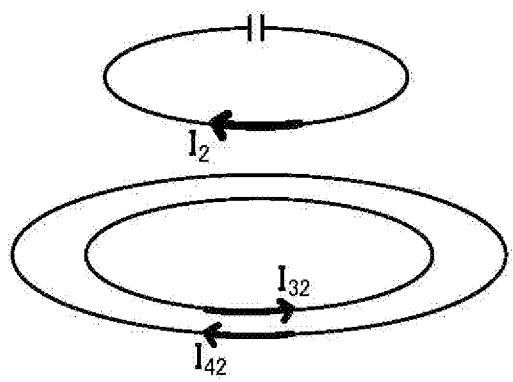
FIG. 38 is a relationship diagram of currents flowing through the power reception-side coil, the metal plate and the magnetic member plate in the example (EX3_4) of the third embodiment of the present invention.

A relationship of currents flowing through the power reception-side coil $R_L$, the metal plate 270 and the magnetic member plate 284 will be described. The relationship thereof is schematically shown in FIG. 38. Within the electronic device 2, the power reception-side coil $R_L$ is magnetically coupled to the metal plate 270 having the opening portion 271, and is also magnetically coupled to the magnetic member plate 284. Then, when the alternating current $I_2$ flows through the power reception-side coil $R_L$, based on the magnetic field generated in the power reception-side coil $R_L$ as a result of the alternating current $I_2$ flowing through the power reception-side coil $R_L$, the alternating current $I_{32}$ in a direction opposite to the alternating current $I_2$ (that is, whose phase is displaced 180 degrees) flows through the electrical path around the opening portion 271 within the metal plate 270 whereas the alternating current $I_{42}$ in the same direction as the alternating current $I_2$ (that is, which has the same phase as the alternating current $I_2$) flows through the magnetic member plate 284.

Since the current $I_{42}$ and the current $I_{32}$ are currents whose directions are opposite to each other, the magnetic member plate 284 provides action opposite to the metal plate 270 having the opening portion 271 to the resonant circuit RR. Specifically, contrary to the metal plate 270 having the opening portion 271, the presence of the magnetic member plate 284 which generates the current $I_{42}$ acts so as to equivalently increase the inductance of the power reception-side coil $R_L$ (that is, so as to increase the inductance component of the resonant circuit RR) and consequently acts so as to reduce the resonant frequency of the resonant circuit RR, and also acts so as to reduce the amplitude of the current flowing through the power reception-side coil $R_L$.

Since as described above, the magnetic member plate 284 provides the action opposite to the metal plate 270 to the resonant circuit RR, it is possible to cancel (reduce), with the magnetic member plate 284, the influence on the resonant circuit RR exerted by the presence of the metal plate 270. The shape, the arrangement position and the like of the magnetic member plate 284 are determined according to the shape of the opening portion 271, the shape of the power reception-side coil $R_L$ and the like such that the action of the current $I_{32}$ and the action of the current $I_{42}$ on the resonant circuit RR exactly cancel each other, that is, the neutralization on the resonant circuit RR is realized.

If the entire inside surface of the metal plate 270 is covered with the magnetic member plate 284, the power reception-side coil $R_L$ is hardly affected by the metal plate 270 whereas the power reception-side coil $R_L$ is unnecessarily affected by the magnetic member plate 284. Hence, part of the metal plate 270 is covered with the magnetic member plate 284. Here, preferably, a ratio between the area of the part of the inside surface of the metal plate 270 which is covered with the magnetic member plate 284 and the area of the part of the inside surface of the metal plate 270 which is not covered with the magnetic member plate 284 is determined, and the shape of the magnetic member plate 284 and the position in which the magnetic member plate 284 is adhered are determined such that the action of the metal plate 270 on the resonant circuit RR is exactly cancelled by the action of the magnetic member plate 284. For example, when the metal plate 270 is formed of aluminum, and the magnetic member plate 284 is formed of ferrite, with consideration given to the fact that the increase property of the inductance of the power reception-side coil $R_L$ caused by the ferrite is greater than the reduction property of the inductance of the power reception-side coil $R_L$ caused by the aluminum, the area ratio described above is preferably determined through appropriate experiments and the like.

On the other hand, the power transmission-side coil $T_L$ is significantly affected by the metal plate 270 which is located relatively closer thereto than the magnetic member plate 284. As shown in FIGS. 37A and 37B, when the magnetic member plate 284 is provided on the inside surface of the metal plate 270, the influence of the magnetic member plate 284 on the power transmission-side coil $T_L$ is small enough to be ignored. With consideration given to this fact, the resonant frequency $f_1$ of the resonant circuit TT determined only by the inductance $L_1$ of the power transmission-side coil $T_L$ and the capacitance $C_1$ of the power transmission-side capacitor $T_C$ in the separate state is set to a predetermined frequency (for example, 13 MHz) lower than the reference frequency such that the resonant frequency of the resonant circuit TT is increased by being affected by the metal plate 270 in the reference arrangement state (or by being affected by the metal plate 270 and the magnetic member plate 284) and that consequently, the resonant frequency of the resonant circuit TT is the reference frequency. In this way, the power transfer is performed in a state where the resonant frequencies of the resonant circuits TT and RR are set to the reference frequency, and thus the influence based on the resonant frequency shift phenomenon is cancelled. However, since an increase in the current amplitude of the power transmission-side coil $T_L$ caused by the presence of the metal plate 270 is not cancelled, in terms of the cancellation of the influence based on the current amplitude increase phenomenon, the example EX3_1 or EX3_3 is preferable.

Although here, it is assumed that the magnetic member plate 284 is in contact with the inside surface of the metal plate 270, that is, that the distance between the magnetic member plate 284 and the inside surface of the metal plate 270 is zero, the arrangement position of the magnetic member plate 284 can also be shifted such that the distance has a predetermined positive value (the magnetic member plate 284 can also be shifted in a direction approaching the power reception-side coil $R_L$). As in the example EX3_3, the magnetic member plate 283 shown in FIG. 34A can be deformed into the magnetic member plate in FIG. 36, the magnetic member plate 284 may be formed with a plurality of magnetic member plates which are separated from each other.

The shapes of the magnetic member plate 284 shown here are simply illustrative, and the shape can be changed variously. For example, instead of adhering the seamless magnetic member plate in a rectangular shape (rectangular shape having hollow) as described previously on the metal plate 270, a plurality of strip-shaped (that is, rectangular) magnetic member plates may be adhered to the inside surface of the metal plate 270 such that the strip-shaped magnetic member plates are aligned as a whole in a rectangular shape (rectangular shape having hollow) on the metal plate 270.

In the electronic device 2, the power reception-side coil $R_L$, the metal plate 270 and the magnetic member plate 284 are fixed within the electronic device 2 with mechanical components, a substrate and the like which are not illustrated, in the power feeding device 1, the power transmission-side coil $T_L$ is fixed within the power feeding device 1 with mechanical components, a substrate and the like which are not illustrated and the enclosures of the power feeding device 1 and the electronic device 2 are formed such that the details described above in the example EX3_4 are realized.

Example EX3_5

The example EX3_5 will be described. In the example EX3_5, an initial setting environment (FIG. 13) in a non-contact power feeding system of the third embodiment will be described.

In the examples EX3_2 and EX3_4, in the reference arrangement state, the resonant frequency of the resonant circuit TT is affected by the metal plate 270 so as to be equal to the reference frequency, and in the separate state where the resonant frequency of the resonant circuit TT is not affected by the metal plate 270, the resonant frequency of the resonant circuit TT is lower than the reference frequency. Hence, in the examples EX3_2 and EX3_4, the initial setting environment described in the first embodiment is preferably replaced by a variation initial setting environment below (this replacement may also be applied to the examples EX3_1 and EX3_3). In the variation initial setting environment, in the reference arrangement state, the electronic device 2 is placed on the power feeding table 12, and in the electronic device 2, the $f_O$ change/short circuit operation is continuously performed.

«Second Consideration on the Present Invention»

The present invention embodied in the embodiments described above (in particular, the third embodiment) will be considered.

A power reception device $WB_1$ according to one aspect of the present invention which can receive, from a power transmission device having a power transmission-side resonant circuit (TT) including a power transmission-side coil ($T_L$) that transmits power, the power by a magnetic field resonance method includes: a power reception-side resonant circuit (RR) that includes a power reception-side coil ($R_L$) that receives the power; and a metal portion ($MT_2$) that includes a metal plate (270) in which an opening portion (271) is provided in a position opposite the arrangement position of the power reception-side coil, where when the power transmission device and the power reception device are in a predetermined positional relationship for performing the transmission and reception of the power, the opening portion is located between the power transmission-side coil and the power reception-side coil, and a magnetic member portion is provided in such a position as to affect at least one of a resonant frequency of the power reception-side resonant circuit and a resonant frequency of the power transmission-side resonant circuit.

In terms of a mechanical strength, a texture improvement or the like, the metal portion which includes the metal plate can be provided in the power reception device. Although here, the metal plate which includes the opening portion acts so as to produce changes in the resonant frequencies of the resonant circuits through magnetic coupling to the coil, the magnetic member portion is provided, and thus it is possible to cancel the changes, with the result that it is possible to perform the desired transmission and reception of the power by the magnetic field resonance method.

A non-contact power feeding system $WB_2$ according to one aspect of the present invention includes: the power reception device $WB_1$; and the power transmission device which has the power transmission-side resonant circuit including the power transmission-side coil that transmits the power, where the transmission and reception of the power can be performed by the magnetic field resonance method.

Specifically, for example, preferably, in the non-contact power feeding system $WB_2$, the power transmission device includes: a power transmission circuit which can supply an alternating current voltage to the power transmission-side resonant circuit; a detection circuit which detects the amplitude of a current flowing through the power transmission-side coil; and a control circuit which performs power transmission control on the power by controlling the power transmission circuit based on the amplitude detection value of the detection circuit.

For example, preferably, the power reception device $WB_1$ includes a change/short circuit which changes the resonant frequency of the power reception-side resonant circuit from a resonant frequency when the power is received or short-circuits the power reception-side coil before the reception of the power from the power transmission device, the control circuit includes: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion which determines, based on the amplitude detection value of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil and based on the magnetic field generated in the power transmission-side coil, currents in directions opposite to each other flow through the metal plate and the magnetic member portion.

The current based on the magnetic field generated in the power transmission-side coil flows through the metal plate having the opening portion, and the current flowing through the metal plate generates a voltage in the power transmission-side coil so as to produce a change in the current amplitude of the power transmission-side coil. On the other hand, although the current based on the magnetic field generated in the power transmission-side coil also flows through the magnetic member portion, the direction (phase) of the current of the magnetic member portion is opposite to the direction of the metal plate. Hence, the change in the current amplitude of the power transmission-side coil caused by the presence of the metal plate can be cancelled by the magnetic member portion, with the result that it is possible to ensure the accuracy of a determination as to whether or not the power transmission utilizing the current amplitude of the power transmission-side coil can be performed.

The power feeding device 1 itself in each of the embodiments described above may function as the power transmission device according to the present invention or part of the power feeding device 1 in each of the embodiments described above may function as the power transmission device according to the present invention. Likewise, the electronic device 2 itself in each of the embodiments described above may function as the power reception device according to the present invention or part of the electronic device 2 in each of the embodiments described above may function as the power reception device according to the present invention.

Fourth Embodiment

A fourth embodiment of the present invention will be described. In the fourth embodiment of the present invention, a slit portion is additionally formed in the metal plate 270 of the second embodiment so as to reduce the occurrence of the resonant frequency shift phenomenon and the current amplitude increase phenomenon, and thus the influences based on the phenomena are cancelled or reduced. The slit portion is formed from the opening portion 271 toward the outer periphery of the metal plate 270. The fourth embodiment is an embodiment based on the first and second embodiments, and for items which are not particularly described in the fourth embodiment, the description of the first and second embodiments is also applied to the fourth embodiment unless otherwise a contradiction arises (for items which contradict, the description of the fourth embodiment is prioritized).

In examples EX4_1 to EX4_3 which belong to the fourth embodiment, the detailed structure of the slit portion and the like will be described below. Unless otherwise a contradiction arises, items which are described in an arbitrary example among the examples EX4_1 to EX4_3 can also be applied to another arbitrary example.

Example EX4_1

The example EX4_1 will be described. In the example EX4_1, the slit portion which is provided in the metal plate 270 includes a cut slit which is extended from the opening portion 271 to the outer periphery of the metal plate 270.

Figure 39A:
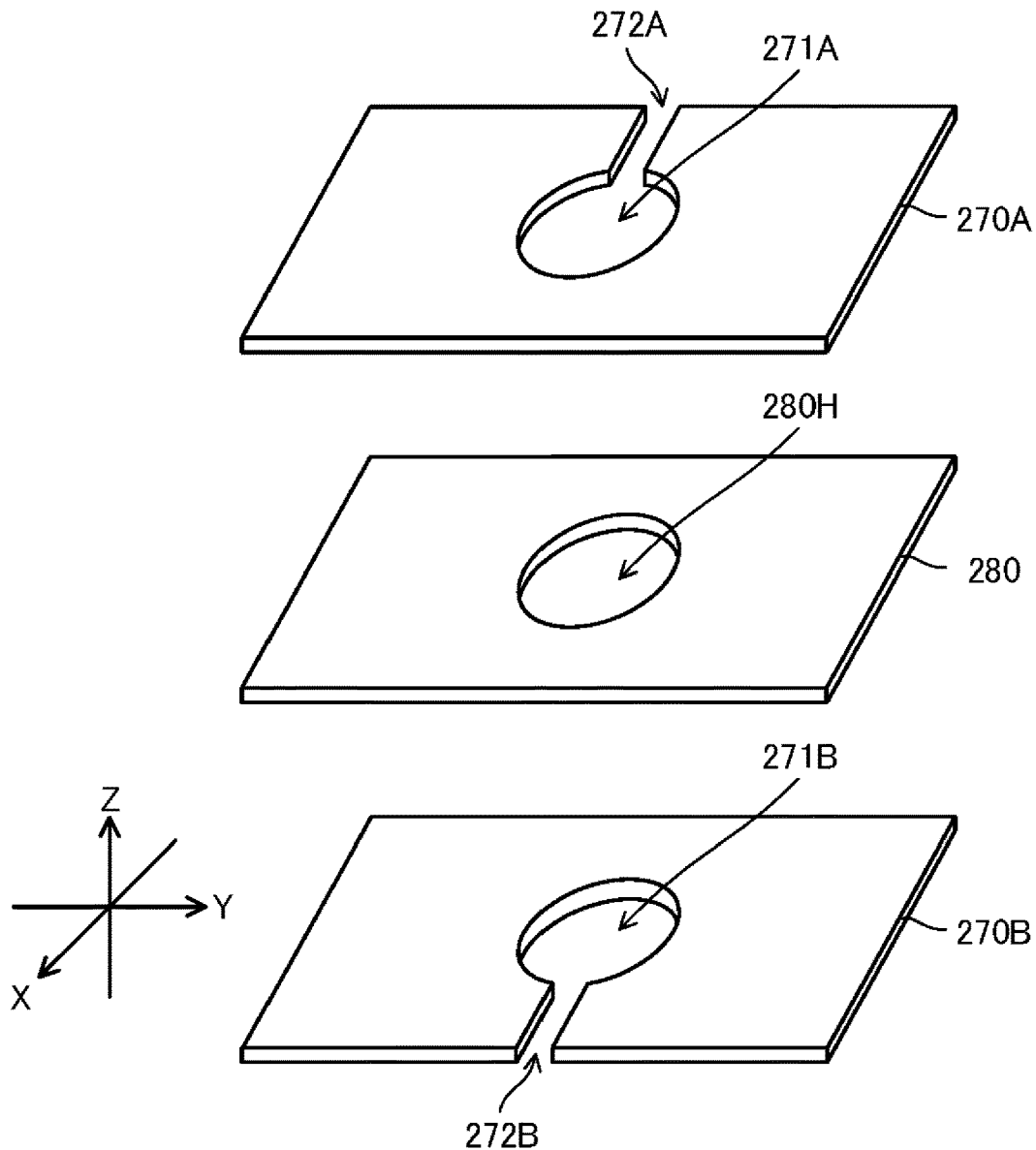
FIGS. 39A and 39B are respectively an exploded perspective view and a perspective view of two metal plates and an insulating plate in an example (EX4_1) of a fourth embodiment of the present invention.
Figure 39B:
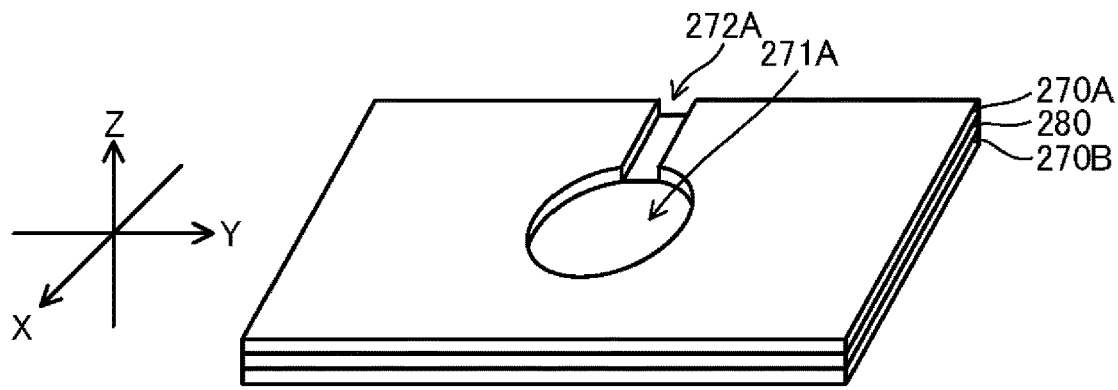

With reference to FIGS. 39A and 39B, in the example EX4_1, as the metal plate 270, two metal plates 270A and 270B are provided. The opening portions 271 in the metal plates 270A and 270B are respectively identified with symbols 271A and 271B. In the electronic device 2 according to the example EX4_1, an insulating plate 280 which is formed of an insulting member such as a resin material or rubber is provided, and as shown in FIG. 39B, the metal plates 270A and 270B are coupled to each other through the insulating plate 280 while the insulating state is maintained.

FIG. 39A is an exploded perspective view of the metal plate 270A, the insulating plate 280 and the metal plate 270B. FIG. 39B is a perspective view of the metal plate 270A, the insulating plate 280 and the metal plate 270B in a state where the metal plate 270A, the insulating plate 280 and the metal plate 270B are coupled.

In the reference arrangement state, the metal plates 270A and 270B are parallel to the XY plane. The opening portions 271A and 271B are respectively holes which are provided in the metal plates 270A and 270B so as to penetrate in the direction of the Z axis, and thus no metal is present in the opening portions 271A and 271B.

Although the shape of the insulating plate 280 is arbitrary as long as it is possible to realize the insulating state between the metal plate 270A and the metal plate 270B, it is assumed here that the outline shape of the insulating plate 280 on the XY plane is the same as the outline shapes of the metal plate 270A and the metal plate 270B. In the insulating plate 280, an opening portion 280H which has the same shape and size as the opening portions 271A and 271B is provided, and when the outer peripheral shapes of the opening portions 271A, the 280H and 271B are projected on the XY plane, the outer peripheral shapes thereof are overlaid on each other. Since here, the outer peripheral shapes of the opening portions 271A and 271B are assumed to be circles, the outer peripheral shape of the opening portion 280H is also a circle. However, as described in the second embodiment, the outer peripheral shapes thereof are not limited to circles. In the insulating plate 280, the opening portion 280H does not need to be provided.

In the metal plate 270A, a cut slit 272A is provided which is extended from a predetermined position of the outer periphery of the opening portion 271A to the outer periphery of the metal plate 270A. The cut slit 272A is a linear hole which is provided in the metal plate 270A, which penetrates in the direction of the Z axis and which has a predetermined width. Since the portion between the outer peripheries of the opening portion 271A and the metal plate 270A is completely cut by the cut slit 272A, the electrical path (current loop) is not formed around the opening portion 271A.

In the metal plate 270B, a cut slit 272B is provided which is extended from a predetermined position of the outer periphery of the opening portion 271B to the outer periphery of the metal plate 270B. The cut slit 272B is a linear hole which is provided in the metal plate 270B, which penetrates in the direction of the Z axis and which has a predetermined width. Since the portion between the outer peripheries of the opening portion 271B and the metal plate 270B is completely cut by the cut slit 272B, the electrical path (current loop) is not formed around the opening portion 271B.

Figure 40:
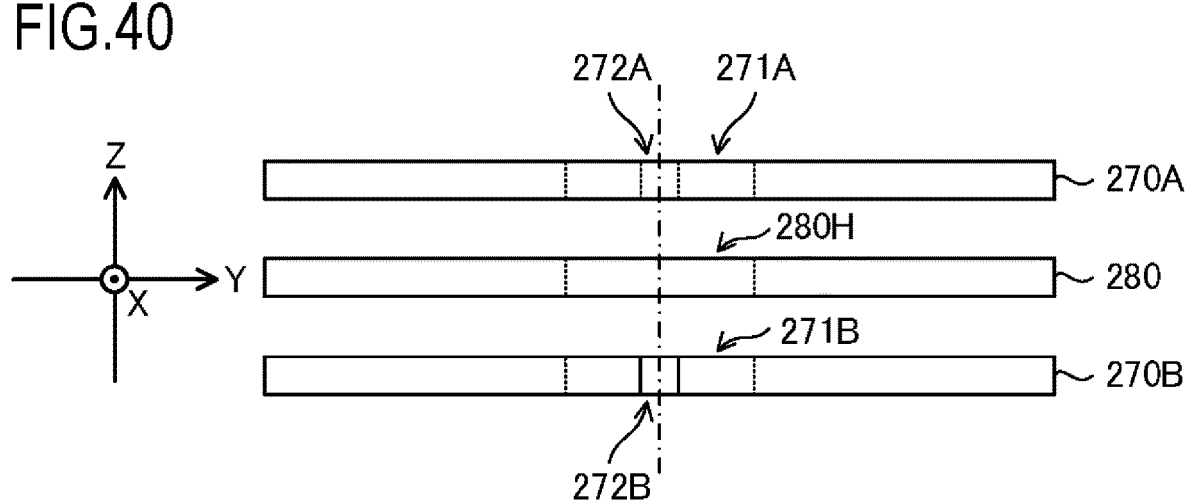
FIG. 40 is an exploded plan view of the two metal plates and the insulating plate in the example (EX4_1) of the fourth embodiment of the present invention.
Figure 41:
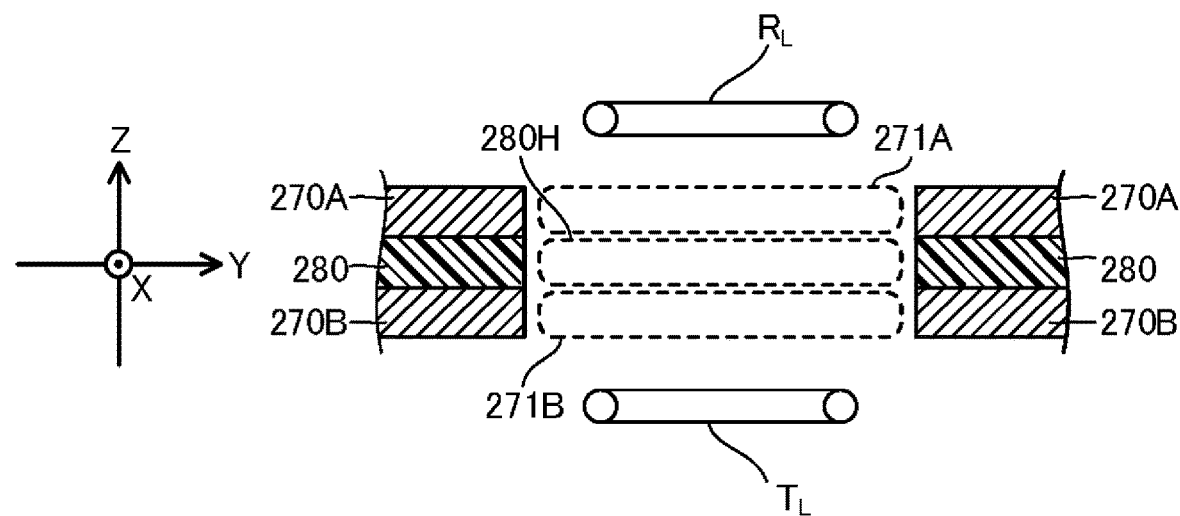
FIG. 41 is a cross-sectional view of the two metal plates and the insulating plate in the example (EX4_1) of the fourth embodiment of the present invention.

FIG. 40 is an exploded plan view of the metal plate 270A, the insulating plate 280 and the metal plate 270B when seen in the direction of the X axis. FIG. 41 is a cross-sectional view of the metal plate 270A, the insulating plate 280 and the metal plate 270B in a state where the metal plate 270A, the insulating plate 280 and the metal plate 270B are coupled. In FIG. 41, the coils $T_L$ and $R_L$ are also shown. The cross section in the cross-sectional view of FIG. 41 is a cross section which passes through the centers of the opening portions 271A, 280H and 271B and which is parallel to the YZ plane. Although the opening portions 271A, 280H and 271B and the cut slits 272A and 272B are actually sealed with a resin material or the like, the state of the sealing is not shown in FIGS. 39A and 39B and FIGS. 40 and 41.

The opening portions 271A, 280H and 271B are provided in opposite positions of the arrangement position of the power reception-side coil $R_L$ (the positions opposite the arrangement position of the power reception-side coil $R_L$), in the reference arrangement state, the opening portions 271A, 280H and 271B are located between the coils $T_L$ and $R_L$ and the coils $T_L$ and $R_L$ are opposite each other through the opening portions 271A, 280H and 271B. The sizes of the opening portions 271A and 271B in the XY plane are larger than those of the coils $T_L$ and $R_L$, and the items which are described in the second embodiment on the size of the opening portion 271 are also applied to the opening portions 271A and 271B. Hence, the power transfer using the coils $T_L$ and $R_L$ can be realized though a slight loss is produced.

As described above, the cut slit 272B which completely cuts the portion between the outer peripheries of the opening portion 271A and the metal plate 270A is provided in the metal plate 270A, and thus currents based on the magnetic field generated in the coils $T_L$ and $R_L$ are not induced in the metal plate 270A. The same is true for the metal plate 270B. Hence, the resonant frequency shift phenomenon and the current amplitude increase phenomenon do not occur, and consequently, the influences based on the phenomena are not produced.

When attention is focused only on the prevention of the occurrence of the resonant frequency shift phenomenon and the current amplitude increase phenomenon, it is preferable to be able to adopt a method in which in the electronic device 2, as the metal plate 270, only the metal plate 270A is provided (in this case, the insulating plate 280 is not necessary). However, since the cut slit 272A is provided in the metal plate 270A such that the structural strength of the metal plate 270A is lowered, in particular, for example, when the enclosure of the electronic device 2 is formed with the metal plate, it may be undesirable to provide only the metal plate 270A as the metal plate 270.

Hence, in the electronic device 2 according to the example EX4_1, a plurality of metal plates in which the opening portion and the cut slit are provided are stacked in layers in a state where they are insulated from each other (although here, an example where the number of metal plates stacked in layers is two is described, the number of metal plates can be three or more). Here, within the plane parallel to the metal plates (that is, the plane parallel to the XY plane), a plurality of cut slits in the metal plates are formed in different positions.

When attention is focused on the metal plates 270A and 270B, within the plane parallel to the metal plates 270A and 270B (that is, the plane parallel to the XY plane), the cut slits 272A and 272B are formed in different positions. In other words, when the cut slits 272A and 272B are projected on the plane parallel to the metal plates 270A and 270B, the projected images are formed in different positions. As described above, the positions in which the cut slits 272A and 272B are formed are devised, and thus the metal plates 270A and 270B can complement each other in portions whose structural strength is relatively low, with the result that it is possible to obtain the necessary structural strength as a whole.

In the example shown in FIG. 39A, in the metal plate 270A, the cut slit 272A is a cut slit which is extended from the predetermined position of the outer periphery of the opening portion 271A toward a predetermined first direction whereas in the metal plate 270B, the cut slit 272B is a cut slit which is extended from the predetermined position of the outer periphery of the opening portion 271B toward a predetermined second direction. The first and second directions are parallel to the XY plane and are opposite to each other. For example, the first and second directions may be orthogonal to each other.

When the inductance of the power transmission-side coil $T_L$ is represented by $L_1$, and the capacitance of the power transmission-side capacitor $T_C$ is represented by $C_1$, the resonant frequency $f_1$ of the resonant circuit TT which is determined only by $L_1$ and $C_1$ is $1/(2\pi(L_1C_1)^{1/2})$ (that is, the reciprocal of a product of $2\pi$ and the square root of $(L_1C_1)$). When the inductance of the power reception-side coil $R_L$ is represented by $L_2$, and the capacitance of the power reception-side capacitor $R_C$ is represented by $C_2$, the resonant frequency $f_2$ of the resonant circuit RR which is determined only by $L_2$ and $C_2$ is $1/(2\pi(L_2C_2)^{1/2})$ (that is, the reciprocal of a product of $2\pi$ and the square root of $(L_2C_2)$). Since in the example EX4_1, as in the first embodiment, the resonant frequency shift phenomenon does not occur, the resonant frequency $f_1$ of the resonant circuit TT and the resonant frequency $f_2$ of the resonant circuit RR (in the first embodiment, represented by the symbol $f_O$) are preferably set to the predetermined reference frequency (13.56 MHz).

In the electronic device 2, the power reception-side coil $R_L$, the metal plate 270A, the insulating plate 280 and the metal plate 270B are fixed within the electronic device 2 with mechanical components, a substrate and the like which are not illustrated, in the power feeding device 1, the power transmission-side coil $T_L$ is fixed within the power feeding device 1 with mechanical components, a substrate and the like which are not illustrated and the enclosures of the power feeding device 1 and the electronic device 2 are formed such that the details described above in the example EX4_1 are realized.

Example EX4_2

The example EX4_2 will be described. The metal plate 270 according to the example EX4_2 is referred to as a metal plate 270C.

Figure 42:
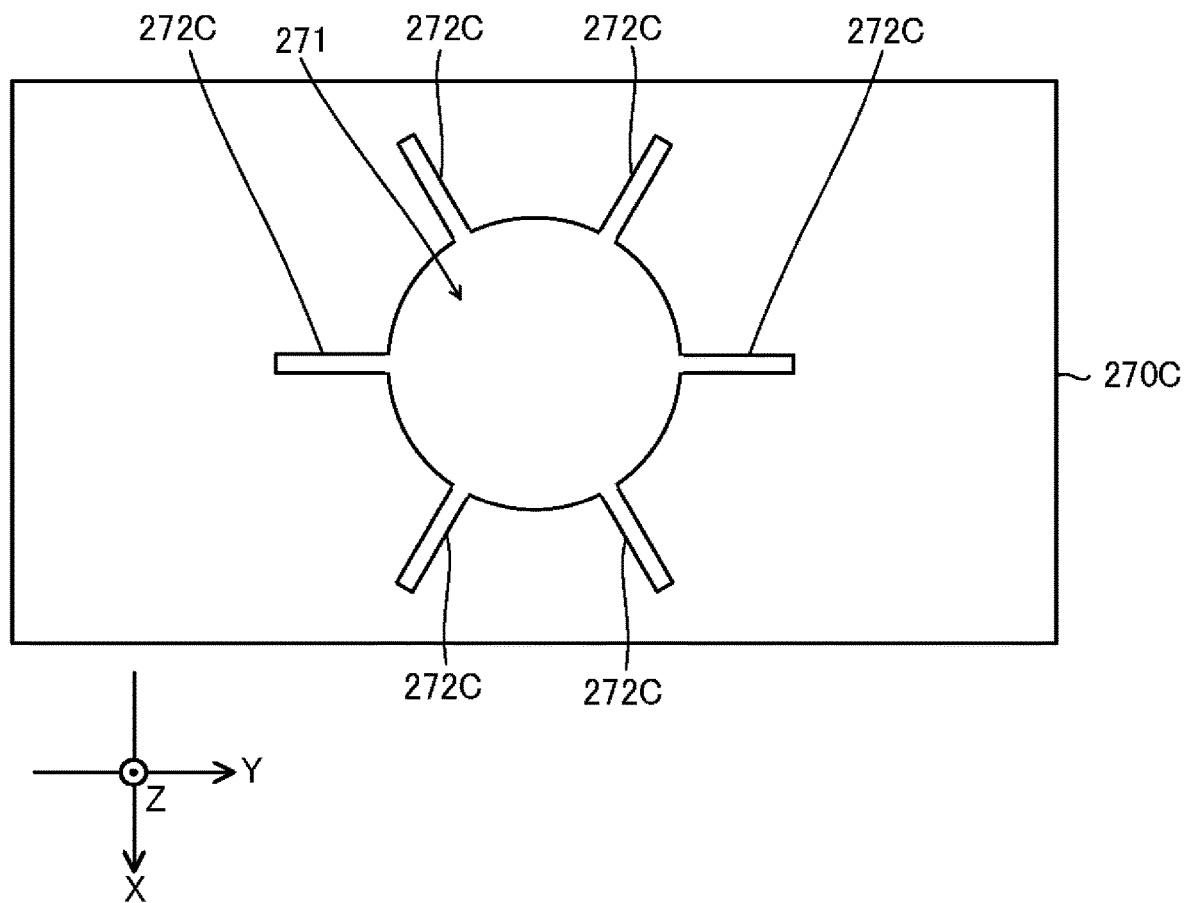
FIG. 42 is a plan view of the metal plate in an example (EX4_2) of the fourth embodiment of the present invention.

FIG. 42 is a plan view of the metal plate 270C. The metal plate 270C has a configuration in which a slit group is additionally formed in the metal plate 270 described in the second embodiment. The slit group is formed with a plurality of slits 272C which are formed in different positions from the opening portion 271 toward the outer periphery of the metal plate 270C. Although the number of slits 272C may be arbitrary as long as the number is equal to or more than two, in terms of enhancement of the degree of reduction of the resonant frequency shift phenomenon and the current amplitude increase phenomenon, a certain number of slits 272C (for example, four or more slits) are preferably present, and in order to effectively increase the length of the electrical path formed around the opening portion 271, it is preferable to radially form a plurality of slits 272C. Although the opening portion 271 and the slits 272C are actually sealed with a resin material or the like, the state of the sealing is not shown in FIG. 42.

A specific example of the configuration of the slit group in FIG. 42 will be described. As described above, the outer peripheral shape of the opening portion 271 on the XY plane is a circle. Six points which divide the circumference of the circle into six parts are referred to as the first to sixth points. It is assumed that the i-th line segment having a predetermined length is drawn, along a direction from the center of the opening portion 271 toward the i-th point, from the i-th point toward the outer periphery of the metal plate 270C (i is an integer). In the position of the i-th line segment, the i-th slit 272C having a predetermined width is provided. In other words, in the example of FIG. 42, the first to sixth slits 272C are radially formed from the opening portion 271 toward the outer periphery of the metal plate 270C, and the slit group is formed with the first to sixth slits 272C.

The slits 272C are holes which are provided in the metal plate 270C so as to penetrate in the direction of the Z axis, and thus no metal is present in the slits 272C. However, no contact point is present between the slits 272C and the outer periphery of the metal plate 270C. Specifically, the slits 272C which are extended from the opening portion 271 are completed in front of the outer periphery of the metal plate 270C, and consequently, the metal of the metal plate 270C is left between the slits 272C and the outer periphery of the metal plate 270C.

Figure 43:
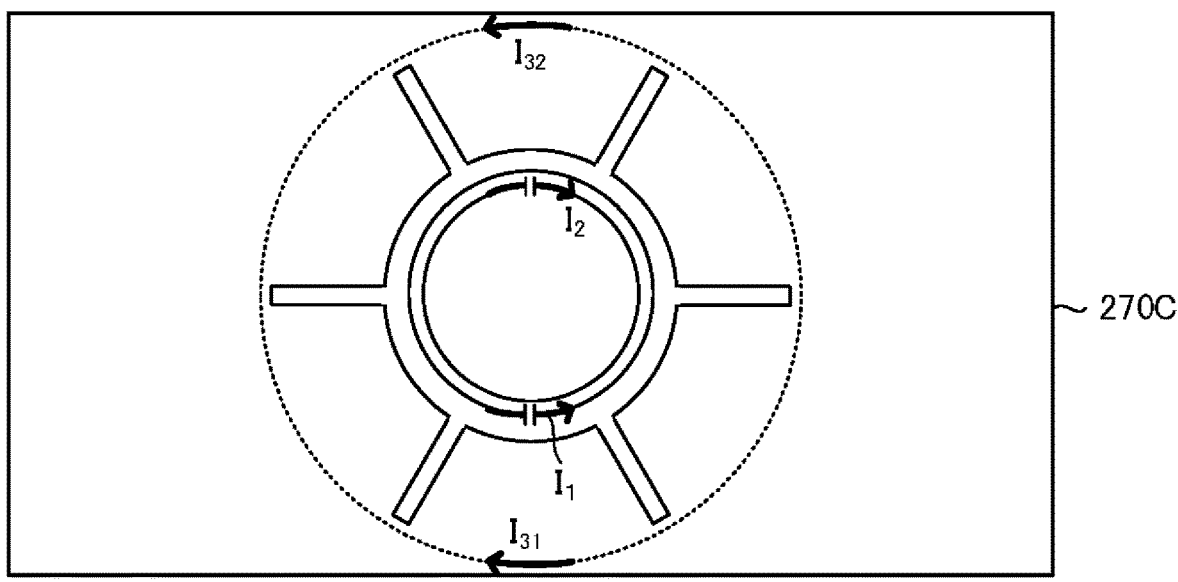
FIG. 43 is a relationship diagram of currents flowing through a power transmission-side coil, a power reception-side coil and the metal plate in the example (EX4_2) of the fourth embodiment of the present invention.

Hence, as compared with the case where the cut slit is provided in the example EX4_1, the structural strength of the metal plate itself is enhanced whereas as shown in FIG. 43, the electrical path (current loop) made of the metal of the metal plate 270C is formed around the opening portion 271 and the slit group. Then, as in the configuration of the second embodiment, when the alternating current $I_1$ flows through the power transmission-side coil $T_L$, the alternating current $I_{31}$ flows through the electrical path around the opening portion 271, and when the alternating current $I_2$ flows through the power reception-side coil $R_L$, the alternating current $I_{32}$ flows through the electrical path around the opening portion 271 (see FIGS. 28A and 28B).

However, since as compared with the case where the slit group is not present, the diameter of the electrical path around the opening portion 271 is increased, a coupling coefficient $K_{13}$ between the power transmission-side coil $T_L$ and the metal plate 270 and a coupling coefficient $K_{23}$ between the power reception-side coil $R_L$ and the metal plate 270 are decreased (see FIG. 28C). Consequently, the resonant frequency shift phenomenon and the current amplitude increase phenomenon are partially reduced, and thus the influences based on the phenomena are reduced.

As is understandable from the relationship shown in FIG. 28C, as Q in the power reception-side coil $R_L$ is increased, the current $I_2$ is relatively increased with respect to the current $I_{32}$ (ultimately, the current $I_{32}$ can be ignored), and thus the influence of the current $I_{32}$ is reduced. Hence, it is preferable to form the resonant circuit RR such that Q in the power reception-side coil $R_L$ is increased as much as possible. For example, in the power reception-side coil $R_L$, the number of times the winding wires are wound is reduced or the winding wires are increased in thickness, and thus it is possible to increase Q in the power reception-side coil $R_L$.

Although in the example EX4_2, the resonant frequency shift phenomenon is reduced, a certain degree of the resonant frequency shift phenomenon occurs. Hence, the resonant frequency is preferably determined as follows.

In the separate state, the resonant frequency $f_1$ of the resonant circuit TT determined only by the inductance $L_1$ of the power transmission-side coil $T_L$ and the capacitance $C_1$ of the power transmission-side capacitor $T_C$ is set to a predetermined frequency (for example, 13 MHz) lower than the reference frequency such that in the reference arrangement state, the resonant frequency of the resonant circuit TT is increased by being affected by the metal plate 270 and that consequently, the resonant frequency of the resonant circuit TT is the resonant frequency. Likewise, the resonant frequency $f_2$ of the resonant circuit RR determined only by the inductance $L_2$ of the power reception-side coil $R_L$ and the capacitance $C_2$ of the power reception-side capacitor $T_C$ is set to a predetermined frequency (for example, 13 MHz) lower than the reference frequency such that the resonant frequency of the resonant circuit RR is increased by being affected by the metal plate 270 and that consequently, the resonant frequency of the resonant circuit RR is the resonant frequency.

In this way, the power transfer is performed in a state where the resonant frequencies of the resonant circuits TT and RR are set to the reference frequency, and thus the influence based on the resonant frequency shift phenomenon is completely cancelled. However, since an increase in the current amplitude of the power transmission-side coil $T_L$ caused by the presence of the metal plate 270 is not completely cancelled, in terms of cancellation of the influence based on the current amplitude increase phenomenon, the example EX4_1 is preferable.

In the electronic device 2, the power reception-side coil $R_L$ and the metal plate 270C are fixed within the electronic device 2 with mechanical components, a substrate and the like which are not illustrated, in the power feeding device 1, the power transmission-side coil $T_L$ is fixed within the power feeding device 1 with mechanical components, a substrate and the like which are not illustrated and the enclosures of the power feeding device 1 and the electronic device 2 are formed such that the details described above in the example EX4_2 are realized.

Example EX4_3

The example EX4_3 will be described. In the example EX4_3, an initial setting environment (FIG. 13) in a non-contact power feeding system of the fourth embodiment will be described.

In the example EX4_2, in the reference arrangement state, the resonant frequency of the resonant circuit TT is affected by the metal plate 270 so as to be the reference frequency, and in the separate state where the resonant frequency of the resonant circuit TT is not affected by the metal plate 270, the resonant frequency of the resonant circuit TT is lower than the reference frequency. Hence, in the example EX4_2, the initial setting environment described in the first embodiment is preferably replaced by a variation initial setting environment below (this replacement may be applied to the example EX4_1). In the variation initial setting environment, in the reference arrangement state, the electronic device 2 is placed on the power feeding table 12, and in the electronic device 2, the $f_O$ change/short circuit operation is continuously performed.

«Third Consideration on the Present Invention»

The present invention embodied in the embodiments described above (in particular, the fourth embodiment) will be considered.

A power reception device $WC_1$ according to one aspect of the present invention which can receive, from a power transmission device having a power transmission-side resonant circuit (TT) including a power transmission-side coil $(T_L)$ that transmits power, the power by a magnetic field resonance method includes: a power reception-side resonant circuit (RR) which includes a power reception-side coil $(R_L)$ that receives the power; and a metal portion $(MT_2)$ that includes a metal plate in which an opening portion (271) is provided in a position opposite the arrangement position of the power reception-side coil, where when the power transmission device and the power reception device are in a predetermined positional relationship for performing the transmission and reception of the power, the opening portion is located between the power transmission-side coil and the power reception-side coil, and in the metal plate, a slit portion is formed from the opening portion toward the outer periphery of the metal plate.

In terms of a mechanical strength, a texture improvement or the like, the metal portion which includes the metal plate can be provided in the power reception device. Although here, the metal plate which includes the opening portion acts so as to produce changes in the resonant frequencies of the resonant circuits through magnetic coupling to the coil, the slit portion is provided, and thus it is possible to reduce the changes, with the result that it is possible to perform the desired transmission and reception of the power by the magnetic field resonance method.

A non-contact power feeding system $WC_2$ according to one aspect of the present invention includes: the power reception device $WC_1$; and the power transmission device which has the power transmission-side resonant circuit including the power transmission-side coil that transmits the power, where the transmission and reception of the power can be performed by the magnetic field resonance method.

Specifically, for example, preferably, in the non-contact power feeding system $WC_2$, the power transmission device includes: a power transmission circuit which can supply an alternating current voltage to the power transmission-side resonant circuit; a detection circuit which detects the amplitude of a current flowing through the power transmission-side coil; and a control circuit which performs power transmission control on the power by controlling the power transmission circuit based on the amplitude detection value of the detection circuit.

For example, preferably, the power reception device $WC_1$ includes a change/short circuit which changes the resonant frequency of the power reception-side resonant circuit from a resonant frequency when the power is received or short-circuits the power reception-side coil before the reception of the power from the power transmission device, and the control circuit includes: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion which determines, based on the amplitude detection value of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil.

If the current based on the magnetic field generated in the power transmission-side coil flows through the metal plate having the opening portion, the current flowing through the metal plate generates a voltage in the power transmission-side coil so as to produce a change in the current amplitude of the power transmission-side coil. The slit portion is provided, and thus the current in the metal plate based on the magnetic field generated in the power transmission-side coil becomes zero or is reduced, with the result that it is possible to ensure the accuracy of a determination as to whether or not the power transmission utilizing the current amplitude of the power transmission-side coil can be performed.

The power feeding device 1 itself in each of the embodiments described above may function as the power transmission device according to the present invention or part of the power feeding device 1 in each of the embodiments described above may function as the power transmission device according to the present invention. Likewise, the electronic device 2 itself in each of the embodiments described above may function as the power reception device according to the present invention or part of the electronic device 2 in each of the embodiments described above may function as the power reception device according to the present invention.

«Variations and the Like»

The embodiments of the present invention can be variously changed as necessary without departing from the technical idea indicated in the scope of claims. The embodiments described above are simply examples of the embodiment of the present invention, and the significance of the terms of the present invention and the configuration requirements is not limited by the description of the above embodiments. The specific values indicated in the above description are simply illustrative, and can naturally be changed to various values. As explanatory notes which can be applied to the embodiments described above, explanatory notes 1 to 3 will be described below. The details described in the explanatory notes can be arbitrarily combined unless otherwise a contradiction arises.

[Explanatory Note 1]

Although in the embodiments described above, the frequencies and the resonant frequencies of various types of signals are set to 13.56 MHz serving as the reference frequency, 13.56 MHz is a target value for the setting, and in the actual device, the frequencies include errors.

[Explanatory Note 2]

Although the present invention embodied in conformance with the standard of NFC is described in the embodiments, and thus in the description, the reference frequency is 13.56 MHz, the reference frequency may be any frequency other than 13.56 MHz. In relation to what has been described above, the communication and the power transfer between the power feeding device and the electronic device to which the present invention is applied may be communication and power transfer in conformance with a standard other than NFC.

Even in a case where the reference frequency of the non-contact power feeding system according to the present invention is set to a frequency other than 13.56 MHz (for example, 6.78 MHz), and where the resonant frequency of the resonant circuit JJ in the foreign object 3 formed as a non-contact IC card is 13.56 MHz, when the foreign object 3 is placed on the power feeding table 12, a corresponding change in the voltage value $V_D$ is produced in the pFOD processing or the mFOD processing. Hence, even in such a case, it is possible to detect the foreign object 3 by the method described above.

[Explanatory Note 3]

A target device which is the power reception device or the power transmission device according to the present invention can be formed by hardware such as an integrated circuit or a combination of hardware and software. An arbitrary specific function which is the entire function realized in the target device or part thereof may be described as a program, and the program may be stored in a flash memory capable of installing the program in the target device. Then, the program may be performed on a program performing device (for example, a microcomputer which can be installed in the target device) so as to realize the specific function. The program can be stored and fixed in an arbitrary recording medium. The recording medium in which the program is stored and fixed may be installed in or connected to a device (such as a server device) which is different from the target device.

LIST OF REFERENCE SYMBOLS 1 power feeding device
2 electronic device
130 NFC power transmission circuit
140 load detection circuit
160 control circuit
270, 270A to 270C metal plate
271, 271A and 271B opening portion
272A, 272B cut slit
272C slit
280 insulating plate
281 to 284 magnetic member plate
TT power transmission-side resonant circuit
$T_L$ power transmission-side coil
$T_C$ power transmission-side capacitor
RR power reception-side resonant circuit
$R_L$ power reception-side coil
$R_C$ power reception-side capacitor

The invention claimed is:

1. A power transmission device which can transmit power to a power reception device by a magnetic field resonance method, the power transmission device comprising:
   a power transmission-side resonant circuit comprising a power transmission-side coil that transmits the power;
   a power transmission circuit structured to supply an alternating current voltage to the power transmission-side resonant circuit;
   a detection circuit structured to detect an amplitude of a current flowing through the power transmission-side coil;
   a control circuit structured to perform power transmission control on the power by controlling the power transmission circuit; and
   a memory,
   wherein the control circuit is structured such that, when the power is transmitted, the control circuit monitors whether or not an amplitude detection value of the detection circuit falls outside a predetermined range so as to control whether or not the continuation of the power transmission is allowed;
   wherein an upper limit value and a lower limit value of the predetermined range is previously set and stored in the memory;
   wherein the lower limit value is stored in the memory based on the amplitude detection value obtained in predetermined initial setting processing;
   wherein the power reception device comprises: a power reception-side resonant circuit comprising a power reception-side coil that receives the power; and a change/short circuit which changes a resonant frequency of the power reception-side resonant circuit from a resonant frequency when the power is received or short-circuits the power reception-side coil before the reception of the power,
   wherein the control circuit comprises: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion which determines, based on the amplitude detection value of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil;
   wherein the detection circuit is configured to detect the amplitude through processing which amplifies a signal indicating the amplitude of the current flowing through the power transmission-side coil;
   wherein an amplification factor when the power transmission magnetic field is generated in the power transmission-side coil is smaller than an amplification factor when the test magnetic field is generated in the power transmission-side coil; and
   wherein, in the initial setting processing, the test magnetic field is generated in the power transmission-side coil.

2. The power transmission device according to claim 1, wherein the detection circuit includes:
   a sense resistor connected to the power transmission-side coil and configured to generate an alternating current voltage drop corresponding to the current flowing through the power transmission-side coil;
   an envelope detector configured to output an analogue voltage signal by detecting an envelope of a signal of the voltage drop;
   an amplifier configured to amplify and then output an output signal of the envelope detector; and
   an A/D converter configured to output a digital voltage value by converting an output signal of the amplifier into a digital signal,
   the amplitude detection value being acquired based on the digital voltage value.

3. The power transmission device according to claim 1, wherein the control circuit is structured such that, while the power is transmitted and when the control circuit detects that the amplitude detection value of the detection circuit falls outside the predetermined range, the control circuit stops the power transmission.

4. The power transmission device according to claim 1, wherein the control circuit is structured such that, when the power is transmitted, the control circuit determines whether or not the amplitude detection value of the detection circuit falls outside the predetermined range so as to determine whether or not a foreign object is present which is different from the power reception device and which can generate a current based on a magnetic field generated in the power transmission-side coil, and when the control circuit determines that the foreign object is present, the control circuit stops the power transmission.

5. The power transmission device according to claim 4, wherein when the power is transmitted, the control circuit determines whether or not the amplitude detection value of the detection circuit exceeds the upper limit value of the predetermined range so as to determine whether or not as the foreign object, a foreign object comprising a coil is present.

6. A non-contact power feeding system which comprises:
a power transmission device having a power transmission-side resonant circuit comprising a power transmission-side coil that transmits power; and
a power reception device having a power reception-side resonant circuit comprising a power reception-side coil that receives the power and which can transmit and receive the power by a magnetic field resonance method,
wherein the power transmission device comprises:
   a power transmission circuit structured to supply an alternating current voltage to the power transmission-side resonant circuit;
   a detection circuit structured to detect an amplitude of a current flowing through the power transmission-side coil;
   a control circuit structured to perform power transmission control on the power by controlling the power transmission circuit; and
   a memory,
wherein the control circuit is structured such that, when the power is transmitted, the control circuit monitors whether or not an amplitude detection value of the detection circuit falls outside a predetermined range so as to control whether or not the continuation of the power transmission is allowed;
wherein an upper limit value and a lower limit value of the predetermined range is previously set and stored in the memory;
wherein the lower limit value is stored in the memory based on the amplitude detection value obtained in predetermined initial setting processing;
wherein the power reception device comprises a change/short circuit which changes a resonant frequency of the power reception-side resonant circuit from a resonant frequency when the power is received or short-circuits the power reception-side coil before the reception of the power,
wherein the control circuit comprises: a first processing portion which controls the power transmission circuit such that in a state where the power reception device changes the resonant frequency of the power reception-side resonant circuit or short-circuits the power reception-side coil according to a signal provided by communication from the power transmission device, a predetermined test magnetic field is generated in the power transmission-side coil before the transmission of the power; a second processing portion which determines, based on the amplitude detection value of the detection circuit when the test magnetic field is generated, whether or not the power transmission can be performed; and a third processing portion which realizes the power transmission by controlling the power transmission circuit such that after it is determined that the power transmission can be performed, a power transmission magnetic field larger than the test magnetic field is generated in the power transmission-side coil;
wherein the detection circuit is configured to detect the amplitude through processing which amplifies a signal indicating the amplitude of the current flowing through the power transmission-side coil;
wherein an amplification factor when the power transmission magnetic field is generated in the power transmission-side coil is smaller than an amplification factor when the test magnetic field is generated in the power transmission-side coil; and
wherein, in the initial setting processing, the test magnetic field is generated in the power transmission-side coil.

7. The non-contact power feeding system according to claim 6,
wherein the detection circuit includes:
   a sense resistor connected to the power transmission-side coil and configured to generate an alternating current voltage drop corresponding to the current flowing through the power transmission-side coil;
   an envelope detector configured to output an analogue voltage signal by detecting an envelope of a signal of the voltage drop;
   an amplifier configured to amplify and then output an output signal of the envelope detector; and
   an A/D converter configured to output a digital voltage value by converting an output signal of the amplifier into a digital signal,
   the amplitude detection value being acquired based on the digital voltage value.

8. The non-contact power feeding system according to claim 6,
wherein the control circuit is structured such that, while the power is transmitted and the control circuit detects that the amplitude detection value of the detection circuit falls outside the predetermined range, the control circuit stops the power transmission.

9. The non-contact power feeding system according to claim 6,
wherein the control circuit is structured such that, when the power is transmitted, the control circuit determines whether or not the amplitude detection value of the detection circuit falls outside the predetermined range so as to determine whether or not a foreign object is present which is different from the power reception device and which can generate a current based on a magnetic field generated in the power transmission-side coil, and when the control circuit determines that the foreign object is present, the control circuit stops the power transmission.

10. The non-contact power feeding system according to claim 9,
wherein when the power is transmitted, the control circuit determines whether or not the amplitude detection value of the detection circuit exceeds the upper limit value of the predetermined range so as to determine whether or not as the foreign object, a foreign object comprising a coil is present.

* * * * *